(12) United States Patent
Chen et al.

(10) Patent No.: US 12,285,909 B2
(45) Date of Patent: Apr. 29, 2025

(54) HIGH-THROUGHPUT 3D PRINTING OF CUSTOMIZED ASPHERIC IMAGING LENSES

(71) Applicant: Northwestern University, Evanston, IL (US)

(72) Inventors: Xiangfan Chen, Evanston, IL (US); Wenzhong Liu, Evanston, IL (US); Hao F. Zhang, Evanston, IL (US); Cheng Sun, Evanston, IL (US)

(73) Assignee: Northwestern University, Evanston, IL (US)

( * ) Notice: Subject to any disclaimer, the term of this patent is extended or adjusted under 35 U.S.C. 154(b) by 384 days.

(21) Appl. No.: 16/975,458

(22) PCT Filed: Mar. 8, 2019

(86) PCT No.: PCT/US2019/021288
§ 371 (c)(1),
(2) Date: Aug. 25, 2020

(87) PCT Pub. No.: WO2019/173674
PCT Pub. Date: Sep. 12, 2019

(65) Prior Publication Data
US 2021/0016496 A1 Jan. 21, 2021

Related U.S. Application Data

(60) Provisional application No. 62/641,072, filed on Mar. 9, 2018.

(51) Int. Cl.
*B33Y 10/00* (2015.01)
*B29C 64/129* (2017.01)
(Continued)

(52) U.S. Cl.
CPC ............ *B29C 64/129* (2017.08); *B33Y 10/00* (2014.12); *B29C 35/0805* (2013.01);
(Continued)

(58) Field of Classification Search
CPC ....... B29C 64/129; B29C 64/00; B29C 64/10; B33Y 10/00; B33Y 30/00; B33Y 70/00;
(Continued)

(56) References Cited

U.S. PATENT DOCUMENTS

| 5,291,008 A | 3/1994 | Havens et al. |
| 6,331,313 B1 | 12/2001 | Wong et al. |

(Continued)

FOREIGN PATENT DOCUMENTS

| WO | 02/088830 | 11/2002 |
| WO | 2016/115369 | 7/2016 |

OTHER PUBLICATIONS

Rogers et al., "Realization of Refractive Microoptics Through Grayscale Lithographic Patterning of Photosensitive Hybrid Glass," 2004, Optics Express, vol. 12, No. 7, pp. 1294-1303 (Year: 2004).*

(Continued)

*Primary Examiner* — Galen H Hauth
*Assistant Examiner* — Baileigh Kate Darnell
(74) *Attorney, Agent, or Firm* — Leydig, Voit & Mayer, Ltd.

(57) ABSTRACT

In an aspect, a method for additive manufacture of a three-dimensional object based on a computational model comprises steps of: grayscale photohardening a precursor material to form a portion of the object; and applying a hardened meniscus coating at a feature of the object; wherein the three-dimensional object is formed via at least the combination of the steps of gray scale photohardening and applying the meniscus coating. In some embodiments, the grayscale photohardening step is a grayscale photopo- (Continued)

lymerization step. In some embodiments, the applying a hardened meniscus coating step is a meniscus equilibrium post-curing step.

22 Claims, 35 Drawing Sheets

(51) Int. Cl.
*B33Y 30/00* (2015.01)
*B29C 35/08* (2006.01)
*B29K 105/00* (2006.01)
*B33Y 70/00* (2020.01)
*B33Y 80/00* (2015.01)

(52) U.S. Cl.
CPC .............. *B29C 2035/0827* (2013.01); *B29K 2105/0058* (2013.01); *B33Y 30/00* (2014.12); *B33Y 70/00* (2014.12); *B33Y 80/00* (2014.12)

(58) Field of Classification Search
CPC ............ B33Y 80/00; B29K 2105/0058; B29D 11/00019; B29D 11/00038; B29D 11/00057; B29D 11/00134; B29D 11/00163; B29D 11/00432
See application file for complete search history.

(56) References Cited

U.S. PATENT DOCUMENTS

| | | | |
|---|---|---|---|
| 7,303,853 B2 | 12/2007 | Afromowitz | |
| 8,216,308 B2 | 7/2012 | Blake et al. | |
| 2002/0099112 A1* | 7/2002 | Turner | B29C 33/42 524/440 |
| 2003/0119962 A1* | 6/2003 | Border | G02B 7/008 524/433 |
| 2004/0046287 A1 | 3/2004 | Andino et al. | |
| 2004/0246440 A1* | 12/2004 | Andino | B29D 11/00086 351/159.74 |
| 2007/0285799 A1* | 12/2007 | Dreher | G02B 3/0087 359/652 |
| 2009/0250828 A1 | 10/2009 | Rosen et al. | |
| 2009/0326651 A1 | 12/2009 | Spoor et al. | |
| 2010/0245761 A1 | 9/2010 | Widman et al. | |
| 2011/0085128 A1* | 4/2011 | Liu | G02B 1/043 264/1.36 |
| 2012/0083667 A1 | 4/2012 | Isogai et al. | |
| 2013/0266326 A1* | 10/2013 | Joseph | H04B 10/1141 398/130 |
| 2013/0313756 A1 | 11/2013 | Chen et al. | |
| 2014/0277437 A1 | 9/2014 | Currie | |
| 2016/0059487 A1* | 3/2016 | DeSimone | A61F 2/82 425/162 |
| 2017/0307859 A1* | 10/2017 | Li | B23K 26/402 |
| 2018/0001581 A1 | 1/2018 | Patel et al. | |

OTHER PUBLICATIONS

Samy, A.M., Gao, Z. Simplified compact fisheye lens challenges and design. J Opt 44, 409-416 (2015). (Year: 2015).*
Aono et al. (2000) "Development of large-aperture aspherical lens with glass molding," Advanced Optical Manufacturing and Testing Technology, 4231, 16.
Assia et al. (1992) "Side-view analysis of the lens. I. The crystalline lens and the evacuated bag," Arch Ophthalmol 110: 89-93.
Baker et al. (2012) "Microstereolithography of Three-Dimensional Polymeric Springs for Vibration Energy Harvesting," Smart Materials Research 2012: 1-9.
Birkhoff et al. (1978) "Optical and dielectric functions of liquid glycerol from gas photoionization measurements," The Journal of Chemical Physics, 69, 4185.
Calladine et al. (2012) "Multifocal versus monofocal intraocular lenses after cataract extraction," Cochrane Database Syst Rev 9: 67 pp.
Cazal et al. (2005) "Accommodative intraocular lens tilting," Am J Ophthalmol 140(2): 341-344.
Chen et al. (Mar. 2018) "High-speed 3D printing millimeter-size customized aspheric imaging lenses with sub-7 nm surface roughness", Advanced Materials, 30(18), 1705683.
Cook et al. (1993) "Bacterial Adhesion to Poly(Hema)-Based Hydrogels," Journal of Biomedical Materials Research 27:119-126.
Cumpston et al. (1999) "Two-photon polymerization initiators for three-dimensional optical data storage and microfabrication," Nature 398, 51-54.
Dearnaley et al. (2005) "Biomedical applications of diamond-like carbon (DLC) coatings: A review," Surf Coat Tech, 200, 2518-2524.
Derby (2012) "Printing and Prototyping of Tissues and Scaffolds," Science, 338, 921-926.
Deubel et al. (2004) "Direct laser writing of three-dimensional photonic-crystal templates for telecommunications," Nat Mater, 3, 444.
Erdei et al. A42 (2004) "Tolerancing surface accuracy of aspheric lenses used for imaging purposes," Proc. SPIE 5249, Optical Design and Engineering, 718.
FISHER (1977) "The force of contraction of the human ciliary muscle during accommodation," J Physiol 270: 51-74.
Gatto et al. (2006) "High-performance coatings for micromechanical mirrors," Appl Optics, 45, 1602-1607.
Gissibl et al. (Jun. 2016) "Two-photon direct laser writing of ultracompact multi-lens objectives," Nat Photonics, 10, 554-560.
Globaldata Reports (2012) "The Global Intraocular Lens Market is Forecast to Reach $3.1 Billion by 2017," 2 pp.
Gong et al. (2008) "Au(Si)-filled $\beta$-$Ga_2O_3$ nanotubes as wide range high temperature nanothermometers," Appl Phys Lett, 92, 073101.
Gooi et al. (2012) "Review of presbyopic IOLs: multifocal and accommodating IOLs," Int Ophthalmol Clin 52(2): p. 41-50.
He et al. (Feb. 2016) "Generation of Customizable Microwavy Pattern through Grayscale Direct Image Lithography," Scientific Reports, 6:21621.
Herkommer (Oct. 2014) "Advances in the design of freeform systems for imaging and illumination applications," Journal of Optics, 43, 261-268.
Ianchulev et al. (Jan. 2014) "Intraoperative refractive biometry for predicting intraocular lens power calculation after prior myopic refractive surgery," Ophthalmology 121: 56-60.
International Preliminary Report on Patentability, issued in connection with PCT Patent application No. PCT/US2016/013438, mailed on Jul. 27, 2017, 13 pages.
International Search Report and Written Opinion dated Jun. 11, 2019 in corresponding International Application No. PCT/US2019/021288.
International Search report and written opinion, issued in connection with PCT patent application No. PCT/US2016/013438, mailed on Jul. 1, 2016, 19 pages.
Jiao et al. (2010) "Photoacoustic ophthalmoscopy for in vivo retinal imaging," Opt Express 18(4): 3967-3972.
Kawata et al. (2001) "Finer features for functional microdevices," Nature, 412, 697.
Kopecek (2009) "Hydrogels: From Soft Contact Lenses and Implants to Self-Assembled Nanomaterials," Journal of Polymer Science Part a-Polymer Chemistry 47:5929-5946.
Kotz et al. (Apr. 2017) "Three-dimensional printing of transparent fused silica glass," Nature, 544, 337-339.
Kubal (2011) "Multifocal versus accommodating intraocular lenses: a review of the current technology, outcomes, and complications," Int Ophthalmol Clin 51(2): 131-141.
Laronda et al. (May 2017) "A bioprosthetic ovary created using 3D printed microporous scaffolds restores ovarian function in sterilized mice," Nat Commun, 8:15261.
Lee et al. (2000) "Processing of Organic/Inorganic Composites by Stereolithography," Mater. Res. Soc. Symp. Proc. 625, 165.
Li et al. (2005) "Photopolymerization of HEMA/DEGDMA hydrogels in solution," Polymer 46:11540-11547.

(56) References Cited

OTHER PUBLICATIONS

Liu et al. (2013) "Automatic retinal vessel segmentation based on active contours method in Doppler spectral-domain optical coherence tomography," J Biomed Opt 18(1): 016002, 4 pp.
Loughnan (1997) "Intraocular lens materials and styles," Australian and New Zealand Journal of Ophthalmology 25: 251-251.
Malinauskas et al. (2013) "Ultrafast laser nanostructuring of photopolymers: A decade of advances," Physics Reports, 533, 1.
Malitson (1965) "Interspecimen Comparison of the Refractive Index of Fused Silica," Journal of the Optical Society of America 55, 1205-1209.
Marcos et al. (Jan. 2014) "Three-dimensional evaluation of accommodating intraocular lens shift and alignment in vivo," Ophthalmology 121(1): 45-55.
Menapace et al. (2007) "Accommodating intraocular lenses: a critical review of present and future concepts," Graefe's Arch Clin Exp Ophthalmol 245: 473-489.
O'Brien (2003) "Advances in intraocular lens materials and designs: maximizing biocompatibility and optical performance," Ophthalmologica 217(Suppl 1):5-18; discussion 42.
Ong et al. (May 2014) "Accommodative intraocular lens versus standard monofocal intraocular lens implantation in cataract surgery," Cochrane Database Syst Rev 2014, 5: CD009667, 38 pp.
Pan et al. (2012) "Smooth surface fabrication in mask projection based stereolithography," Journal of Manufacturing Processes 14:460-470.
Pan et al. (Oct. 2016) "Meniscus process optimization for smooth surface fabrication in Stereolithography" Additive Manufacturing, vol. 12, Part B, 321-333.
Pan et al. (Sep. 2015) "Smooth Surface Fabrication Based on Controlled Meniscus and Cure Depth in Microstereolithography," Journal of Micro and Nano-Manufacturing, 3, 031001.
Perez-Merino et al. (May 2014) "Aberrometry in patients implanted with accommodative intraocular lenses," Am J Ophthalmol 157(5): 1077-1089.e1.
Raman et al. (Mar. 2016) "High-Resolution Projection Microstereolithography for Patterning of Neovasculature," Adv. Healthcare Mater., 5, 610.
Rheims et al. (1997) "Refractive-index measurements in the near-IR using an Abbe refractometer," Meas Sci Technol, 8, 601.
Roach et al. (2012) "Eyes on Europe: New Options in Multifocal IOLs," AAO Newsletter, 16 pp.
Sager et al. (2008) "Use of parameter estimation for stereolithography surface finish improvement," Rapid Prototyping Journal, 14, 213-220.
Schaedler et al. (2011) "Ultralight Metallic Microlattices," Science, 334, 962-965.
Sheppard et al. (2010) "Accommodating intraocular lenses: a review of design concepts, usage and assessment methods," Clin Exp Optom 93: 441-452.
Song et al. (2012) "Integrating photoacoustic ophthalmoscopy with scanning laser ophthalmoscopy, optical coherence tomography, and fluorescein angiography for a multimodal retinal imaging platform," J Biomed Opt 17(6): 061206, 7 pp.
Song et al. (publicly available Oct. 2014) "A combined method to quantify the retinal metabolic rate of oxygen using photoacoustic A2ophthalmoscopy and optical coherence tomography," Sci Rep (2015) 4: 6525, pp. 1-7.
Sun et al. (2002) "Experimental and numerical investigations on microstereolithography of ceramics," Journal of Applied Physics 92(8):4796-4802.
Sun et al. (2002) "The influences of the material properties on ceramic micro-stereolithography," Sensors and Actuators A: Physical 101:364-370.
Sun et al. (2005) "Projection micro-stereolithography using digital micro-mirror dynamic mask," Sensors and Actuators A: Physical 121:113-120.
Tao et al. (Feb. 2014) "Annealing of Compression Molded Aspherical Glass Lenses," J Manuf Sci Eng., 136(1): 011008.
Thiele et al. (Feb. 2017) "3D-printed eagle eye: Compound microlens system for foveated imaging," Sci Adv, 3.
Tomas-Juan et al. (publicly available Sep. 2014) "Axial movement of the dual-optic accommodating intraocular lens for the correction of the presbyopia: Optical performance and clinical outcomes," J Optom (2015) 8: 67-76.
Tseng et al. (2012) "Risk of fractures following cataract surgery in Medicare beneficiaries," JAMA 308(5): 493-501.
Turner et al. (2013) "Miniature chiral beamsplitter based on gyroid photonic crystals," Nat Photonics, 7, 801.
Van Lith et al. (Oct. 2016) "3D-Printing Strong High-Resolution Antioxidant Bioresorbable Vascular Stents," Adv. Mater. Technol., 1, 1600138.
Van Meerbergen et al. (2002) "A Hierarchical Symmetric Stereo Algorithm Using Dynamic Programming," International Journal of Computer Vision 47(1/2/3):275-285.
Wei et al. (2011) "Image chorioretinal vasculature in albino rats using photoacoustic ophthalmoscopy," J Mod Opt 58(21): 1997-2001.
Werner (2008) "Biocompatibility of intraocular lens materials," Curr Opin Ophthalmol 19: 41-49.
Wilkins et al. (2013) "Randomized trial of multifocal intraocular lenses versus monovision after bilateral cataract surgery," Ophthalmology 120(12): 2449-2455.e1.
Wong et al. (2012) "A Review of Additive Manufacturing," ISRN Mechanical Engineering 2012, Article ID 208760.
Yang et al. (Apr. 2017) "In vivo imaging of neural activity," Nat Methods, 14, 349.
Yi et al. (2013) "Visible-light optical coherence tomography for retinal oximetry," Opt Lett. 38(11):1796-1798.
Yi et al. (publicly available Sep. 2014) "In vivo functional microangiography by visible-light optical coherence tomography," Biomed Opt Express 5:3603-3612 (published Oct. 2014).
Yi et al. (Sep. 2015) "Visible light optical coherence tomography measures retinal oxygen metabolic response to systemic oxygenation," Light: Science & Applications 4: e334, pp. 1-10.
Zhang et al. (1999) "Micro-stereolithography of polymeric and ceramic microstructures," Sensors and Actuators A: Physical 77:149-156.
Zheng et al. (Jun. 2014) "Ultralight, ultrastiff mechanical metamaterials," Science, 344, 1373-1377.
Zheng et al. (Oct. 2016) "Multiscale metallic metamaterials," Nat Mater, 15, 1100.
Zhou et al. (2011) "Hiding a realistic object using a broadband terahertz invisibility cloak," Sci Rep. 1: 78, 1-5.
Zhou et al. (Apr. 2016) "Additive Manufacturing of a 3D Terahertz Gradient-Refractive Index Lens," Advanced Optical Materials, 4, 1034-1040.

* cited by examiner

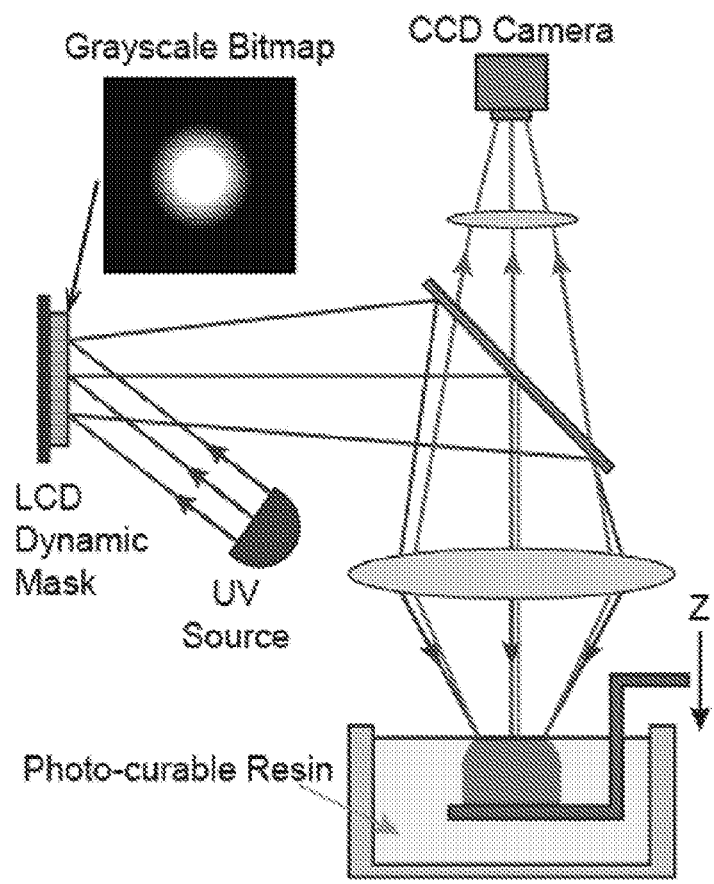
FIG. 6A
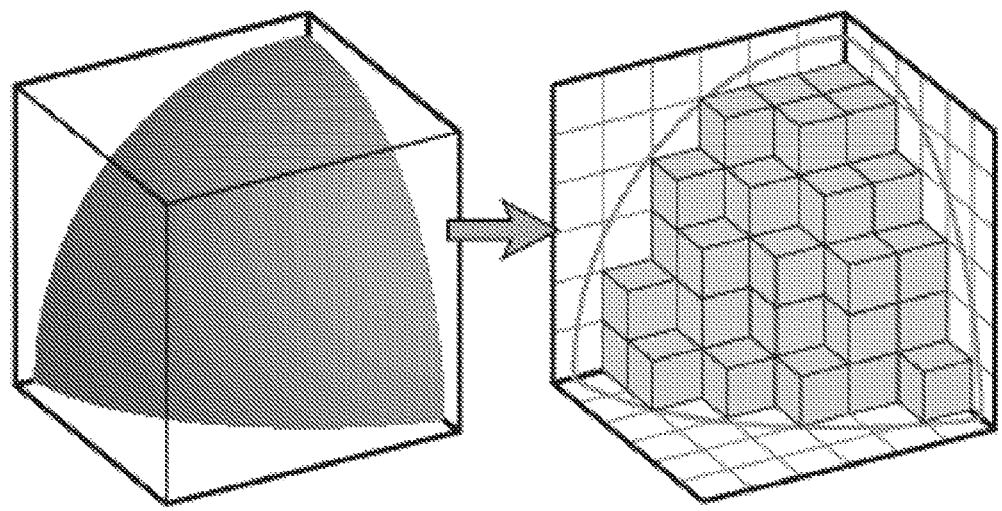
FIG. 6B  FIG. 6C

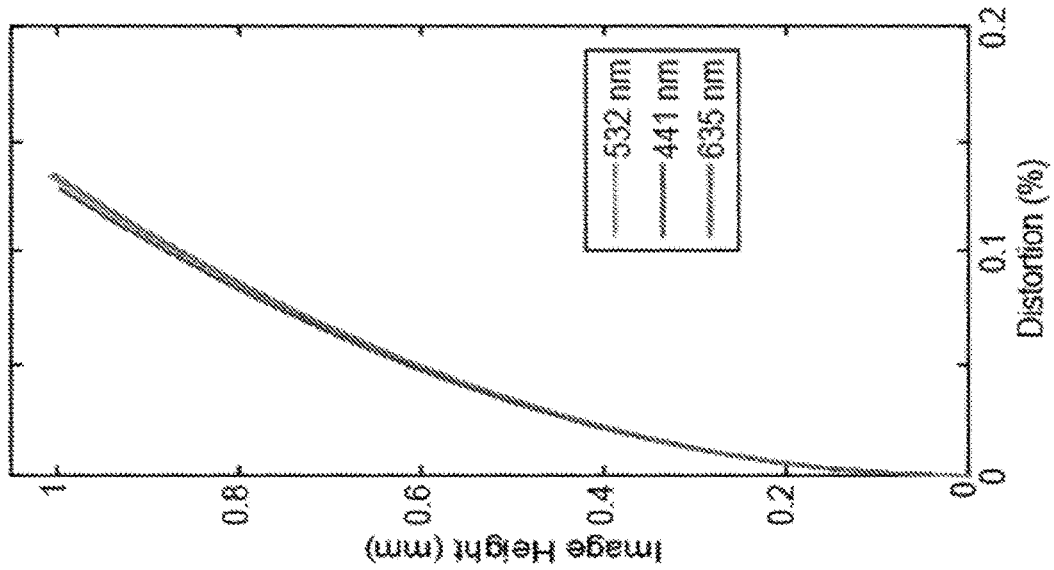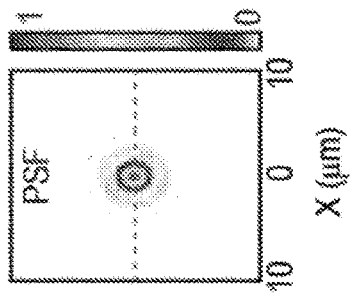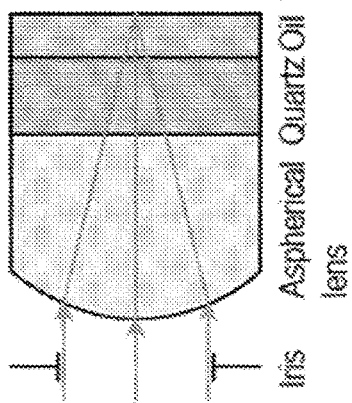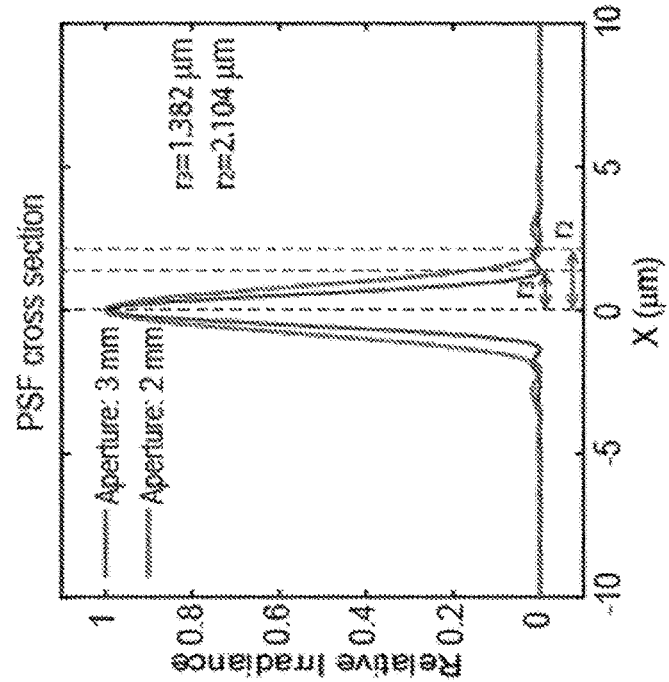

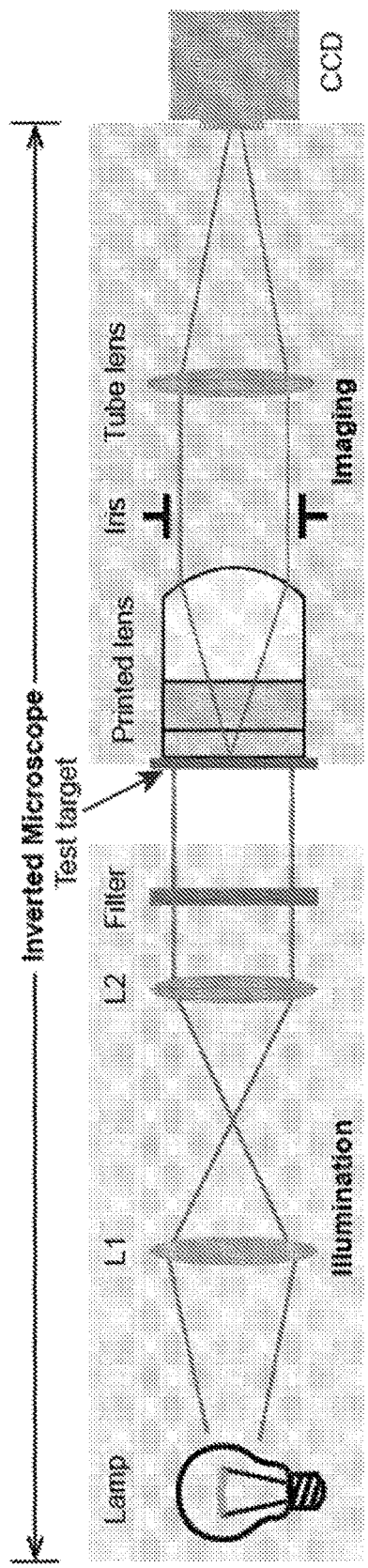
FIG. 12A
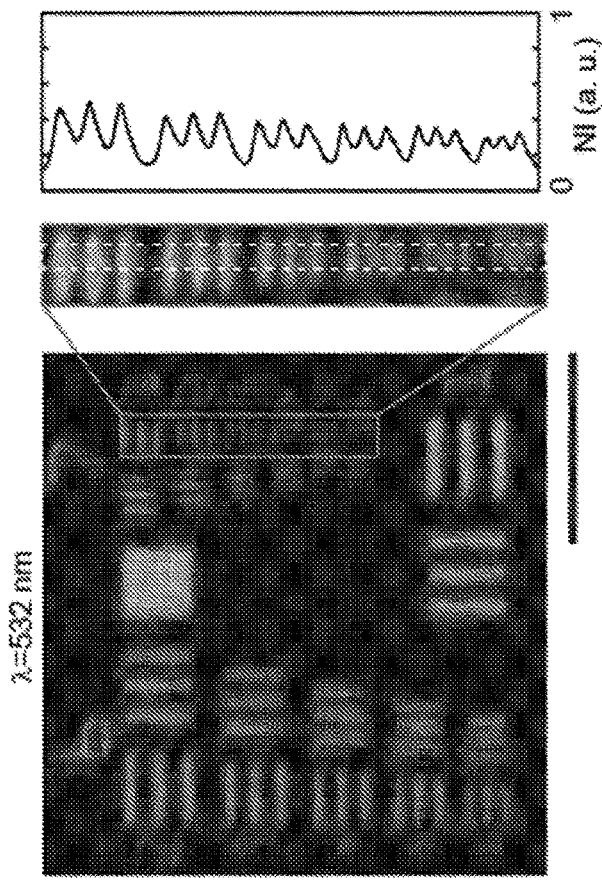
FIG. 12B
FIG. 12C

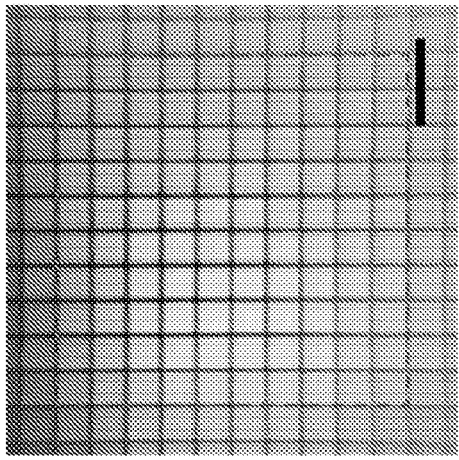
FIG. 14C  FIG. 14B  FIG. 14A
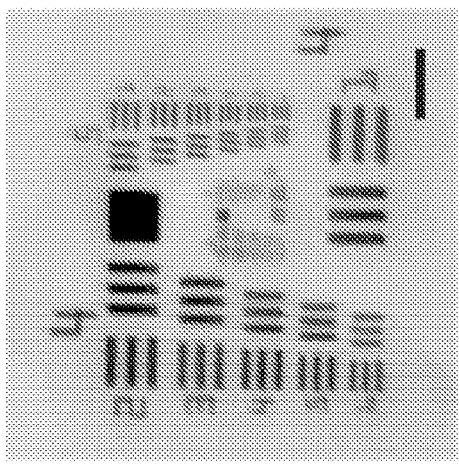
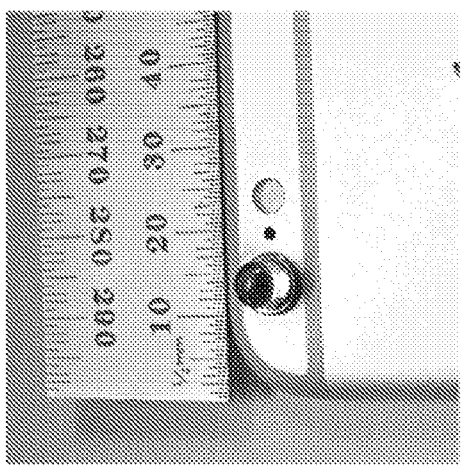
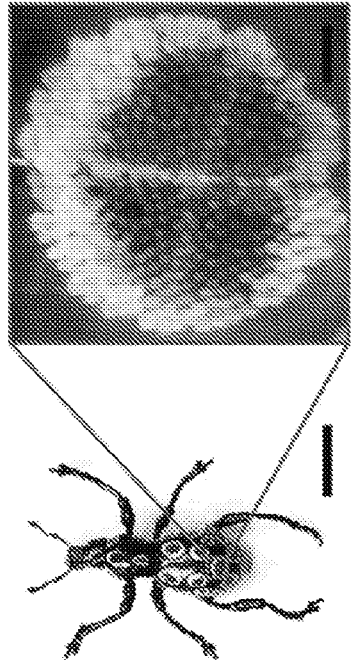
FIG. 14G  FIG. 14F
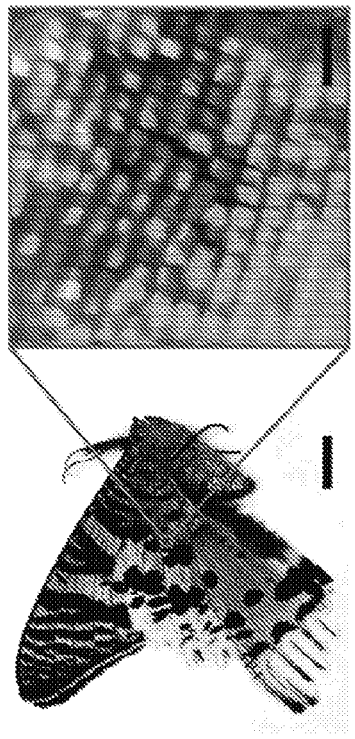
FIG. 14E  FIG. 14D 1034 — Forming a liquid meniscus of precursor material at a feature of the object

FIG. 22J

1036 — Forming the liquid meniscus comprises at least partially removing the object from a reservoir of the precursor material

FIG. 22K

1038 — Photohardening, thermally hardening, or both photohardening and thermally hardening the liquid meniscus of the precursor material to form the hardened meniscus coating at the feature of the object

FIG. 22L

1040 — Forming the liquid meniscus comprises at least partially removing the object from a reservoir of the precursor material

FIG. 22M

1042 — Moving the object with respect to a source of light while the meniscus of precursor material is photohardened

FIG. 22N

1044 — Forming a hardened meniscus coating at a plurality of features of the object

FIG. 22O

1046 — Modifying light to a first region light via the first grayscale region of the multi-region image 1048 — Modifying light to a second region light via the second grayscale region of the multi-region image 1050 — Photohardening a portion of the object via exposure of the precursor material to the first region light and the second region light

FIG. 22P

1052 — Thermally hardening a precursor material to form at least a portion of the object

FIG. 22Q

1054 — Photohardening the liquid meniscus of the precursor material to form the hardened meniscus coating at the feature of the object

FIG. 22R

HIGH-THROUGHPUT 3D PRINTING OF CUSTOMIZED ASPHERIC IMAGING LENSES

CROSS-REFERENCE TO RELATED APPLICATIONS

This application is a U.S. National Stage Application filed under 35 U.S.C. § 371 of International Application No. PCT/US2019/021288, filed Mar. 8, 2019 (Published as WO2019/173674), which claims the benefit of and priority to U.S. Provisional Patent Application No. 62/641,072, filed Mar. 9, 2018, each of which is hereby incorporated by reference in its entirety.

STATEMENT REGARDING FEDERALLY SPONSORED RESEARCH FOR DEVELOPMENT

This invention was made with government support under EEC-1530734 and DBI-1353952 awarded by the National Science Foundation. The government has certain rights in the invention.

BACKGROUND OF THE DISCLOSURE

Three-dimensional (3D) printing, also known as additive manufacturing (AM), refers to a process of creating 3D objects from a computer-aided design (CAD) model in a layer-by-layer fashion. The role of 3D printing has rapidly evolved beyond an industrial prototyping process to become a tool for manufacturing production-quality parts that are otherwise challenging to make using traditional methods.

3D printing has become a useful and important technique for manufacturing a variety of complex 3D structures. This method has been applied to the manufacturing of numerous devices and components, ranging from toys to jet engine parts. Generally, 3D printing provides an accessible and cost-efficient method for generating customizable objects. Devices and components that were previously too difficult, or too costly to manufacture using traditional fabrication methods can now be prototyped or commercially produced using 3D printing technology.

Despite the potential of 3D printing, current 3D printed components have been limited by 3D printing resolution. Generally, 3D printing resolution reflects the ability to control the thickness of individual layers or material added to the object during the printing process. Limitations of the material and manufacturing time also commonly limit 3D printing resolution, thus limiting object resolution and manufacturing precision. While this limitation has not prevented the application of 3D printing to application such as toy manufacturing, it has prevented its application to fabrication of objects requiring high precision and resolution.

BRIEF DESCRIPTION OF THE DRAWINGS

The novel features of a device of this disclosure are set forth with particularity in the appended claims. A better understanding of the features and advantages of this disclosure will be obtained by reference to the following detailed description that sets forth illustrative examples, in which the principles of a device of this disclosure are utilized, and the accompanying drawings of which:

FIG. 6A illustrates an example PμSL system.

FIG. 6B shows a three-dimensional (3D) solid model with smooth surfaces shown approximated as a set of discrete voxels.

FIG. 6C shows results in a pixelated, rough surface.

FIG. 9B shows an associated Huygens point spread function with the lens of FIG. 9A.

FIG. 9C depicts a cross section of a point spread function for different aperture.

FIG. 9D shows calculated distortion curves of the lens at different wavelengths.

FIG. 12A illustrates an example imaging system configuration using a 3D-printed lens.

FIG. 12B shows a recorded image of a resolution test target.

FIG. 12C depicts an averaged intensity profile at a position in FIG. 12B.

FIG. 14A shows a 3D-printed aspheric singlet lens attached to a cell phone camera.

FIGS. 14B-14G show example images taken to confirm the optical quality of the printed lens.

SUMMARY OF THE INVENTION

Figure 1:
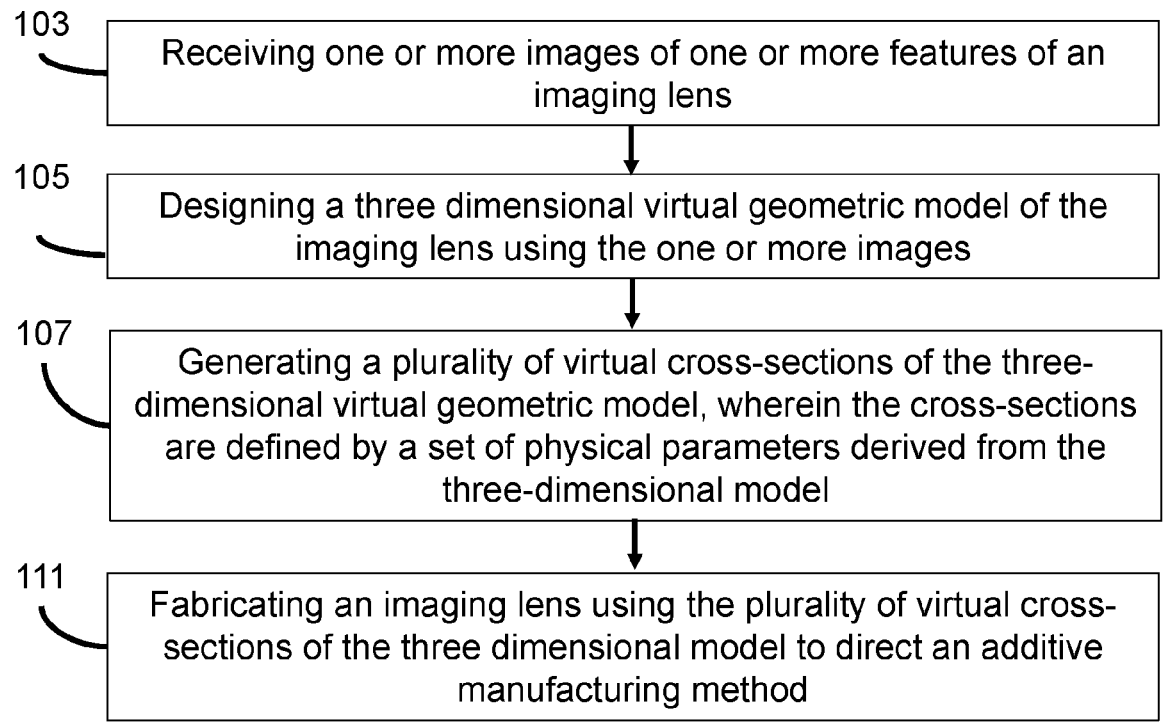
FIG. 1 is a flow diagram of an example method for additive manufacture of a three-dimensional object, according to certain embodiments disclosed herein.

Provided herein are methods, systems, and computer-readable storage media with instructions for additive manufacture of a three-dimensional object. For example, these methods and systems provided herein provide for fast and scalable manufacturing of objects having exceptional smoothness and small (e.g., micron-scale or less) features. Exemplary objects include, but are not limited to, lenses. For example, these lenses may be used in electronic devices where a small form factor and low weight are important. Certain conventional approaches fail to manufacture objects having the smoothness obtained via the methods disclosed herein. Certain conventional approaches fail to manufacture objects having the small sizes obtained via the methods disclosed herein. Certain conventional approaches fail to manufacture objects at the manufacturing speeds characterizing the methods and systems disclosed herein.

In an aspect, a method for additive manufacture of a three-dimensional object based on a computational model comprises steps of: grayscale photohardening a precursor material to form a portion of the object; and applying a hardened meniscus coating at a feature of the object; wherein the three-dimensional object is formed via at least the combination of the steps of grayscale photohardening and applying the meniscus coating. In some embodiments, the grayscale photohardening step is a grayscale photopolymerization step. In some embodiments, the applying a hardened meniscus coating step is a meniscus equilibrium post-curing step. In some embodiments, the additive manufacture of a three-dimensional object is optionally based on a computational model. In some embodiments, the additive manufacture of a three-dimensional object is not based a computational model.

In an aspect, a method for additive manufacture of a three-dimensional object comprises steps of: grayscale photohardening a precursor material to form a portion of the object; and applying a hardened meniscus coating at a feature of the object; wherein the three-dimensional object is formed via at least the combination of the steps of grayscale photohardening and applying the meniscus coating. In some embodiments, the grayscale photohardening step is a grayscale photopolymerization step. In some embodiments, the applying a hardened meniscus coating step is a meniscus equilibrium post-curing step.

In some embodiments, the step of grayscale photohardening comprises modifying light via a dynamic photomask and exposing the precursor material to the modified light. In some embodiments, the step of grayscale photohardening comprises photopolymerizing the precursor material. In some embodiments, the precursor material is a prepolymer. In some embodiments, the dynamic photomask comprises a device selected from the group consisting of a spatial light modulator (SLM), a projection unit based on digital light processing or DLP®, a digital micromirror device or a DMD®, a liquid crystal display (LCD), an image light amplification device or an ILA®, a liquid crystal on silicon (LCOS) device, a silicon X-tal reflective display (SXRD), a microelectromechanical system (MEMS), a deformable mirror device, and any combination thereof. In some embodiments, the dynamic photomask comprises an image having a pixel resolution of at least 100 pixel by 1,000 pixels (or, at least 10,000 pixels). In some embodiments, the dynamic photomask comprises an image having a pixel resolution of at least 640 by at least 480, at least 800 by at least 600, at least 960 by at least 720, at least 1024 by at least 768, at least 1280 by at least 960, at least 1400 by at least 1050, at least 1440 by at least 1080, at least 1600 by at least 1200, at least 1856 by at least 1392, at least 1920 by at least 1440, at least 2048 by at least 1536, at least 1280 by at least 720, at least 1920 by at least 1080, at least 2048 by at least 1080, at least 2560 by at least 1440, at least 3840 by at least 2160, or preferably for some applications at least 7680 by at least 4320. Optionally, the dynamic photomask includes a plurality of devices or components each capable of generating an independent (sub)image in order to produce the total grayscale image, having any of the resolutions mentioned here or any other resolution, of the dynamic photomask.

In some embodiments, the portion of the object formed during grayscale photohardening is a layer of the object. In some embodiments, the step of grayscale photohardening is performed a plurality of times, each step of grayscale photohardening forming a different portion of the object. For example, the step of grayscale photohardening can be performed at least 5 times, at least 10 times, at least 50 times, at least 100 times, or optionally at least 500 times. For example, a different layer or portion of the object is formed during each independent step of grayscale photohardening of the plurality of times the step is performed. In some embodiments, the step of grayscale photohardening is performed via a projection micro-stereolithography process, a continuous liquid interface production process, a stereolithography process, or other 3D printing process based on light-induced and/or heat-induced hardening of the precursor material.

In some embodiments, the step of grayscale photohardening comprises forming an up-facing feature, a down-facing feature, or both an up-facing feature and a down-facing feature. In some embodiments, the step of grayscale photohardening comprises forming an up-facing feature. In some embodiments, the step of grayscale photohardening comprises forming a down-facing feature. In some embodiments, the step of grayscale photohardening comprises forming both an up-facing feature and a down-facing feature. In some embodiments, the step of grayscale photohardening comprises simultaneously forming both an up-facing feature and a down-facing feature of the object.

In some embodiments, the step of grayscale photohardening comprises directing a source light onto the dynamic photomask, modifying the source light into a modified light via an image of the dynamic photomask, and directing the modified light to the precursor material. In some embodiments, the directed modified light is light reflected from at least a portion of the dynamic photomask. In some embodiments, at least a portion of the modified light directed to the precursor material is used to photoharden precursor material to form at least a portion of the object. In some embodiments, the step of grayscale photohardening comprises changing the dynamic photomask from having a first image to having a second image, each of the first image and the second image independently being a grayscale image. In some embodiments, changing the dynamic photomask from having a first image to having a second image is performed via a voltage signal. In some embodiments, the first image corresponds to a first virtual slice of the model and the second image corresponds to a second virtual slice of the model. In some embodiments, the first image corresponds to a first virtual slice of the model, such that light modified by the first image may form a first portion of the object similar or correspond to the first virtual slice, and the second image corresponds to a second virtual slice of the model, such that light modified by the first image may form a first portion of the object similar or correspond to the first virtual slice. In some embodiments, the model is a three-dimensional (3D) computer-aided design (CAD) model, the method further comprising slicing the model into at least the first virtual slice and the second virtual slice. In some embodiments, the step of grayscale photohardening comprises forming a first portion of the object via photohardening precursor material with light modified by the first image of the dynamic photomask and forming a second portion of the object via photohardening precursor material with light modified by the second image of the dynamic photomask.

In some embodiments, the dynamic photomask comprises a multi-region image, the multi-region image comprising at least two grayscale regions. In some embodiments, each grayscale region is characterized by a different function that defines a distribution of grayscale pixel values in space (or, a spatial grayscale distribution function). In some embodiments, the method comprises modifying light to a first region light via the first grayscale region of the multi-region image, modifying light to a second region light via the second grayscale region of the multi-region image, and photohardening a portion of the object via exposure of the precursor material to the first region light and the second region light; wherein the first region light corresponds to photohardening of an up-facing feature of the object and the second region light corresponds to photohardening of a down-facing feature of the object.

In some embodiments, the portion of the object has a variable thickness, the variable thickness corresponding to an image of the dynamic photomask. For example, the variable thickness of the portion of the object is non-uniform such that a first thickness of the portion is at least 1%, at least 5%, at least 10%, at least 20%, at least 50%, at least 100%, or at least 200% greater than a second thickness of the portion. In some embodiments, the portion thickness is substantially less than or substantially equal to 20 µm, optionally substantially less than or substantially equal to 10 µm, substantially less than or substantially equal to 5 µm, substantially less than or substantially equal to 1 µm, optional selected from the range of 1 µm to 20 µm or any value(s) therebetween inclusively, or optionally selected from the range of 5 µm to 20 µm.

In some embodiments, the method comprises exposing the precursor material to light modified by the dynamic photomask having the first image for a first exposure time selected from the range of greater than 0 seconds to 20 seconds, changing the dynamic photomask to a black image, moving a stage supporting the object, and exposing the precursor material to light modified by the dynamic photomask having the second image for a second exposure time selected from the range of greater than 0 seconds to 20 seconds. In some embodiments, an exposure time, such as the first exposure time or the second exposure time, is selected from the range of 0 seconds to 3600 seconds, or any time therebetween inclusively. In some embodiments, the step of grayscale photohardening being characterized by a fabrication speed substantially greater than 5 mm$^3$/h, substantially greater than or substantially equal to 10 mm$^3$/h, optionally substantially greater than or substantially equal to 20 mm$^3$/h, optionally substantially greater than or substantially equal to 50 mm$^3$/h, optionally substantially greater than or substantially equal to 75 mm$^3$/h, optionally substantially greater than or substantially equal to 100 mm$^3$/h, preferably for some applications selected from the range of 1 mm$^3$/h to 100 mm$^3$/h, or any speeds therebetween inclusively, or optionally selected from the range of 5 mm$^3$/h to 25 mm$^3$/h, or any speeds therebetween, inclusively.

In some embodiments, the step of applying the hardened meniscus coating comprises forming a liquid meniscus of precursor material at a feature of the object. In some embodiments, forming the liquid meniscus comprises at least partially removing the object from a reservoir of the precursor material. In some embodiments, forming the liquid meniscus comprises at least partially removing the object from a reservoir of the precursor material or applying the precursor material to the object. In some embodiments, forming the liquid meniscus comprises applying the precursor material to the object. In some embodiments, applying the precursor material, during the step of forming the liquid meniscus, comprises spraying, pouring, dispersing, ink jetting, another process for depositing a liquid precursor material (such as a prepolymer), or any combination of these. In some embodiments, the step of applying a hardened meniscus coating comprises photohardening the liquid meniscus of the precursor material to form the hardened meniscus coating at the feature of the object. In some embodiments, the step of applying a hardened meniscus coating comprises both photohardening and thermally hardening the liquid meniscus of the precursor material to form the hardened meniscus coating at the feature of the object. In some embodiments, the step of applying a hardened meniscus coating comprises thermally hardening the liquid meniscus of the precursor material to form the hardened meniscus coating at the feature of the object. In some embodiments, the step of photohardening the meniscus of precursor material comprises moving the object with respect to a source of light while the meniscus of precursor material is photohardened.

In some embodiments, the feature of the object is a corner feature, a step feature, a flat feature, or any combination of these. An exemplary flat feature is, but is not limited to, a top flat surface of a curved region or curved surface of the object. In some embodiments, the step of applying the hardened meniscus coating comprises forming a hardened meniscus coating at a plurality of features of the object. In some embodiments, the step of applying the hardened meniscus coating comprises simultaneously forming a hardened meniscus coating at a plurality of features of the object.

In some embodiments, the method further comprises thermally hardening a precursor material to form at least a portion of the object. In some embodiments, the step of applying a hardened meniscus coating comprises photohardening the liquid meniscus of the precursor material to form the hardened meniscus coating at the feature of the object.

In some embodiments, the hardened meniscus coating and the portion of the object are formed of substantially the same material. In some embodiments, the liquid meniscus is formed of the precursor material. In some embodiments, the precursor material and the object comprise a material selected from the group consisting of 1,6-hexanediol diacrylate (HDDA), poly(ethylene glycol) diacrylate (PEGDA), polymethyl methacrylate (PMMA), hydroxyethylmethacrylate (HEMA), a monomer, a prepolymer, and any combination thereof. In some embodiments, the precursor material and the object comprise a material selected from the group consisting of 1,6-hexanediol diacrylate (HDDA), poly(ethylene glycol) diacrylate (PEGDA), polymethyl methacrylate (PMMA), hydroxyethylmethacrylate (HEMA), and any combination thereof. In some embodiments, the precursor material further comprises at least one UV absorber material and/or at least one photoinitiator material. In some embodiments, the precursor material comprises particles and wherein the object comprises the particles. Exemplary particles include, but are not limited to, silica and alumina particles. In some embodiments, the precursor material is characterized by a viscosity selected from the range of 1 to 100,000 cp, or any viscosity value or range therebetween inclusively, at 20° C. In some embodiments, the photohardened precursor material has a refractive index selected from the range of substantially equal to 1.0 to substantially greater than or substantially equal to 2.0. In some embodiments, the photohardened precursor material has a refractive index is substantially equal to or is a value within 50% of 1.5.

In some embodiments, the method is characterized by a reproducibility characterized by a standard deviation of a surface profile of the lens of less than 3 µm over a 2 mm range of the diameter.

In some embodiments, the object has a feature characterized by at least one physical size dimension selected from the range of 100 µm to 100 cm. In some embodiments, the object is characterized by at least one physical size dimension selected from the range of 100 µm to 100 cm, or any physical size dimension(s) therebetween inclusively. For example, the object can have a length, width, or diameter greater than 2 mm, according to some embodiments. In some embodiments, the object has a feature characterized by at least one physical size dimension selected from the range of 100 µm to 100 cm, or any physical size dimension(s) therebetween inclusively. In some embodiments, the object has a feature characterized by at least one physical size dimension selected from the range of 100 µm to 100 cm, or any physical size dimension(s) therebetween inclusively, wherein the feature is further characterized by a dimensional accuracy of 1 µm to 10 µm, and wherein the feature is further characterized by a smoothness characterized by a root mean square (RMS) value selected from the range of 1 nm to 10 nm, inclusively.

In some embodiments, the three-dimensional object is a lens. In some embodiments, the three-dimensional object is a freeform optical element, device, or apparatus, such as a freeform lens. In an embodiment, a freeform optical element, device, or apparatus is free from rotational symmetry. In some embodiments, the lens is an aspherical lens. In some embodiments, the lens is characterized by a maximal imaging resolution of substantially greater than or substantially equal to 180 lp/mm, substantially greater than or substantially equal to 220 lp/mm, substantially greater than or substantially equal to 230 lp/mm, substantially greater than or substantially equal to 235 lp/mm, substantially greater than or substantially equal to 240 lp/mm, substantially greater than or substantially equal to 260 lp/mm, substantially greater than or substantially equal to 300 lp/mm, substantially greater than or substantially equal to 340 lp/mm, substantially greater than or substantially equal to 350 lp/mm, substantially greater than or substantially equal to 370 lp/mm, substantially greater than or substantially equal to 400 lp/mm, or optionally selected from the range of 180 lp/mm to 400 lp/mm, or any value(s) therebetween. In some embodiments, the lens is characterized by a maximal imaging resolution up to the light diffraction limit, such as hundreds of nanometers (e.g., 300 to 900 nm, inclusively).

In some embodiments, the lens is characterized by a field distortion of substantially less than or equal to 0.15% across a field of view substantially greater than or equal to 2 mm. In some embodiments, the lens is characterized by a field distortion of substantially less than or equal to 0.15% across a field of view substantially greater than or equal to 5 mm. In some embodiments, the lens is characterized by a field distortion of substantially less than or equal to 0.15% for light wavelengths of 441 nm, 532 nm, and/or 635 nm, within a field of view with object image height of 1 mm. In some embodiments, the lens is characterized by a field distortion closely matching a corresponding value of the computational model or a design of the object. In some embodiments, the lens is characterized by a theoretical optimal lateral resolution of substantially 2 µm for an aperture diameter of substantially 2 mm or a theoretical optimal lateral resolution of substantially 1.4 µm for an aperture diameter of substantially 3 mm. In some embodiments, the lens is characterized by a theoretical optimal lateral resolution substantially equal to or substantially less than 2 µm, substantially equal to or substantially less than 1 µm, substantially equal to or substantially less than 500 nm, or preferably for some applications substantially equal to 200 nm. In some embodiments, at least a portion of a surface of the object has a smoothness characterized by a root mean square (RMS) selected form the range of 5 to 10 nm, or any value(s) therebetween inclusively. In some embodiments, at least a portion of a surface of the object has a smoothness characterized by a root mean square (RMS) selected form the range of 1 to 50 nm, any value(s) therebetween inclusively, such as 5 nm to 20 nm or 5 nm to 50 nm. For example, a root mean square (RMS) measurement for characterizing smoothness of a surface may be measured using an optical interferometer, a surface profiler, a scanning electron microscope, an atomic force microscope, or any other art-known technique or method.

In some embodiments, an absolute value of ΔZ is less than a pixel dimension of the model, ΔZ being a difference between a value of a surface profile of the object and a value of a surface profile of the model at corresponding locations of the object and the model, respectively. In some embodiments, an absolute value of ΔZ is substantially less than or substantially equal to 3 μm within a region of the object having a dimension of 2 mm (e.g., 2 mm of a diameter). In some embodiments, an absolute value of ΔZ is substantially less than or substantially equal to 7.1, or substantially less than or substantially equal to 5 μm within a region of the object having a dimension of 2 mm (e.g., 2 mm of a diameter). In some embodiments, the absolute value of ΔZ is an average absolute value of ΔZ.

In an aspect, a system for additive manufacture of a three-dimensional object based on a computational model, the system comprising: a source of a precursor material or apparatus for delivery of the precursor material; a source of light; a dynamic photomask; a controller that controls at least the dynamic photomask; and an optical assembly for directing light to the dynamic photomask and for directing light modified by the dynamic photomask to the precursor material; wherein the controller is configured to change an image of the dynamic photomask to a first image to modify the light to a first modified light, such that a first portion of the object is formed via photohardening of the precursor material exposed to the first modified light, and the controller is configured to change the image of the dynamic photomask to a second image to modify the light to a second modified light, such that a second portion of the object is formed via photohardening of the precursor material exposed to the second modified light; wherein at least one of the first image and the second image is a grayscale image; wherein the system is further configured to apply a hardened meniscus coating at at least one feature of the object.

In some embodiments, the system is further configured to thermally harden a precursor material to form at least a portion of the object. In some embodiments, the system is further configured to photoharden, thermally harden, or both photoharden and thermally harden a liquid meniscus to form said hardened meniscus coating.

In some embodiments, the first image and the second image is a grayscale image. In some embodiments, the system comprises a stage configured to controllably move the object. In some embodiments, the system comprises the source of a precursor material and the controller is configured to remove at least a portion of the object from the reservoir such that a liquid meniscus of precursor material is formed at the least one feature of the object. In some embodiments, the system comprises the apparatus for delivery of the precursor material and wherein the apparatus is configured to apply the liquid meniscus of precursor material at the least one feature of the object. In some embodiments, the system is configured to allow the liquid meniscus of precursor material to photoharden into the solid meniscus coating via exposure to light.

In some embodiments, the controller controls a stage of the system. In some embodiments, a second controller controls a stage of the system. In some embodiments, the controller moves the stage between formation of the first portion and the second portion of the object. In some embodiments, the light directed to the precursor material is substantially unmodified while the liquid meniscus of precursor material is photohardened. In some embodiments, the controller changes the image of the dynamic photomask to a white or blank image such that light is substantially unmodified by the dynamic photomask while the meniscus of precursor material is photohardened. In some embodiments, the system comprises a computer configured to receive at least a portion of the computational model, the computer comprising computer-readable storage media for storing computer-readable instructions, which, when executed by a processor, cause the computer to send a signal to the controller based on the computational model.

In an aspect, a computer-readable storage medium includes instructions which, when executed, cause at least one processor to at least: form a grayscale image using a dynamic photomask, the grayscale image corresponding to at least a portion of a computational model of an object; photoharden a precursor material via light modified by the grayscale image of the dynamic photomask to form a first portion of the object; form a liquid meniscus of precursor material at at least one feature of the object; and photoharden the liquid meniscus to form a hardened meniscus coating at the at least one feature of the object.

In an aspect, also disclosed herein a method for additive manufacture of a three-dimensional object based on a computational model, the method comprising steps of: grayscale hardening a precursor material to form a portion of the object; and applying a hardened meniscus coating at a feature of the object; wherein the three-dimensional object is formed via at least the combination of the steps of grayscale photohardening and applying the meniscus coating. In some embodiments, the step of grayscale hardening comprises grayscale photohardening the precursor material to form a portion of the object. In some embodiments, the step of grayscale hardening comprises thermally hardening the precursor material to form a portion of the object.

Also disclosed herein are methods for additive manufacture of a three-dimensional object, the methods having and/or providing for any one or combination of embodiments of the methods, systems, and computer-readable storage media disclosed herein. Also disclosed herein are systems for additive manufacture of a three-dimensional object, the systems having and/or providing for any one or combination of embodiments of the methods, systems, and computer-readable storage media disclosed herein. Also disclosed herein are computer-readable storage media with instructions for additive manufacture of a three-dimensional object, the media having and/or providing for any one or combination of embodiments of the methods, systems, and computer-readable storage media disclosed herein.

Statements Regarding Chemical Compounds and Nomenclature

In general, the terms and phrases used herein have their art-recognized meaning, which can be found by reference to standard texts, journal references and contexts known to those skilled in the art. The following definitions are provided to clarify their specific use in the context of the invention.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer may be used interchangeably. In some embodiments, a resin is an exemplary prepolymer. In some embodiments, a "prepolymer" refers to a starting monomer, monomer mixture, mixture comprising one or more monomers where the monomer(s) have been reacted to an intermediate molecular mass state, resin, and/or polymer, which can be further cross-linked upon exposure to actinic radiation and/or heat to obtain a cross-linked polymer having a molecular weight higher than the starting prepolymer. Examples of actinic radiation are UV irradiation, ionized radiation (e.g. gamma ray or X-ray irradiation), microwave irradiation, and the like. In some embodiments, a "prepolymer" refers to a starting monomer, monomer mixture, mixture comprising one or more monomers where the monomer(s) have been reacted to an intermediate molecular mass state, resin, and/or polymer, which can be further hardened upon exposure to actinic radiation and/or heat to obtain a further hardened polymer having a hardness higher than the starting prepolymer.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

The term "feature" refers to a portion, structure, surface, or other feature of an object. Exemplary features include, but are not limited to, corner or corner-like features, step or step-like features, flat surfaces, curved surfaces, and any combinations of these.

The term "average," when used in reference to a property of a material, feature, or object, refers to a calculated arithmetic mean of at least two, or preferably at least three, identical measurements or calculations of said property. For example, an average maximal imaging resolution of a lens is the arithmetic mean of at least two measurements performed identically, of the maximal imaging resolution of said lens. In some embodiments, the at least two measurements are performed at different portions of the object.

The term "additive manufacture" refers to a process for forming a structure, feature, element, object, or a combination of these, via deposition, or otherwise building up, of a material. The terms "additive manufacture process" and "additive manufacturing process" may be used interchangeably. An additive manufacture process may involve layer-by-layer deposition of a material to form a complex three-dimensional structure, feature, object, or combination of these. The deposited material may include, but is not limited to, inorganic materials, hybrid organic-inorganic materials, polymers, metals, or combinations of these. Exemplary additive manufacture processes include, but are not limited to, 3D printing, stereolithography (SLA), microstereolithography, and projection micro-stereolithography (PμSL), and any combinations thereof. In some embodiments, an additive manufacture process does not require a subtractive manufacture to form the structure or element. Examples of subtractive manufacture processes include, but are not limited to, milling, machining, electron discharge machining, carving, shaping, grinding, drilling, and etching. In an embodiment, an additive manufacture process involves or is aided by computer-aided design (CAD) of a computational (e.g., CAD) model based on which an object is manufactured via the additive manufacture process. A photohardening or photopolymerization process of an additive manufacture process can be carried out continuously without layers; discontinuously (either with same or different or variable layer thicknesses); partially continuously and partially discontinuously (discontinuously either with same or different or variable layer thicknesses); or in a combination of various possibilities. In some embodiments, the additive manufacture process is particularly suitable for building a three-dimensional object in a voxel matrix independent from layers or using layers. In some examples, additive manufacturing may include but is not limited to selective laser sintering, direct laser sintering, casting and/or stamping.

The term "computational model" refers to a computer-aided design (CAD) model. A model may be of a three-dimensional (3D) object, feature, element, structure, or combination of these. A computational model can be stored on computer-readable storage medium, such as a hard disk drive (HDD), a solid-state drive (SSD), read-only memory (ROM), and/or random-access memory (RAM). The computational model may be read or processed with the aid of a computer processor via software, or computer-readable instructions. The computational model can be processed, for example, by computationally slicing the model into virtual slices, layers, or portions and/or dividing the model into pixels and/or voxels. For example, a virtual slice of a model may correspond to one of a plurality of layers of an object formed by an additive manufacture process, where the object or layer(s) thereof is formed based on the computational model.

The term "substantially" refers to a property, condition, or value that is within 20%, 10%, within 5%, within 1%, optionally within 0.1%, or is equivalent to a reference property, condition, or value. The term "substantially equal", "substantially equivalent", or "substantially unchanged", when used in conjunction with a reference value describing a property or condition, refers to a value that is within 20%, within 10%, optionally within 5%, optionally within 1%, optionally within 0.1%, or optionally is equivalent to the provided reference value. For example, a diameter is substantially equal to 3 mm (or, "is substantially 3 mm") if it the value of the diameter is within 20%, optionally within 10%, optionally within 5%, optionally within 1%, within 0.1%, or optionally equal to 3 mm. The term "substantially greater", when used in conjunction with a reference value describing a property or condition, refers to a value that is at least 1%, optionally at least 5%, optionally at least 10%, or optionally at least 20% greater than the provided reference value. The term "substantially less", when used in conjunction with a reference value describing a property or condition, refers to a value that is at least 1%, optionally at least 5%, optionally at least 10%, or optionally at least 20% less than the provided reference value.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

The term "dynamic photomask" refers to a device or element that may provide a light masking, light filtering effect, or otherwise light altering effect, wherein the light masking or light filtering effect of the dynamic photomask may be altered, modified, or changed. For example, the light masking, light filtering effect, or otherwise light altering effect can be changed in-situ, or during the additive manufacture process, optionally without requiring the stopping or pausing of the process to change the light masking, light filtering effect, or otherwise light altering effect. In some embodiments, the light masking, light filtering effect, or otherwise light altering effect of the dynamic photomask can be changed indirectly or indirectly as a result of an electronic signal and/or computer-readable instructions. In some embodiments, the light masking, light filtering effect, or otherwise light altering effect of the dynamic photomask can be changed indirectly or indirectly via voltage signal(s) applied to, at, or within the dynamic photomask. Exemplary dynamic photomasks include, but are not limited to, devices selected from the group consisting of a spatial light modulator (SLM), a projection unit based on digital light processing or DLP®, a digital micromirror device or a DMD®, a liquid crystal display (LCD), an image light amplification device or an ILA®, a liquid crystal on silicon (LCOS) device, a silicon X-tal reflective display (SXRD), a microelectromechanical system (MEMS), a deformable mirror device, and any combination thereof. The light masking, light filtering effect, or otherwise light altering effect can comprise transmission, reflection, absorption, diffraction, and/or scattering of light. The light masking, light filtering effect, or otherwise light altering effect can include changing the intensity and/or spectrum of the light modified by the light masking, light filtering effect, or otherwise light altering effect. For example, the dynamic photomask can accomplish the light masking, light filtering effect, or otherwise light altering effect via an image, such as an image displayed or otherwise formed by the dynamic photomask such that light interacts with said image.

The term "grayscale image," when referring to a dynamic photomask, refers to an image displayed or otherwise formed by a dynamic photomask for the purpose of providing a light filter or light masking effect, wherein the imagine comprises a plurality of pixels, each pixel corresponding to a light intensity (or, light amount) value. The grayscale image includes at least two pixels having different light intensities values with respect to each other. Light intensity represented by each pixel can correspond to white, black, or a gray-tone. In some embodiments, a grayscale image is an 8-bit grayscale image, wherein each pixel corresponds to a 256 shades, tones, or intensity values. An intensity of light interacting with a pixel can be reduced according to the shade, tone, or intensity value of the pixel. In some embodiments, a grayscale image may also comprise transparent portions or pixels. In some embodiments, light is directed to an image of a dynamic photomask, light interacts with said image, and light modified by the image, or pixels thereof, is reflected from the image. In some embodiments, said reflected light is used to photopolymerize a precursor material to form an object, or portion thereof. In some embodiments, light transmitted through an image is used to photopolymerize a precursor material to form an object, or portion thereof.

The term "photoharden" or "photohardening" refers to hardening of a precursor material due to interaction of said material with light. An exemplary photohardening process is photopolymerization, such as photopolymerization of a prepolymer, or portion thereof, to a polymer, such as via light-induced cross-linking of prepolymer to form a polymer. The term "grayscale photoharden" or "grayscale photohardening" refers to hardening, such as photopolymerization, of a precursor material due interaction of said precursor material with light modified by a grayscale image of a dynamic photomask. Grayscale photopolymerization is an exemplary grayscale photohardening process. The term "hardening" may include photohardening and/or heat-induced hardening. In some embodiments, "hardening" refers to an increase in a hardness of a material, object, feature, element, or any portion or any combination of these. In some embodiments, "hardening" refers to cross-linking of a prepolymer material, optionally increasing its molecular weight with respect to its molecular weight before hardening.

The term "light" refers to electromagnetic radiation, such as, but not limited to, ultraviolet light, visible light, infrared light, or any combination thereof.

Application of a hardened meniscus coating, or "applying a meniscus coating," refers generally refers to a meniscus equilibrium post-curing process, or any one or combination of steps thereof, as described herein.

The term "precursor material" refers to a material that can undergo photohardening or photopolymerization, such as a prepolymer.

Figure 8A:
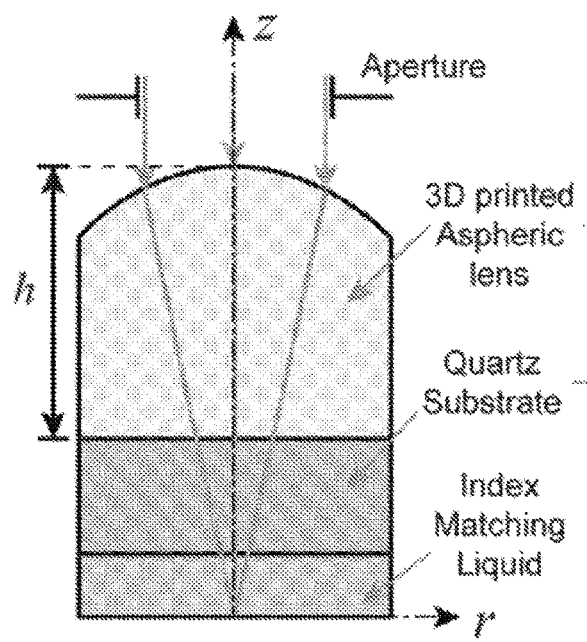
FIG. 8A illustrates an example optical setup for aspheric lens configuration.

In some embodiments, the term "up-facing" describes a feature that is curved or angled such that its surface normal (or, the normal to its surface) along the curve or at the vertex points toward a source of light that is used for photohardening the feature. For example, in some additive manufacturing techniques light, which is used for photohardening, is directed to the precursor material from above the object, and in some additive manufacturing techniques the light is directed to the precursor material from below the object. In some embodiments, the term "up-facing" describes a feature that is curved or angled such that its surface normal (or, the normal to its surface) along the curve or at the vertex points toward a direction opposite of the direction of gravity, or within ±89.9 degrees and opposite of said direction of gravity. In some embodiments, the term "up-facing" describes a feature that is curved or angled such that its surface normal (or, the normal to its surface) along the curve or at the vertex points toward a direction in which the feature, or object having said feature, is additively manufactured (e.g., toward the direction along which subsequent layers are formed). For example, the top surface of the lens shown in FIG. 8A is curved such that its surface normal (or, the normal to its surface) along the curve points (i) toward a direction in which the feature, or object having said feature, is additively manufactured, (ii) toward a direction opposite of the direction of gravity, or within ±90 degrees and opposite of said direction of gravity, as well as (iii) toward a source of light that is used for photohardening the feature (assuming the lens was manufactured starting with the bottom portion and ending with the top portion, as shown on the page, and the light for photohardening came from above the top of the lens as picture).

In some embodiments, the term "down-facing" describes a feature that is curved or angled such that its surface normal (or, the normal to its surface) along the curve or at the vertex points away from a source of light that is used for photo-hardening the feature. In some embodiments, the term "down-facing" describes a feature that is curved or angled such that its surface normal (or, the normal to its surface) along the curve or at the vertex points toward the direction of gravity, or within ±89.9 degrees of said direction of gravity. In some embodiments, the term "down-facing" describes a feature that is curved or angled such that its surface normal (or, the normal to its surface) along the curve or at the vertex points away from a direction in which the feature, or object having said feature, is additively manufactured (e.g., toward the direction along which subsequent layers are formed).

The term "meniscus" or "liquid meniscus" refers to a curve of a liquid or a liquid having a curved surface, where the curve is caused by surface tension or capillary action. In some embodiments, a liquid meniscus, such as a liquid meniscus formed of a precursor material such as a prepolymer, is hardened, photohardened, or photopolymerized to form a hardened meniscus coating. In some embodiments, a liquid meniscus is hardened, photohardened, or photopolymerized into a hardened meniscus coating such that the liquid meniscus and the hardened meniscus coating have the same or substantially the same shape, optionally also having the same or substantially the same size dimensions. In some embodiments, hardening of a liquid meniscus, to form a hardened meniscus coating, is achieved or performed via heat, light, or a combination of these.

The term "maximal imaging resolution" refers to the size or dimension of the finest feature that can be resolved in an image, such as an image formed by a lens.

The term "field distortion" refers to spatial deformation of the formed optical image in comparison with the original objects.

The term "theoretical optimal lateral resolution" refers to the theoretical upper limit of the attainable imaging resolution given the numerical aperture and the operating wavelength of the light. It is determined by the diffraction limit of the light.

The term "surface profile" such as when referring to the measurement of $\Delta Z$, refers to a surface morphology or geometry of an object, such as a lens. Exemplary descriptions of and methods for determining at least maximal imaging resolution, field distortion, theoretical optimal lateral resolution, and surface profile is provided in the Bass, et al. ["Handbook of Optics, Vol. 2: Devices, Measurements, and Properties", Second Edition 2nd edition by Optical Society Of America, 1994, edited by Michael Bass, et al. (ISBN 0-07-047974-7)], which is incorporated herein by reference in its entirety to the extent not inconsistent herewith.

The term "spatial grayscale distribution function" refers to a mathematic relationship or dependence of a grayscale pixel value of a grayscale image, or portion or region of said grayscale image, with respect to a spatial position or coordinate of the grayscale image. A radial spatial grayscale distribution function is an exemplary spatial grayscale distribution function describing a mathematical relationship or dependence (e.g., such as a linear or exponential dependence) of grayscale pixel values with respect to radial coordinate points of a grayscale image, such as a grayscale image having rotational symmetry. Exemplary descriptions of and methods for determining a spatial grayscale distribution function is provided in the Chen, et al. [Xiangfan Chen, Wenzhong Liu, Biqin Dong, Jongwoo Lee, Henry Oliver T. Ware, Hao F. Zhang, & Cheng Sun, "High-speed 3D printing millimeter-size customized aspheric imaging lenses with sub-7 nm surface roughness", Advanced Materials, 30(18), 1705683, (2018)], which is incorporated herein by reference in its entirety to the extent not inconsistent herewith.

Ranges can be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint. The term "about" as used herein refers to a range that is 15% plus or minus from a stated numerical value within the context of the particular usage. For example, about 10 would include a range from 8.5 to 11.5.

Thus, certain examples enable production of aspheric imaging lenses 3D-printed with precision control of 7-10 micron to produce a lens with a roughness of no more than 50 nm. An optical element can be formed using liquid crystal on silicone, for example, via a PµSL system. Grayscale fabrication can be applied for improved control and better transitions between pixels for step-case smoothing. Grayscale fabrication defines a baseline lens, and a liquid meniscus coating can be applied to smooth the lens, providing a spherical surface with high resolution and minimal distortion.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE DISCLOSURE

The following detailed description of certain examples of the present disclosure will be better understood when read in conjunction with the appended drawings. For the purpose of illustrating the disclosure, certain examples are shown in the drawings. It should be understood, however, that the present disclosure is not limited to the arrangements and instrumentality shown in the attached drawings.

I. General Overview

Translating 3D printing into the optical realm can dramatically improve process(es) to fabricate customized optical elements, which is time-consuming and costly due to limitations with conventional methods, such as multiaxial lathes polishing, magnetorheological finishing, molding, and ion beam finishing techniques.

Dimensional accuracy and surface finish, which are critical to the performance of optical elements, are determined by the size of voxels (e.g., a minimum fabricatable unit) used in the 3D printing process. A logical strategy for improving the accuracy and surface finish requires the reduction of the voxel size. Certain examples reduce voxel size using a femtosecond 3D printing process, which produces a sub-diffraction-limited feature size down to the 100 nm scale in a point-by-point scanning fashion. Certain examples provide direct 3D-printed compound lens systems using a variety of free-form micro-optical components with sub-micron accuracy. However, due to the point-by-point scanning mechanism, the total fabrication time is proportional to $$\left(\frac{\text{dimension}}{\text{voxel size}}\right)^3.$$

Therefore, reducing the voxel dimensions significantly slows down the 3D printing process. For example, reducing the voxel size by 10 times results in a 1000 times increase in fabrication time. The building speed using sub-100 nm voxels is reduced to ~$1.70 \times 10^{-3}$ mm$^3$/h, in which fabricating millimeter-sized optical elements will take weeks. The required expensive femtosecond laser source further constrains the cost-effectiveness of the femtosecond 3D printing process. Thus, increasing 3D printing speed without compromising its accuracy is a critical challenge.

Figure 2:
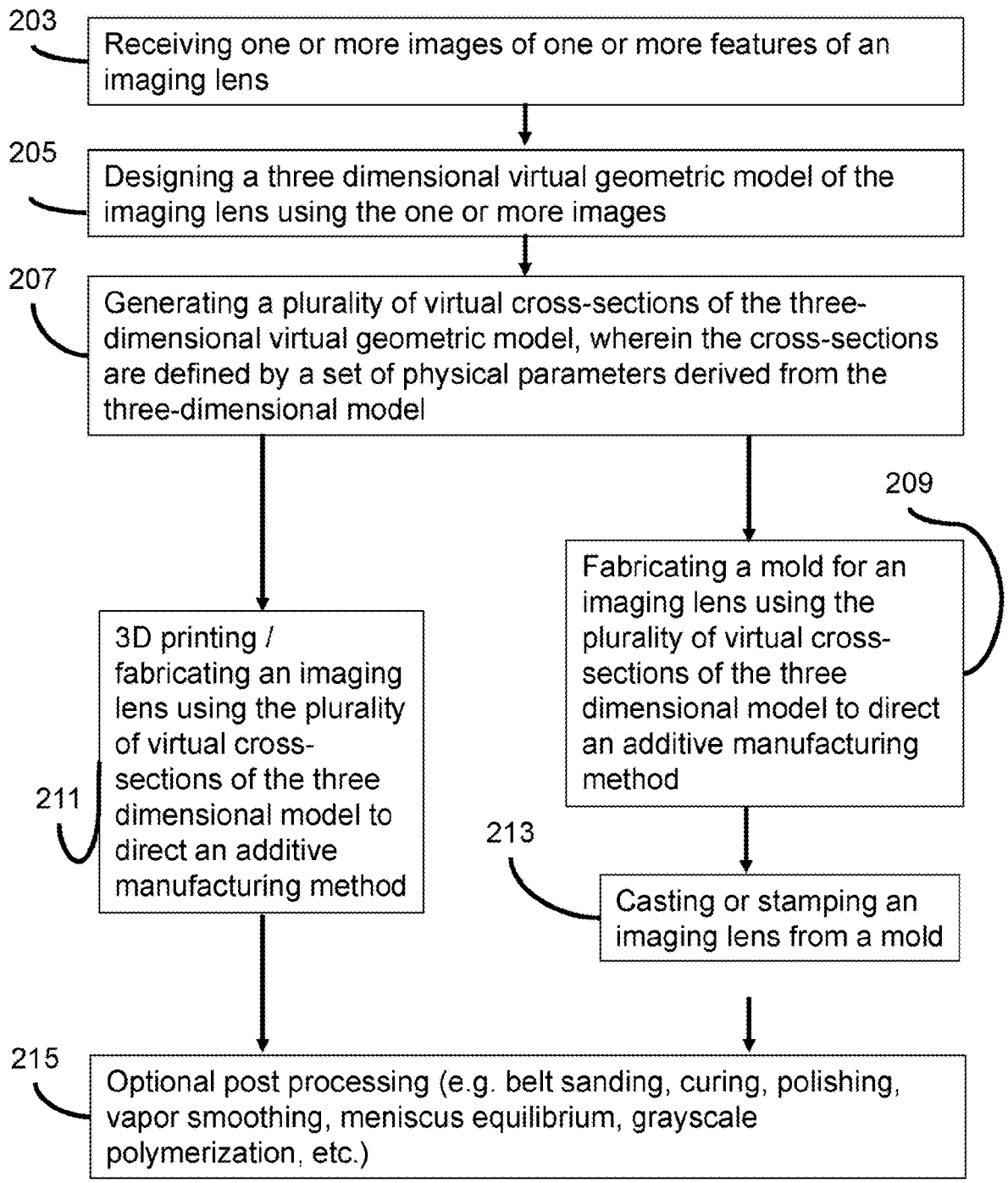
FIG. 2 is a flow diagram of an example method for additive manufacture of a three-dimensional object, according to certain embodiments disclosed herein.

Devices, methods, and systems of the present disclosure provide a method, such as the methods illustrated in FIG. 1 and FIG. 2, for fabricating an imaging lens, the method including receiving one or more images of one or more features of the target imaging lens, 103, 203 designing a three dimensional virtual geometric model of the imaging lens using the one or more images, 105, 205, generating a plurality of virtual cross-sections of the three-dimensional virtual geometric model, wherein the cross-sections are defined by a set of physical parameters derived from the three-dimensional model, 107, 207 and fabricating the imaging lens using the plurality of virtual cross-sections of the three dimensional model to direct an additive manufacturing method, 111, 211. In some examples, such as in FIG. 2, after generating a plurality of virtual cross-sections of the three-dimensional virtual geometric model, wherein the cross-sections are defined by a set of physical parameters derived from the three-dimensional model, fabricating a mold for an imaging lens using the plurality of virtual cross-sections of the three dimensional model to direct an additive manufacturing method may be employed, 209, followed by casting or stamping an imaging lens from a mold, 213. An optional step of post processing, 215, (e.g. belt sanding, curing, polishing, vapor smoothing, meniscus equilibrium, grayscale polymerization, etc.) may also be employed after fabrication.

Figure 3:
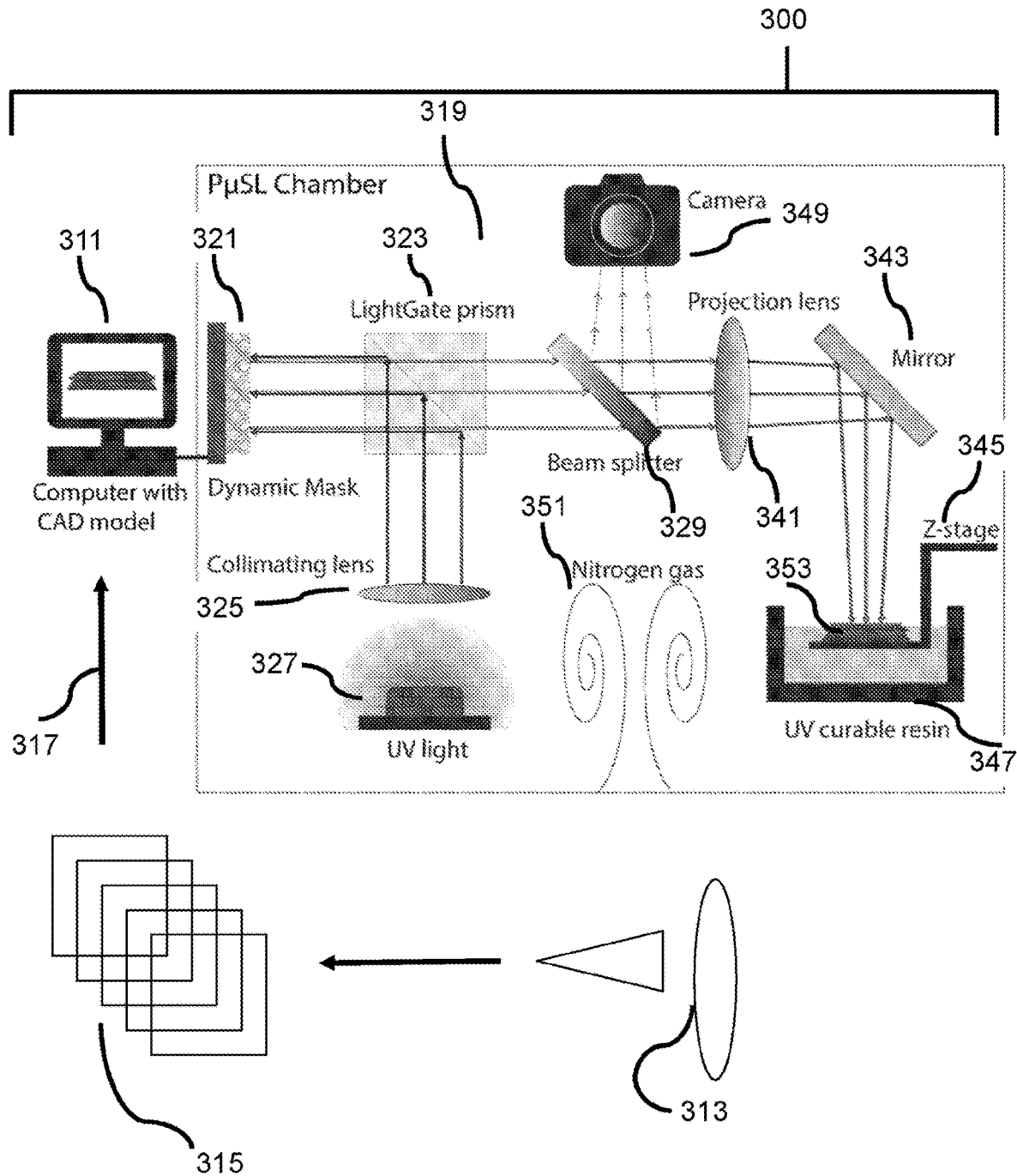
FIG. 3 is a schematic of a system for additive manufacture of a three-dimensional object, according to certain embodiments disclosed herein.

Additionally, the devices, methods, and systems of the present disclosure also provide, as shown in the example of FIG. 3, a system 300, for additive manufacture of a three-dimensional object, according to certain embodiments, including a computer system 311 (which is an exemplary controller, according to some embodiments) configured to receive 317 one or more images 315 of features of the first eye of a subject imaging lens 313. The computer system 311 is particularly programmed to process the received 317 image(s) 315 of the lens to form a three-dimensional geometric model (a computational model) of an imaging lens (an exemplary three-dimensional object) based on the image(s) 315. The particularly programmed computer system 311 further processes the model to mathematically slice the three-dimensional mathematical model into a plurality of cross-sections. Each cross section is defined by a set of physical parameters derived from the three-dimensional model. The computer system 311 provides the plurality of virtual cross-sections (virtual slices) from the three-dimensional model to direct an additive manufacturing process such as using a Projection Micro-stereolithography system (PμSL) chamber 319. The chamber 319 receives the plurality of cross-sections of the model from the computer 311 and fabricates an imaging lens (an exemplary three-dimensional object) using the plurality of virtual cross-sections of the computational model.

For example, the chamber 319 shown in FIG. 3 includes a dynamic photomask 321 (e.g., a bitmap mask) generated based on the cross-sections from the computer 311. A source of light can be a lamp, for example, or other source incorporated into the system or the source of light can be an entry path for light to the system from an external, or unincorporated, source of light. Light 327, such as UV light, is directed through a collimating lens 325 and a prism 323 (exemplary components of an optical assembly). The light then passes through a beam splitter 320, a projection lens 341, and is reflected on a mirror 343 to a wafer 353, such as a silicon wafer, in a z-stage 345 basin or other receptacle (a source of precursor material) with a supply of UV curable resin 347 to form an imaging lens. A camera 349 can be used to visualize an image on the wafer 353 in the chamber 319, which is filled with a gas 351, such as nitrogen gas.

Further examples of the system and methods used for fabricating a customized aspheric imaging lens using an additive manufacturing process are described herein.

II. Designing a 3D Virtual Model of the Imaging Lens

Figure 4:
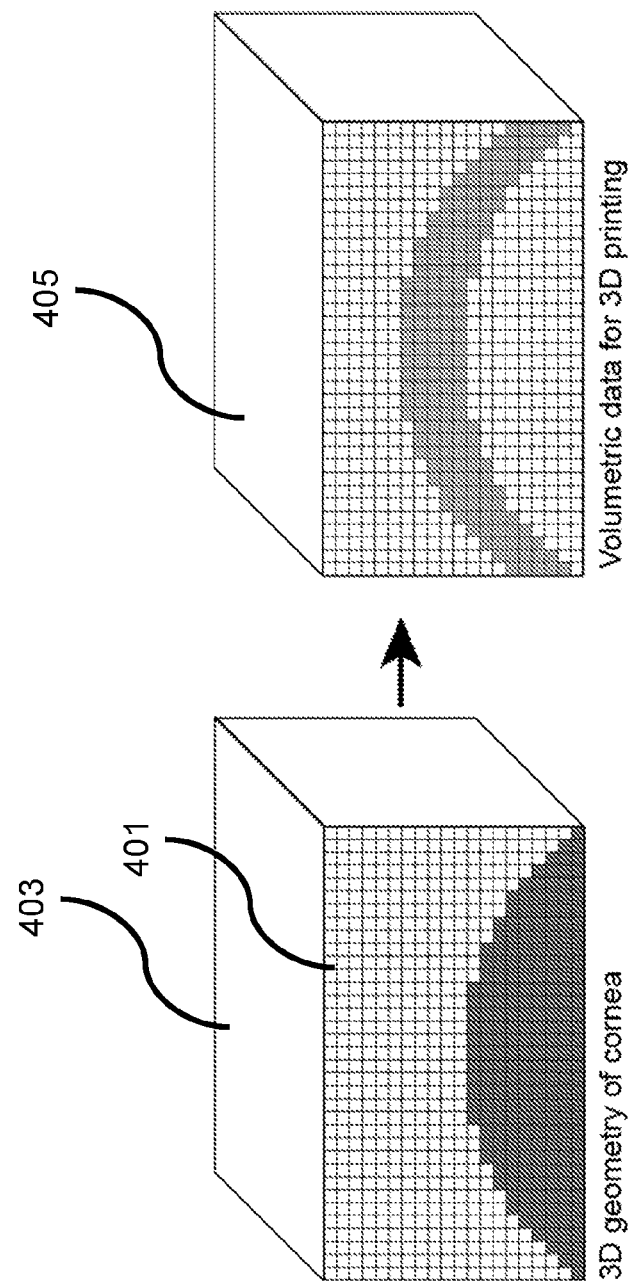
FIG. 4 illustrates an example 3D virtual geometric model of an ophthalmic device.

The devices, methods and systems of the present disclosure generally provide for designing a 3D virtual geometric model of an imaging lens using the one or more images. The one or more images used may further include one or more discretized imaging elements to design the three-dimensional virtual geometric model of the imaging lens without the use of a three-dimensional mathematical model-based design. A three-dimensional virtual geometric model includes a model constructed from information received from one or more images, in contrast to a mathematical model, whereby a virtual design may be constructed using one or more fitting equations. The devices and methods and systems of the present disclosure provide for image driven fabrication of imaging lenses without the use of mathematical modeling to define boundary points, lines or constraints of the model by fitting equations, or polynomial functions to generate virtual models of the device to be fabricated. The present disclosure provides for the design of geometric virtual models, whereby the boundaries and constraints of the model, as shown in FIG. 4, are designed from geometric processing of the discretized imaging elements 401, rather than being generated from a mathematical function or model. For example, if discretized imaging elements (e.g. pixels) 401 of an image are used for design, each pixel may be assigned a value during geometric processing of the image. In some examples, the values may be binary (0 or 1) and indicate the presence of feature information or absence of feature information. The presence or absence of feature information can be used to set the boundary points and lines of the geometric virtual model as shown in FIG. 4. Using the pixel 401 data, a 3D geometry 403 can be used to form volumetric data for 3D printing 405.

Generally, one or more images may include a set of discretized imaging elements, which may aid in design of the virtual geometric design. In some examples, a discretized imaging element is a finite piece of information bounded by space, or amount of information within a space. In some examples, discretized imaging element may be a pixel (a discretized picture element in two-dimensional space) or voxel (volume pixel) in three-dimensional space

401. Resolution of an image may depend on the number of pixels or voxels acquired from the one or more images of a desired lens shape.

A data set of one or more images of one or more features of a subject lens may be used to construct a three-dimensional representation of the feature. This information may be used to design an imaging lens de novo, or this information may be used to modify an existing template of a device, a precursor model or existing model of a device. For example, in the case of generating a 3D printed intraocular lens, one or more images of a subject lens may allow for customization of a precursor haptic design. Haptic measurements can be designed to meet a subject lens' geometry and spatial constraints. In another example, an application-specific imaging lens may be designed de novo without the use of mathematical modeling to calculate the curvature of the lens. In this example, a topography is used to assess the exact geometry of the curvature from images alone, and not fitted from a mathematical function.

Based on information of a series of discretized imaging elements, such as pixels and voxels, a 3D model can be developed. In some examples, the 3D model can be left in a form that reflects the discretized imaging elements (pixelated or voxelated). In some examples, the 3D model may be processed further to generate smooth contours of 3D surfaces.

In some examples of the present disclosure, the virtual geometric model may be designed as a model comprising a set of pixels and voxels. In this example, this discretized information is maintained and not transformed or fitted with smoothing algorithms to generate a contoured 3D virtual model. Rather, the model remains as a set of discretized imaging elements, which are then used to direct an additive manufacturing process without the use of an intermediate fitting or smoothing step. This process may be referred to as "pixel to pixel" printing or "voxel to voxel" printing. By eliminating the smoothing and contouring step, no information is lost or gained by the model and the 3D virtual geometric model provides a highly accurate and high-fidelity model of the eye feature. Since additive manufacturing may be performed with layer by layer addition, printing may be achieved by correlating individual print layers to layers of discretized elements (pixels and voxels).

In some examples, pixel to pixel to printing or voxel to voxel printing may be advantageous if the resolution of the imaging and the resolution of the additive manufacturing method (e.g., 3D printer) are high. In some cases where the resolution of imaging and the resolution of the print may not match or may be different from one another, a scaling algorithm may be applied so that the pixel/voxels of the images may be printed directly without the need for 3D contouring or fitting.

In other examples, 3D virtual geometric design may include applying one or more smoothing algorithms or contouring algorithms in generating the model. However, these processing elements may still be understood to be distinct from mathematically modeling algorithms that predict or inform boundary constraints of the model. In some examples, smoothing, contouring and scaling algorithms may be used to help test mechanical or structural properties of the 3D virtual geometric model.

Figure 5:
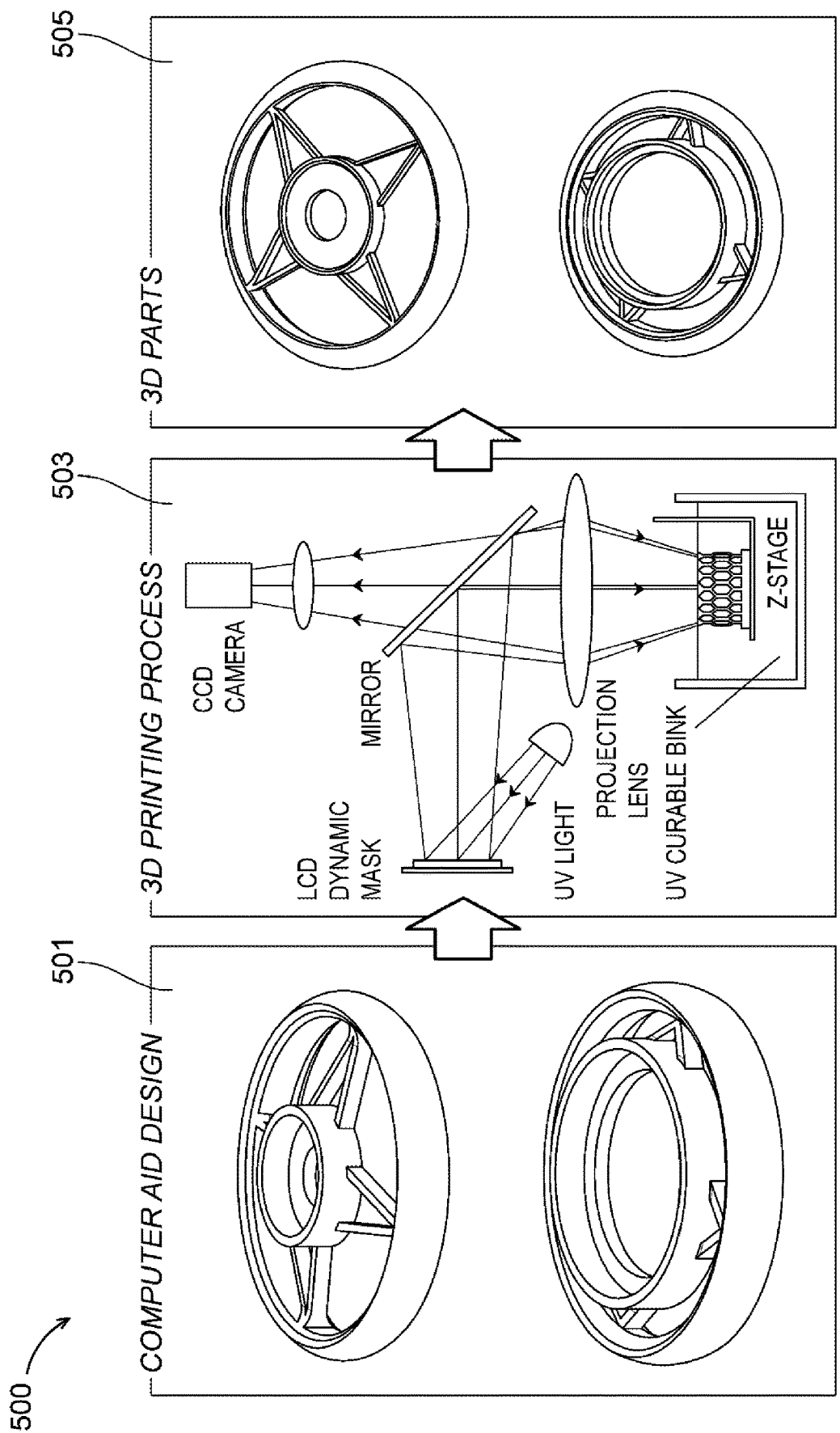
FIG. 5 is a diagram illustrating an example process from computer aided design to additive manufacturing to form 3D parts.

In certain examples, manipulation and design of 3D virtual geometric model may be achieved using a computer, computer system and computer aided design (CAD) software or combination thereof such as shown in the example process 500 of FIG. 5. As shown in the example of FIG. 5, a CAD design 501 of a device is formed based on acquired image data and is provided as a model in cross-sections to a 3D printing process 503. Using the cross-sectional model data, the manufacturing process 503 forms one or more 3D parts 505, such as aspheric imaging lens(es) fitted to a subject based on the acquired image data from the subject.

Generally, models or 3D models may be constructed using one or more computer programs, such as CAD based Solidworks. Generally, any suitable 3D reconstruction methods, as known in the art, may be used in designing a model based on the one or more images received.

Generally, relative motion between consecutive images may be recovered. This process may be performed in conjunction with finding corresponding image features between these images (e.g., image points that originate from the same 3D or 2D feature). The next step may include recovering the motion and calibration of the camera, or imaging device and the 3D structure of the features. This process may be performed in two phases. At first the reconstruction may contain projective skew (e.g., parallel lines are not parallel, angles are not correct, distances are too long or too short, etc.). This may be due to the absence of a priori calibration. A self-calibration algorithm may be used to remove this this distortion yielding a reconstruction equivalent to the original up to a global scale factor. This uncalibrated approach to 3D reconstruction may allow much more flexibility in the acquisition process since the focal length and other intrinsic camera parameters do not have to be measured and/or calibrated beforehand and are allowed to change during the acquisition.

The reconstruction obtained may only include a sparse set of 3D points (only a limited number of features are considered at first), for example. Although interpolation might be a solution, model construction may require a higher level of detail. Optionally, an algorithm may be used to match all image pixels of an image with pixels in neighboring images, so that these points too can be reconstructed. This may be accomplished by receiving the parameters of the imaging device in addition to the one or more images. Since a pixel in the image may correspond to a ray in space and the projection of this ray in other images can be predicted from the recovered pose and calibration, the search of a corresponding pixel in other images can be restricted to a single line. Additional constraints such as the assumption of a piecewise continuous 3D surface are also employed to further constrain the search. It is possible to warp the images so that the search range coincides with the horizontal scanlines. This may allow use of a stereo algorithm that computes an optimal match for the whole scanline at once.

Thus, depth estimations (e.g., the distance from the camera to the object surface) can be obtained for almost every pixel of an image. By fusing the results of all the images together a complete dense 3D surface model may be obtained.

One or more models, or geometric virtual design, used interchangeably herein, may be generated from receiving and processing one or more images. Models may incorporate any number of features deduced from image processing and image reconstruction from the one or more images received or pre-constructed elements, for example.

In some examples, a user may participate in designing a free form model based on image reconstruction performed based on receiving one or more images. In some cases, a model may be automatically generated from one or more images received. Generally, a computer-aided design (CAD) based software program may be used by a user or in an automated method to generate one or more models of the imaging lens.

Additionally, the present disclosure provides for the design of numerous devices whereby geometric design and mechanical function design parameters may be introduced. In some examples, a particular function or physical design parameter may be desired and introduced into the 3D virtual model geometric model to be fabricated. In some examples, physical parameters can be preselected based on a desired function or selected based on geometric design.

After a 3D virtual geometric model is created from a CAD design 501, a plurality of virtual cross-sections of the 3D virtual geometric model are formed, wherein the cross-sections are defined by a set of physical parameters derived from the 3D model and are generated from the model. In some examples, the 3D cross sections correspond to a pixelated or voxelated model. In other examples the cross sections may be generated from a smoothed or processed, or contoured 3D model. The virtual cross-sections may be generated by numerous methods known in the art, such as mathematical slicing. In some examples, individual cross sections may be limited in thickness to 10 microns. In some examples, the cross-sections of the 3D model may be at least about 0.1, 0.2, 0.5, 0.75, 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, 19.0, 20, 30, 40, 50, 60, 70 80, 90, 100, 250, or 500 microns. In some examples, the cross-sections of the 3D model may be at most 0.1, 0.2, 0.5, 0.75, 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, 19.0, 20, 30, 40, 50, 60, 70 80, 90, 100, 250, or 500 microns. In some examples, the cross-sections of the 3D model may range from 1-10 microns. In some examples, the cross-sections of the 3D model may range from 0.1-0.5 microns. In some examples, the cross-sections of the 3D model may range from 0.1-1 microns. In some examples, the cross-sections of the 3D model may be 1-50 microns. In some examples, the cross-sections of the 3D model may range from 5-20 microns. In some examples, the cross-sections of the 3D model may range from 10-50 microns. In some examples, the cross-sections of the 3D model may range from 25-100 microns. In some examples, the cross-sections of the 3D model may range from 50-200 microns. In some examples, the cross-sections of the 3D model may be 25-250 microns. In some examples, the cross-sections of the 3D model may be 50-500 microns. In some examples, the cross-sections of the 3D model may range from 200-500 microns.

Based on the generation of a plurality of cross sections, one or more bitmap masks may be generated to help direct additive manufacturing 503. For example, if stereolithography is used, bitmap masks may be used to help direct the use of a light source or laser to help solidify materials during additive manufacturing or 3D printing 503. A matrix of voxels may be hardened or polymerized in the material to be hardened, wherein the voxels make up a XY raster that is predetermined by the size, number and arrangement of the pixels, and the height (e.g., =hardening depth) of the voxels in the material.

In some examples, especially where stereolithography may be used, special portions of the structure to be generated (e.g., only within the cross-sectional area to be hardened) can be identified and selected. In some examples, an energy input (e.g., from a light source, etc.) can be very efficiently influenced in relation to a specific cross-sectional area— defined by its contours or pixelated/voxelated model space—of the 3D object. In some examples, within a cross-sectional area one or more bitmaps may be used to generate one or more masks to control exposure of the material to light that may aid in the hardening or polymerization of the material.

Additionally, a voxel matrix can be generated by multiple exposures within a predetermined, defined overall image area of the building plane. An offsetting of images in the building level per cross-sectional area can be used. In some examples, offsetting images may not be necessary or may not be used. Using a voxel matrix formation, e.g., a supporting structure, overhangs and/or particularly small/filigree portions can be formed significantly finer and more accurately.

In certain examples using multiple mask exposures, the hardening depth of every single voxel can be pixel-precisely controlled so that, overall, the quality of the constructed component with regard to surface quality, compact hardness, accuracy in every detail, and tolerances can be improved, and the condition of necessary supporting structures can also be optimized.

In addition to geometry or geometric information, individual layers may be also be optimized or otherwise improved for contribution to mechanical properties in the device to be fabricated. For example, individual layers may be altered or changed during the fabrication process to produce a desired effect in the device. Changes or alterations in the mechanical properties of each layer may include but are not limited to alterations in cross-section thickness, free space coordinates, reference coordinates, shape, orientation, stiffness, hardness, strength, elastic limit, proportional limit, yield strength, tensile strength, fracture strength, ductility, toughness, fatigue ratio or loss coefficient. One or more combinations of changes to these physical properties may allow for functional changes to the structure to achieve a desired function as indicated by the 3D virtual geometric model. For example, in an aspheric imaging lens including one or more bendable or flexible portions, the mechanical properties of one or more layers that make up the bendable elements may be altered to increase or decrease stiffness of the material. In some examples, the imaging lens may be homogenous, or approximately homogenous in the physical parameters that define the additive layers. For example, it may be desired that all layers of an imaging lens have essentially the same stiffness or elasticity. In some examples, the imaging lens may be heterogeneous, or approximately heterogeneous in the physical parameters that define the additive layers. For example, it may be desired that some layers of an imaging lens have a different stiffness or elasticity than other regions of device. As with bendable elements of an imaging lens, selection of physical parameters such as stiffness or elasticity may impact function (e.g., the ability to bend to further accommodating function).

In some examples, physical parameters of one or more layers may be altered by use of one or more different materials or changes in polymerization of the device formation material, as further described herein. In some examples, physical parameters of the material may be affected by differences in exposure to an energy source (e.g., time, duration, light intensity of light exposure, etc.), exposure of certain layers to additional chemicals or additives, or exposure of layers to agents post processing (e.g., after the device has been fabricated using the additive manufacturing process.)

In some examples, the 3D virtual geometric model may be used to generate one or more molds or aids to cast an imaging lens 505. In some examples, the imaging lens 505 may be fabricated by using the plurality of virtual cross-sections of the three-dimensional virtual geometric model

501 to direct an additive manufacturing method 503 to generate of one or more molds based on the three-dimensional virtual geometric model 501 of the imaging lens 505. In some examples, the molds may then be used to fabricate the imaging lens using more traditional methods such as casting and stamping.

III. Additive Manufacturing Methods

The devices, methods and systems of the present disclosure generally provide for use of any additive manufacturing method, or 3D printing method, applicable to various types or manners of producing a three-dimensional object. The building or construction may be carried out in layers (layer-wise), however may also be alternatively independent from layers. Other design options are possible. For example, the hardening process can be carried out continuously without layers; discontinuously (either with same or different or variable layer thicknesses); partially continuously and partially discontinuously (discontinuously either with same or different or variable layer thicknesses); or in a combination of various possibilities. The device and process according to the present disclosure is particularly suitable for building a three-dimensional object in a voxel matrix independent from layers or using layers. In some examples, additive manufacturing may include but is not limited to three-dimensional printing, stereolithography, microstereolithography, selective laser sintering, direct laser sintering, casting or stamping.

In some examples, the plurality if cross sections generated from the virtual geometric 3D model may be used to help guide one or more beams of electromagnetic radiation, or guide control elements controlling exposure of the device to one or more beams of electromagnetic radiation. In some examples, light sources such as lasers may be used in one or more additive manufacturing processes. For example, when stereolithography may be used, individual cross sections and corresponding masks may either direct a laser beam to harden or polymerize a specific point of material in structure at given time. In some examples, the virtual model, cross sections or masks may inform control systems to direct the laser beam directly to interact with device forming material at certain points; or direct the structure to be exposed to one or more laser beams at certain points; or direct one or more masks which may be used to selectively expose different regions/points of the device forming material.

The selective delivery of electromagnetic radiation may include an appropriate source capable of electromagnetic radiation sufficient to solidify the material to be solidified. Solidification by electromagnetic radiation may comprise a process of solidification without photoreaction, such as gelation, fusion and/or sintering. In some examples, solidification may include a process of gelation and/or solidification by photoreaction or by thermal setting reaction. Accordingly, a binding agent may be selected from the group including inert binding agents; adhesives, which may gel, solidify or cure without photoreaction or with photoreaction; and photopolymers or radiation sensitive resins, which may gel and/or solidify by photoreaction and which normally include photopolymerization, cross-linking and/or network formation processes. Additional materials not susceptible to electromagnetic radiation may also be used in conjunction with binding agents.

The device for selective delivery of electromagnetic radiation may include a mask generator for generating or projecting a mask and/or a projection unit to deliver the electromagnetic radiation selectively to the defined area or volume of material to be solidified. Electromagnetic radiation can be delivered to the building region or parts thereof using further suitable components, including but not limited to optical elements, lenses, shutters, voxel matrix projectors, bitmap generators, mask projectors, mirrors and multi-mirror elements and the like. Examples of suitable radiation techniques to selectively deliver electromagnetic radiation include, but are not limited to spatial light modulators (SLMs), projection units on the basis of Digital Light Processing (DLP®), DMD®, Liquid Crystal Display (LCD), Image Light Amplification (ILA®), Liquid Crystal on Silicon (LCOS), Silicon X-tal Reflective Display (SXRD), a deformable mirror device, etc., reflective and transmissive LCDs, light emitting diodes (LEDs) or laser diodes emitted in lines or in a matrix, light valves, microelectromechanical systems (MEMS), laser systems, etc.

In some examples, one or more 3D printed devices may also be combined with precursor devices or devices that may not be 3D printed. In some examples, the entire imaging lens may be fabricated using additive manufacturing or 3D printing.

IV. Fabrication Materials

A variety of suitable material for designing and manufacturing an imaging lens may be used. Suitable materials may be referenced as device forming materials or polymers and may be used interchangeably herein. In some examples, material may include but are not limited to a biodegradable polymer, bio-resistant polymer, biological polymer, photosensitive polymer, an ultraviolet (UV) curable polymer, cross-linkable polymer, tunable polymer, composite, protein, biocompatible polymer, a UV sensitive reagent, a curing agent, a UV induced cross linker and a chemical catalyst, or metal. In some examples this may include but is not limited to compatible prepolymers which are water-soluble and/or meltable. Device-forming material may comprise primarily one or more polymers, which are in some examples in a substantially pure form (e.g., purified by ultrafiltration). Therefore, after crosslinking (e.g. by UV light exposure), an imaging lens may require practically no more subsequent purification, such as in particular complicated extraction of unpolymerized constituents. Furthermore, crosslinking may take place solvent-free or in aqueous solution, so that a subsequent solvent exchange or the hydration step is not necessary.

A "prepolymer" refers to a starting polymer, which can be cross-linked upon actinic radiation to obtain a cross-linked polymer having a molecular weight much higher than the starting polymer. Examples of actinic radiation are UV irradiation, ionized radiation (e.g. gamma ray or X-ray irradiation), microwave irradiation, and the like.

In some examples, polymers which may be used to form the ophthalmic device include but are not limited to polylactide, polyglycolide, polysaccharides, proteins, polyesters, polyhydroxyalkanoates, polyalkalene esters, polyamides, polycaprolactone, polyvinyl esters, polyamide esters, polyvinyl alcohols, modified derivatives of caprolactonepolymers, polytrimethylene carbonate, polyacrylates, polyethylene glycol, hydrogels, photo-curable hydrogels, terminal diols, and derivatives and combinations thereof.

In some examples, polymers which may be used to form the ophthalmic device include but are not limited to polyimide, Nitinol, platinum, stainless steel, molybdenum, metal, metal alloy, or ceramic biocompatible material or combinations thereof. Other materials of manufacture or materials with which the ophthalmic device can be coated, reinforced or manufactured entirely include Silicone, PTFE, ePTFE, differential fluoropolymer, FEP, FEP laminated into nodes of ePTFE, silver coatings (such as via a CVD process), gold, prolene/polyolefins, polypropylene, poly(methyl methacrylate) (PMMA), acrylic, PolyEthylene Terephthalate (PET), Polyethylene (PE), PLLA, HDDA, and parylene. The device can be reinforced with polymer, Nitinol, or stainless-steel braid or coiling or can be a co-extruded or laminated tube with one or more materials that provide acceptable flexibility and hoop strength for adequate lumen support and drainage through the lumen. The implant can alternately be manufactured of nylon (polyamide), PEEK, polysulfone, polyamideimides (PAI), polyether block amides (Pebax), polyurethanes, thermoplastic elastomers (Kraton, etc.), and liquid crystal polymers. In the case of biodegradable or bioabsorbable devices, a variety of materials can be used, such as biodegradable polymers including: hydroxyaliphatic carboxylic acids, either homo- or copolymers, such as polylactic acid, polyglycolic acid, polylactic glycolic acid; polysaccharides such as cellulose or cellulose derivatives such as ethyl cellulose, cross-linked or uncross-linked sodium carboxymethyl cellulose, sodium carboxymethylcellulose starch, cellulose ethers, cellulose esters such as cellulose acetate, cellulose acetate phthalate, hydroxypropylmethyl cellulose phthalate and calcium alginate, polypropylene, polybutyrates, polycarbonate, acrylate polymers such as polymethacrylates, polyanhydrides, polyvalerates, polycaprolactones such as poly-necaprolactone, polydimethylsiloxane, polyamides, polyvinylpyrrolidone, polyvinyl-alcohol phthalate, waxes such as paraffin wax and white beeswax, natural oils, silk protein, protein, shellac, zein, or a mixture thereof, as listed in U.S. Pat. No. 6,331,313 to Wong, which is expressly incorporated by reference in its entirety.

A solution of a device-forming material can be prepared by dissolving the device-forming in any suitable solvent known to a person skilled in the art. Examples of suitable solvents are water, alcohols, such as lower alkanols, for example ethanol or methanol, and furthermore carboxylic acid amides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, and halogenated hydrocarbons, for example trichloroethane, and also mixtures of suitable solvents, for example mixtures of water with an alcohol, for example a water/ethanol or a water/methanol mixture.

V. Example 3D Printing of Customized Aspheric Imaging Lenses

Certain examples provide advancements in 3D printing technology to transform the manufacture of customized optical elements, which today relies heavily on a time-consuming and costly polishing and grinding processes. A femtosecond 3D printing process provides sub-diffraction-limited resolution using nonlinear two-photon absorption with a tight-focused laser beam. Thus, 3D printing via the sequential addition of 100-nm voxels results in a rather slow fabrication speed at $1.70 \times 10-3$ mm$^3$/h. Parallelizing microstereolithography process using optical projection can significantly increase the building speed, its resolution remains diffraction-limited. Clearly, the inherent speed-accuracy trade-off seriously constrains the practical applications of 3D printing technology in optical realm. In addressing this issue, certain examples provide a new method featuring a significantly faster fabrication speed, at 24.54 mm$^3$/h, without compromising the fabrication accuracy required to 3D-print customized optical components. Certain examples provide a high-speed 3D printing process with sub-voxel-scale precision (e.g., sub 5 μm) and deep subwavelength (e.g., sub-7 nm) surface roughness by employing a highly parallel projection micro-stereolithography (PμSL) process and synergistic effects from grayscale photopolymerization and meniscus equilibrium post-curing methods. Fabricating a customized aspheric lens 5 mm in height and 3 mm in diameter can be accomplished in four hours, for example. Certain examples provide a 3D-printed singlet aspheric lens demonstrating a maximal imaging resolution of 373.2 lp/mm with low field distortion less than 0.13% across a 2-mm field of view. The lens can be attached to a cell phone camera, for example, to capture detailed photographs, such as the colorful fine details of a sunset moth's wing and the spot on a weevil's elytra. Thus, certain examples can rapidly prototype optical components or systems based on 3D printing.

Certain examples provide time- and cost-efficient systems and methods for the 3D printing of customized optical components using the highly parallel projection micro-stereolithography (PμSL) process. Sub-voxel-scale accuracy and deep subwavelength surface smoothness are obtained by synergizing the grayscale photopolymerization and the meniscus equilibrium post-curing methods. Such methods can be used for the 3D printing of customized aspheric lenses, which feature optically smooth surfaces, and whose optical performance can be characterized.

In addressing the previously described time scaling issue, the PμSL process is developed to eliminate the point-by-point scanning process by employing a dynamic mask to photopolymerize a full two-dimensional (2D) layer with specific layer thickness in a single exposure (FIG. 6A). FIG. 6A illustrates an example PμSL system. By parallelizing the three-dimensional (3D) printing process in a layer-by-layer fashion, the fabrication time of the PμSL scales to $$\left(\frac{\text{dimension}}{\text{layer thickness}}\right),$$

resulting in significant time savings with high-resolution 3D printing. Using an extremely low-cost, ultraviolet-light-emitting diode (UV-LED) as the light source further relieves the need for an expensive femtosecond laser source. However, due to the diffraction-limited characteristics of the projection optics, the PμSL process can only provide micron-scale voxels. As shown in FIG. 6B, the 3D model is approximated as a set of discretized pixels, and the resulting pixelated surface will severely deteriorate the performance of the 3D-printed optical elements (FIG. 6C). FIG. 6B shows a 3D solid model with smooth surfaces shown approximated as a set of discrete voxels. FIG. 6C shows results in a pixelated, rough surface.

Figure 6D:
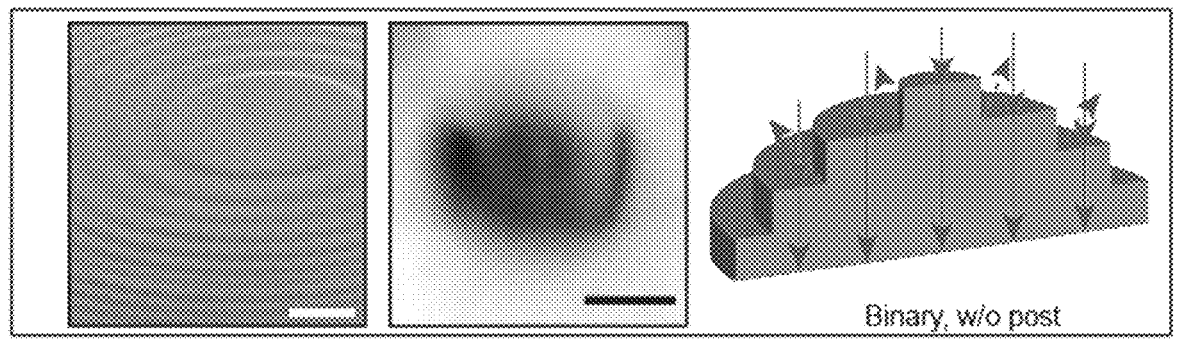
FIGS. 6D-6G depict example progressive improvement of surface roughness and resulting imaging characteristic of 3D printed lenses using various methods.

FIGS. 6D-6G depict example progressive improvement of surface roughness and resulting imaging characteristic of 3D printed lenses using various methods. To better illustrate this, FIG. 6D shows a 3D-printed lens using PμSL with a set of binary bitmap photomasks, as an example. The example of FIG. 6d shows a lens printed by binary patterns without a post-curing process. While the in-plane pixelated roughness can be smoothed by slightly defocusing the projected images, the out-of-plane pixelated roughness (or so-called step-case roughness) inherent in the layered additive fabrication process is still difficult to avoid. Failure to precisely restitute the spherical surface completely spoils the imaging quality of the 3D-printed lens. Furthermore, using an 'NU' pattern as a test object, the resulting image shown in FIG. 6D is too blurry to reveal any meaningful details. This is because the rough pixelated surface fails to properly refract the light while simultaneously producing strong scattering (FIG. 6D). Thus, the surface quality needs to be significantly improved in order to meet the stringent requirements for the 3D printing of optical components.

Figure 6E:
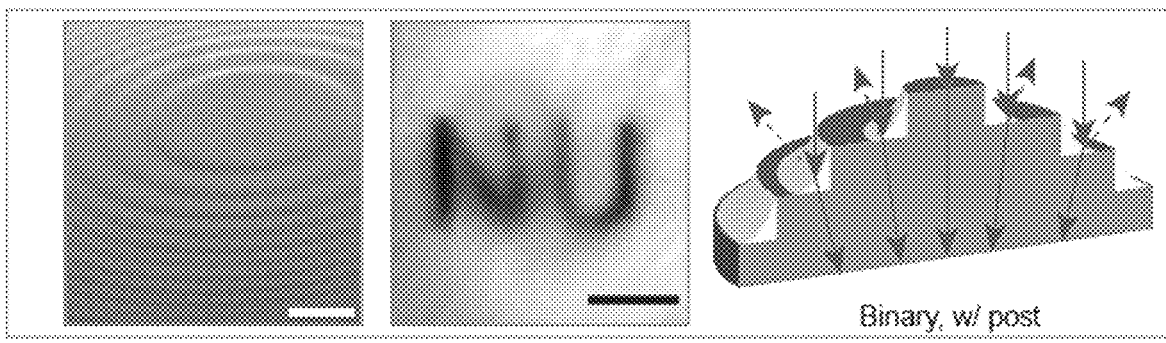

Certain examples provide a new strategy to 3D-print customized optical components featuring optically smooth surfaces without sacrificing the high throughput of the PµSL process. A meniscus equilibrium post-curing method and a grayscale photopolymerization method taken alone each fails to create an optically smooth surface in fabricating a spherical lens with 5 mm in diameter, for example. The meniscus equilibrium post-curing method controls the meniscus formation to provide a transition between the adjacent layers to improve the otherwise pixelated surface. However, the maximum range of the meniscus that can extend along an infinite horizontal plane is constrained by a wetting angle, which, therefore, fails to cover larger plateaus found near the center of the lens. The lens modified with the meniscus equilibrium post-curing method still exhibits pixelated roughness among fabrication layers, especially near the center region (FIG. 6E). FIG. 6E illustrates a lens printed by binary patterns and to meniscus equilibrium post-curing process. Polymerized meniscus structures are illustrated in yellow. As shown in the example of FIG. 6E, imaging quality has marginally improved to make the 'NU' pattern just barely resolvable, but the surface roughness is still far from acceptable.

Figure 6F:
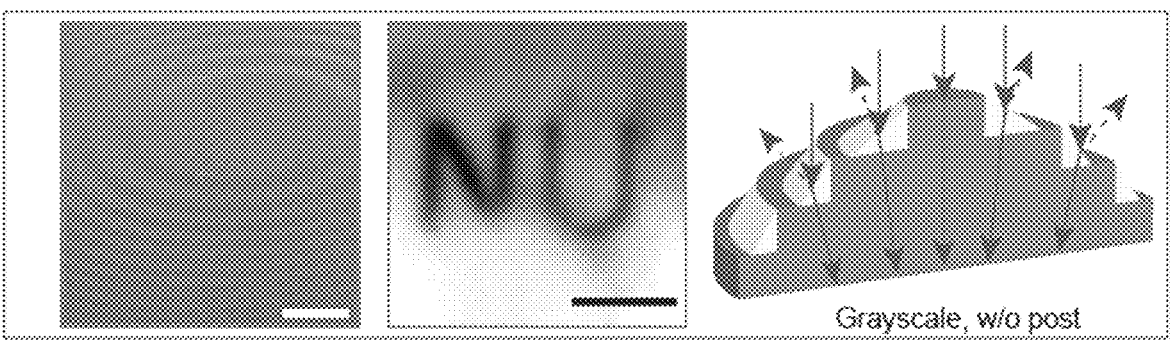
Figures 7A, 7B:
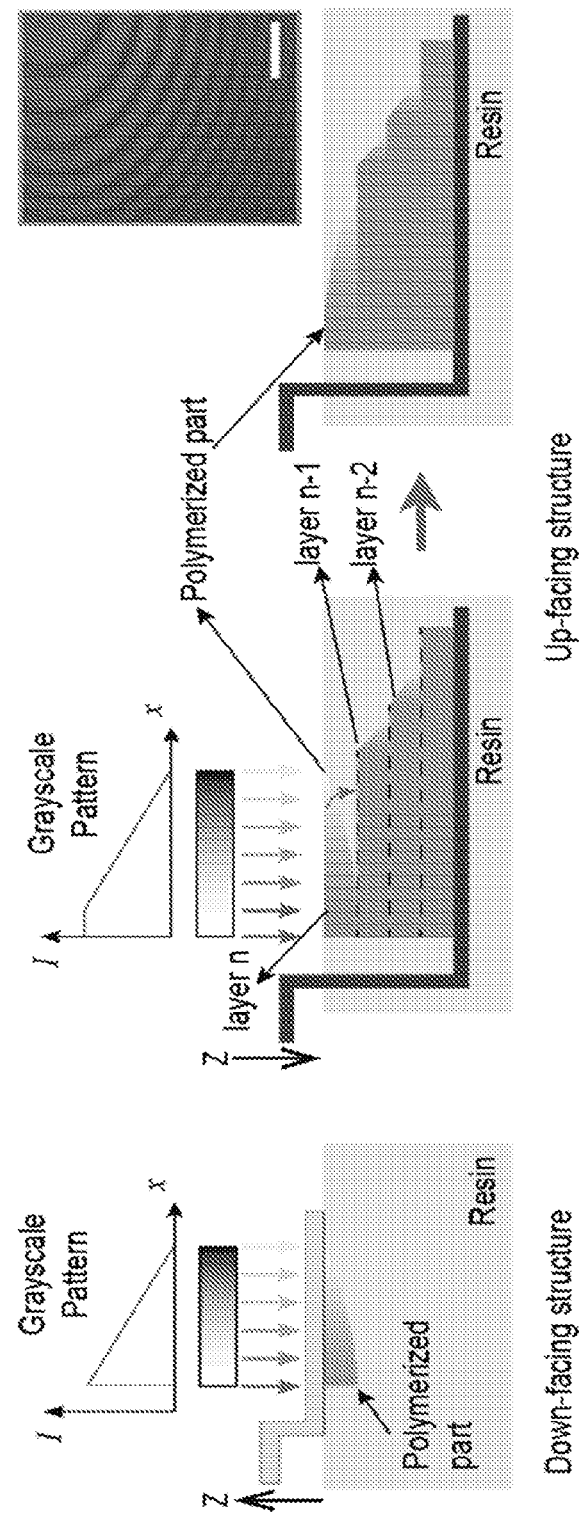
FIGS. 7A-7B provide schematic illustration of grayscale photohardening for down-facing and up-facing structures.

Conversely, the grayscale photopolymerization method allows fine control of curing depth to fabricate smooth surface-relief structures with the thickness of the structures normally limited to hundreds of microns via single exposure (FIG. 7A). However, in the case of printing the up-facing lens with millimeter thickness, 255 grayscale levels can only provide a limited Z-resolution of tens microns. The grayscale method can be implemented within an individual fabrication layer in order to achieve micron scale dimensional accuracy along the Z direction (FIG. 7B). Applying the grayscale photopolymerization method to the PµSL of up-facing surfaces results in a grayscale transition region with better surface coverage extended further along the horizontal surface rather than a sheer transition associated with binary polymerization (FIG. 6F). However, due the complications with the underlying processes, it remains difficult to precisely control the geometry of the grayscale transition region (FIGS. 7A-7B). Nevertheless, while still not yet reaching the optimal surface quality, the imaging quality was marginally improved than the original pixelated 3D-printed lens, as shown in the example of FIG. 6F. FIG. 6F depicts an example lens printed by grayscale photopolymerization without the meniscus equilibrium post-curing process. As illustrated in yellow, the grayscale polymerization provides a smooth transition from the pixelated roughness.

FIGS. 7A-7B provide schematic illustration of grayscale polymerization at each step for down-facing (FIG. 7A) and up-facing (FIG. 7B) structures, respectively. Inset in FIG. 7B is the Scanning Electron Microscope (SEM) image of the surface of the lens printed via grayscale PµSL fabrication process, scale bar: 200 µm.

According to a working curing model discussed in the section 2, the curing depth is proportional to the light intensity. Thus, controlling the intensity of the light can be used to precisely control the curing depth of each photopolymerized layer. This becomes particularly advantageous with the use of the dynamic mask, as it allows for controlling the grayscale value of each individual pixel and facilitate the fine control of the resolution along the building direction. The grayscale polymerization can utilize a grayscale mask pattern to create smooth tapered transition between layers by tuning the edge grayscale values, for example (FIG. 7A). This method was designated for the down-facing surfaces with the thickness of the structures normally limited to hundreds of microns as the light entering from the top initiates the photopolymerization process in single exposure (FIG. 7A). However, in the PµSL system, this method is implemented on up-facing surfaces with millimeter-thickness, in which the grayscale exposure was applied for every fabrication layer with the thickness of 5 µm. This method still can help produce the transition region between adjacent fabricating layers, which is demonstrated by the SEM images in FIG. 6F and FIG. 7B. As illustrated in FIG. 7B, although the photopolymerization occurs from the top, the resulting single layer of grayscale polymerization is still attached to the upper layer (the $n^{th}$ layer) from the side due to the full polymerization within the projection region corresponding to the maximum grayscale value (e.g., 255). Due to the reduced exposure of the surrounding grayscale region (grayscale <255), the polymerized structure has reduced curing depth less than the layer thickness. It forms freestanding structure along the boundary and being suspended in the uncured resin. Since the solidified polymer and the uncured resin have similar density, the weight of the freestanding parts was balanced by the buoyant force while in the resin. The freestanding part of the $n^{th}$ layer will eventually be attached to the lower layer ($n-1^{th}$ layer) when the printed structure is raised above the resin surface. Since the free-standing structures remain attached from the side, no additional alignment procedure will be needed. This is when the final flapping process occurs. In an embodiment, the term "flapping" refers to a coming down, collapse, or settling of an up-facing feature or portion of the $n^{th}$ layer toward a $(n-1)^{th}$ layer. It can be supported by the SEM images shown in FIG. 6f and FIGS. 7a-7b. However, the final shape is governed by a complex relation of many parameters, such as the thickness of individual layer, transportation of the radicals and monomers constrained by the layer below, spatial distribution of fully and partially polymerized materials, and subsequent plastic deformation of the free-standing structures, which is completely different from the case for the down-facing surfaces. Thus, it is difficult to precisely control the shape of the grayscale exposure region.

Figure 6G:
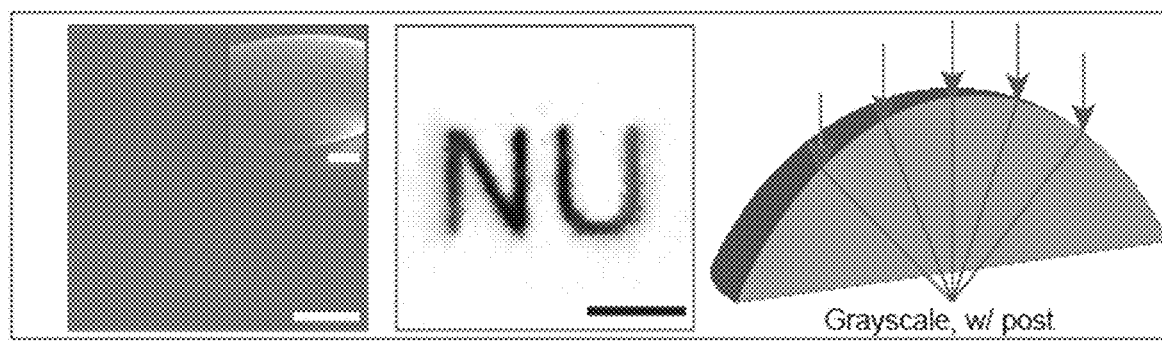

Both the meniscus equilibrium post-curing method and the grayscale photopolymerization method fail to solve the pixelated roughness issue individually. However, the grayscale photopolymerization method can effectively modify the slope of the otherwise steep sidewall of the stair-steps and provide better control of the meniscus recoating and post-curing process. By strategically combining these two methods, the fabricated lens shown in FIG. 6G exhibits a smooth surface, with the pixelated roughness completely removed and the corresponding image quality substantially improved. The results demonstrate the potential to obtain sub-voxel-scale accuracy and deep subwavelength surface smoothness without sacrificing the high-throughput of the PµSL process. FIG. 6G illustrates an example lens printed by grayscale photopolymerization and the following meniscus equilibrium post-curing process.

Feasibility of 3D-printing customized optical elements can be further demonstrated using an aspheric lens as the representative example. The complex surface profile of the aspheric lens is optimized to minimize spherical aberration and image distortion at the wavelength of 532 nm. FIG. 8A illustrates an example optical setup for aspheric lens configuration, in which an aspheric lens is placed on a quartz substrate with a layer of index-matching liquid. In this example, the height of the lens is h=5 mm, and the thickness of the quartz substrate and index-matching liquid are adjusted during the experiment. The theoretical optimal lateral resolutions of the optimized aspheric lens are $res_{2mm}$=2.104 µm and $res_{3mm}$=1.382 µm, with the aperture diameters of 2 mm and 3 mm, respectively. In addition, the optimized lens features a maximum field distortion of 0.13% within the field of view (FOV) of 2 mm in diameter (FIGS. 9A-9D).

Figure 8B:
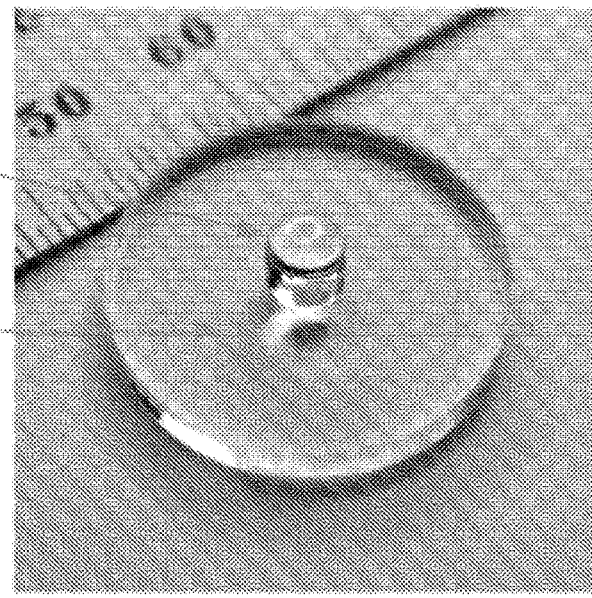
FIG. 8B depicts an example aspheric lens.
Figure 8C:
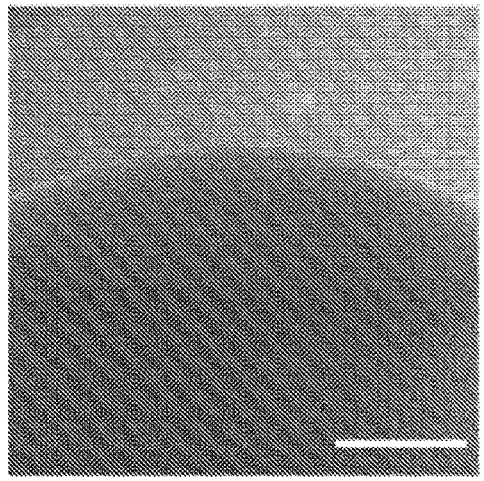
FIGS. 8C-8D show scanning electron microscope images of 3D-printed lenses.
Figure 8D:
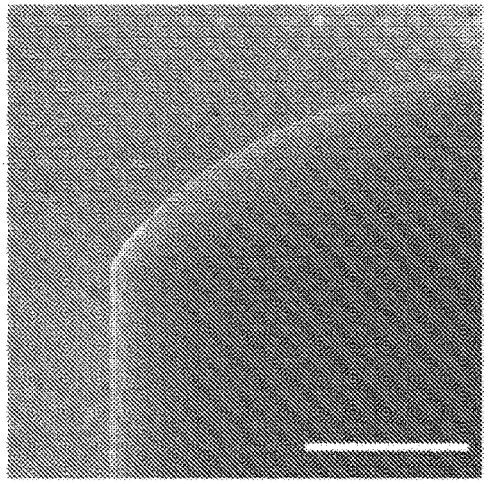
Figure 8E:
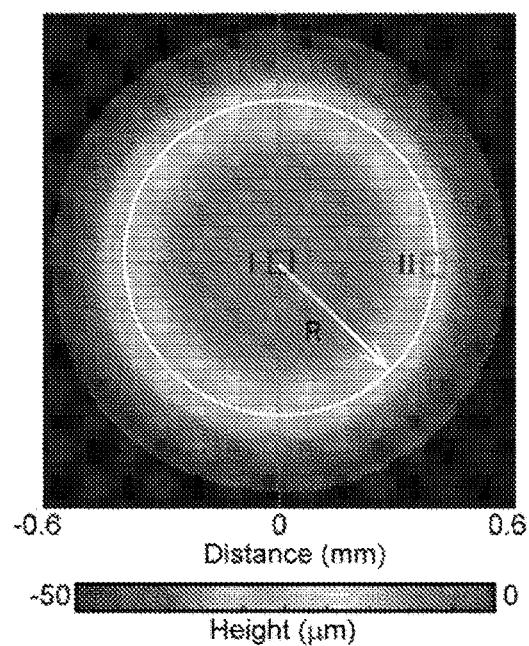
FIGS. 8E-8F depict measurements of the lenses of FIGS. 8C-8D.
Figure 8F:
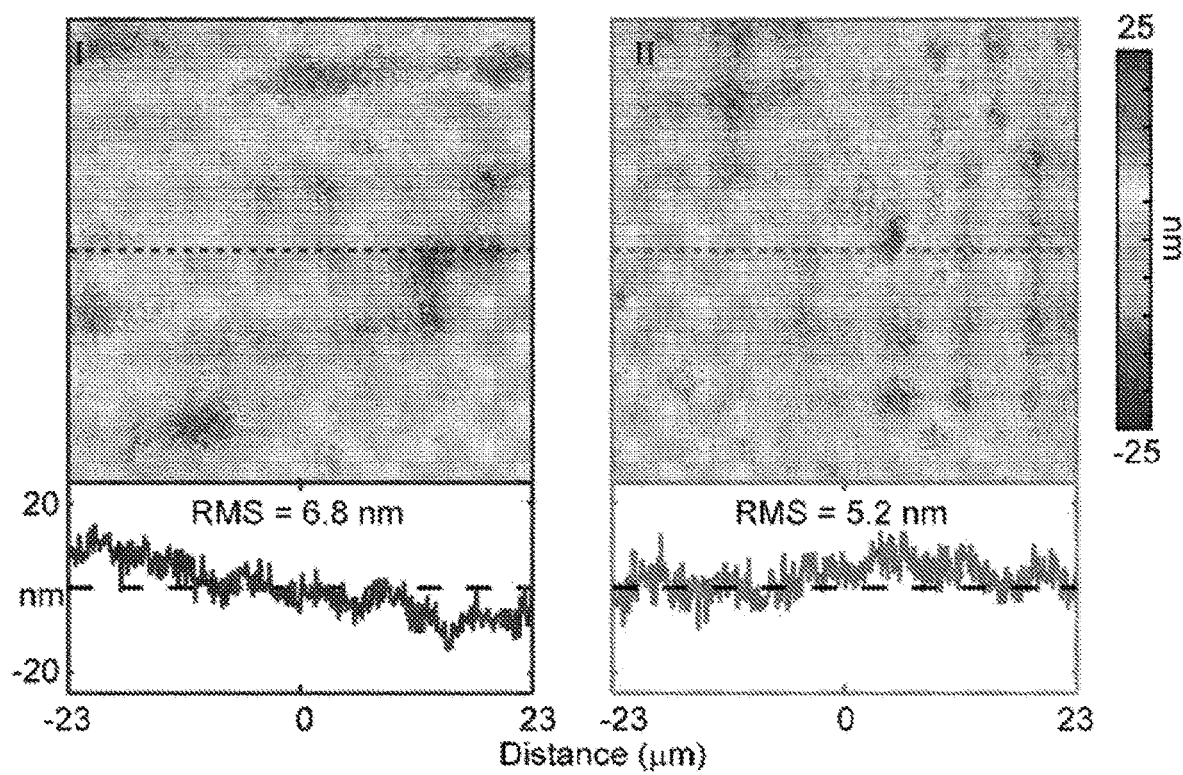

The aspheric lens shown in FIG. 8B (shown on a quartz substrate) is 3D-printed using PµSL followed by the post-processing step discussed in the previous section. The 3D-printed lens is optically transparent with high transmission over the visible spectrum of the light (FIG. 10) with a light yellowish hue, which is due to the UV-absorbing characteristic of the photocurable resin and can be further reduced as needed. The SEM images of the 3D-printed lens shown in FIGS. 8C and 8D reveal extremely smooth surfaces without the pixelated roughness typically associated with 3D printing. FIGS. 8C-8D show example scanning electron microscope (SEM) images of the 3D-printed lens at its center and edge regions, respectively. The white light interferometry (Contour Elite K, Bruker Corporation) results measured from the 3D-printed lens in FIGS. 8A-8D are shown in FIGS. 8E and 8F. Due to the constraints of the instrument, the measured area is limited in this example to 1.2 mm in diameter for precisely quantifying the surface roughness of the 3D-printed lens. FIG. 8E shows a quantitative surface topography measurement performed by optical white light interferometry. FIG. 8F depicts surface roughness of the printed lens at areas I and II, denoted as squares in FIG. 8E.

Figure 8G:
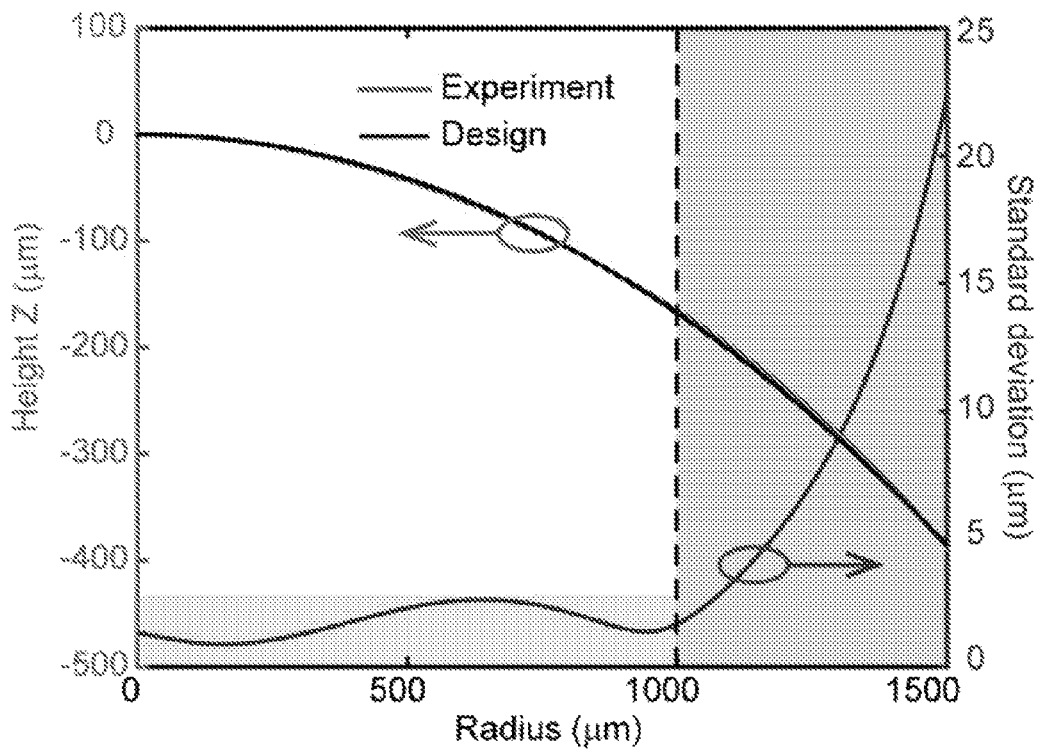
FIG. 8G shows a comparison between an experimentally measured surface profile of the 3D-printed lens and the original design.
Figure 8H:
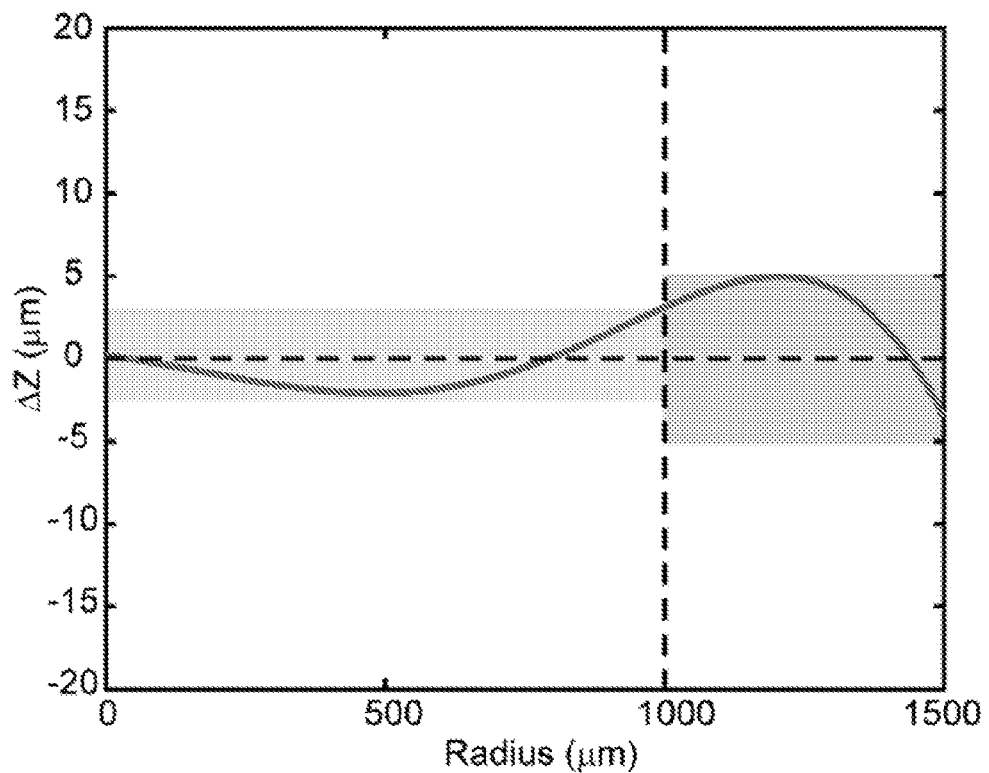
FIG. 8H shows an example deviation of experimental surface profiles of eight printed lenses FIG. 9A provides a schematic illustration of an optimal aspheric lens.

As shown in FIG. 8F, the corresponding RMS of the center (Region I) and the 0.4 mm off the center (Region II) are 6.8 nm and 5.2 nm, respectively, which are significantly smaller than the wavelength of the visible light. FIG. 8G shows the comparison between the experimentally measured surface profiles of the 3D-printed lens and the original design to characterize the manufacturing precision and accuracy. In FIG. 8G, an average of the surface profiles measured from eight printed lenses is compared with the designed curve. The standard deviation of the surface profiles measured from eight printed lenses is less than 3 µm within 2 mm in diameter. The standard deviation increases monotonically towards the peripheral region with diameter larger than 2 mm as the slope of the surface profiles becomes increasingly steeper. The mean value of the experimentally measured surface profile matches reasonably well with the design value, and the difference (ΔZ) is plotted in FIG. 8H. FIG. 8H shows an example deviation of the experimental surface profiles of the eight printed lenses. In the example of FIG. 8H, ΔZ is well controlled within the range from −2.08 µm to 2.98 µm within a 2-mm diameter region, which is smaller than the pixel dimension of 7.1 µm and the layer thickness of 5 µm. In the peripheral region, larger ΔZ is found in the range of −3.52 µm to 4.96 µm but is still below the pixel dimension of 7.1 µm and the layer thickness of 5 µm. The experimentally measured manufacturing accuracy is comparable with conventional methods for fabricating aspheric lenses. Therefore, the ultra-smooth optical surface together with the sub-voxel precision of surfaces make it possible for the rapid 3D printing of high-quality optical lenses.

FIG. 9A provides a schematic illustration of an optimal aspheric lens. FIG. 9B shows an associated Huygens point spread function. FIG. 9C depicts a cross section of a point spread function for different aperture. FIG. 9D shows calculated distortion curves of the lens at different wavelengths.

In certain examples, the surface profile of the aspheric lens is optimized to improve the imaging performance by reducing aberrations at the center wavelength of 532 nm by Zemax, OpticStudio, and the simulated optical performance is shown in FIGS. 9A-9D. For the imaging resolution, the Huygens point spread function (PSF) is calculated. In FIG. 9B, the PSF is circular with a central bright disk and progressively weaker concentric dark and bright rings. The smaller and sharper the PSF, the better the resolution of the image system, and the distance from its center to the first order dark ring is commonly quoted as the lateral resolution $$res = \frac{0.61\lambda}{NA}$$

(by Rayleigh criterion), in which λ is the wavelength and NA is the numerical aperture. The lateral resolution of the optimized aspheric lens can be retrieved through the cross-section of PSF in FIG. 9C. In detail, the theoretical resolution of the lens is $res_{3mm}$=1.382 µm when the aperture diameter is 3 mm, while the theoretical resolution is $res_{2mm}$=2.104 µm when then aperture diameter is reduced to 2 mm. In addition, the optimized lens features a maximum distortion of 0.13% for multiple wavelengths (441 nm, 532 nm, 635 nm) within the field of view (FOV) with object image height of 1 mm (FIG. 9D).

Figure 10:
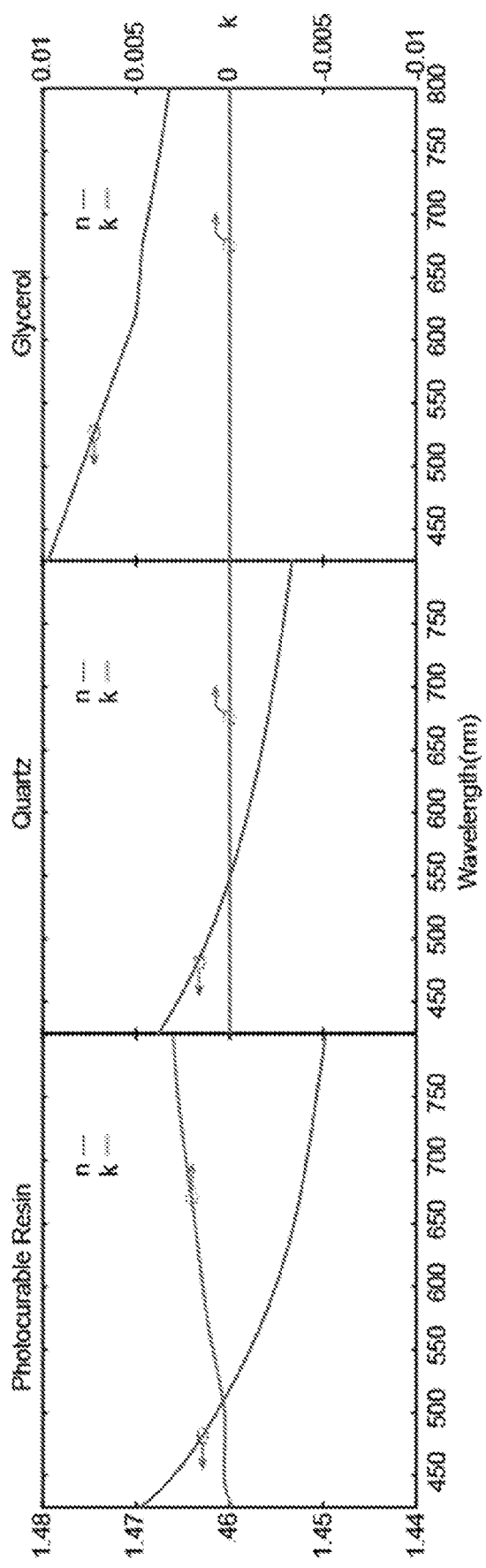
FIG. 10 illustrates a measured refractive index of hexanedioldiacrylate (HDDA) photocurable resin, quartz, and glycerol.

FIG. 10 illustrates a measured refractive index of hexanedioldiacrylate (HDDA) photocurable resin, quartz, and glycerol. In the example of FIG. 10, a photocurable resin for the PµSL system includes 94% wt. 1,6-hexanedioldiacrylate (HDDA, Sigma-Aldrich) as the low viscosity monomer, 1% wt. Irgacure 819 (BASF) as the photoinitiator, and 5% wt. 2-(2H-Benzotriazol-2-yl)-6-dodecyl-4-methylphenol (Sigma Aldrich, named by BASF as Tinuvin 171) as ultraviolet (UV) light absorbers to control the curing depth. The resin is spin coated on coverslip and cured to produce a solid film via flood UV exposure in a nitrogen environment. The refractive index (n) of the cured thin film is characterized by an ellipsometer (J. A. Woollam M2000U), with the results given in FIG. 11. The real part of the HDDA photocurable resin refractive index (n) decreases from 1.469 to 1.450 while the imaginary part of the refractive index (k) ranges from 0 to 0.003 across wavelength from 425 nm to 800 nm. In addition, FIG. 10 also shows the experimental data of the quartz and glycerol. In detail, the n of quartz decreases from 1.467 to 1.452, which is comparable to the HDDA photocurable resin. In addition, the n of the glycerol decreases from 1.479 to 1.466 as the wavelength increases from 425 nm to 800 nm. By modifying the proportion of the glycerol and water, the n of the index matching liquid composed of water and glycerol can be tuned to match the n of the HDDA photocurable resin and the quartz. All the experimental refractive indices were employed in the design/optimization of the aspheric lens in Zemax.

Figure 11:
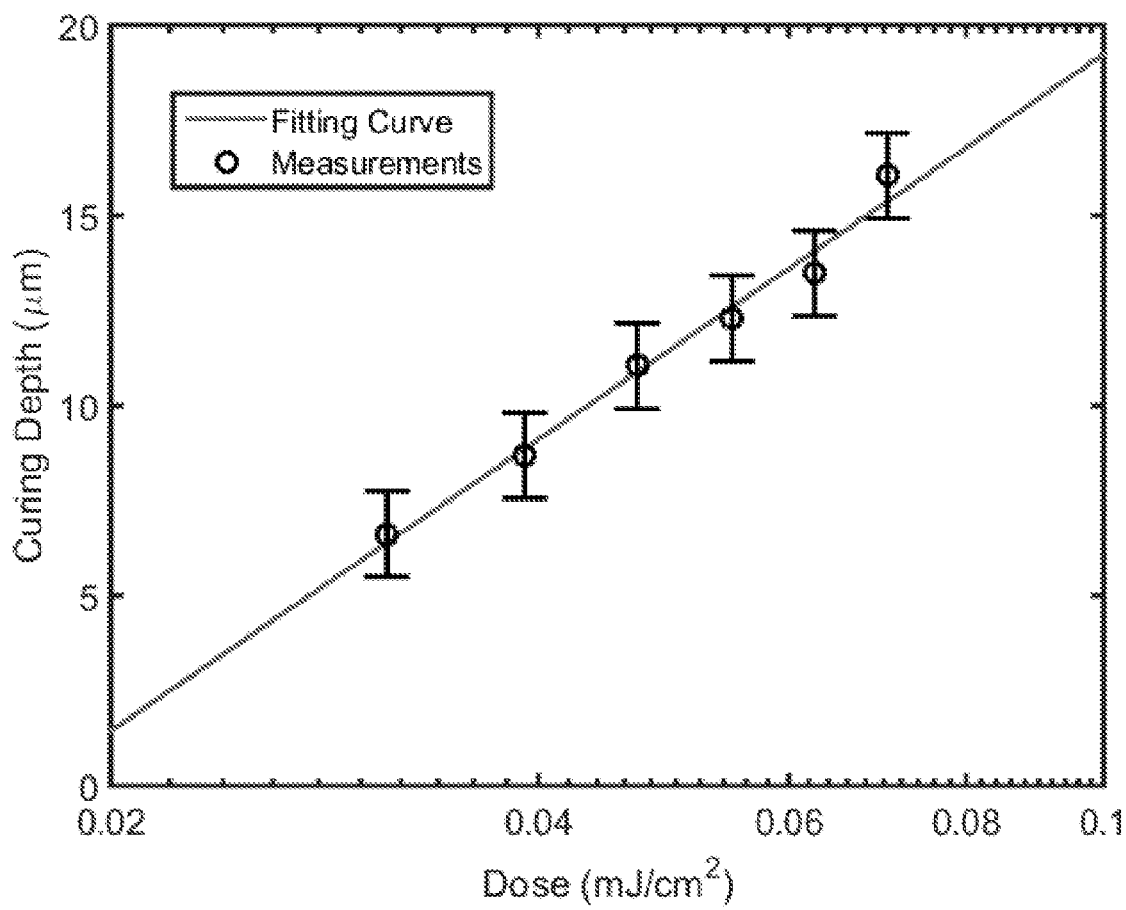
FIG. 11 shows an example curing depth of photocurable resin as a function of ultraviolet energy flux.

FIG. 11 shows an example curing depth of photocurable resin as a function of UV energy flux. The curing depth, the thickness of the UV-polymerized layer, is determined by the light energy density (dose) within the exposure area. According to the exponential law of light absorption within the resin, the light intensity I(z) via the penetrating thickness z equals:

$$I(z) = I_0 \exp\left(-\frac{z}{D_p}\right), \quad \text{(Eq. 1)}$$

in which $I_0$ is the intensity at surface, and $D_p$ is the maximum depth that light can penetrate in the resin. When the light intensity decreases to the value below the critical dose, polymerization of the resin stops. The curing depth $C_d$ can thus be calculated by the equation:

$$C_d = D_p \ln\left(\frac{E_0}{E_c}\right), \quad \text{(Eq. 2)}$$

where $E_0 = I_0 t$ is the dose at the top surface of the liquid resin, and $E_c$ is the critical dose of photopolymerization. In PμSL system, vertical resolution is determined by the layer thickness, which corresponds to the curing depth at a certain dose. To control the thickness of each cured layer and be consistent with the designed thickness, the curing depth is characterized by measuring the thickness of suspend beams supported by two posts. As the curve shown in FIG. 11, the curing depth is linearly proportional to the logarithmic dose and is modeled well by Eq. 2. Therefore, the thickness of each individual layer can be controlled to 20 μm voxel thickness for lens base and 5 μm for curved surface of spherical/aspherical lenses accurately by modifying the UV dose.

As shown in FIG. 12A, which illustrates an example configuration, the optical performance of the 3D-printed aspheric lens is characterized by imaging a USAF 1951 resolution test target (T-20-N-CG, Applied Image, Inc.) at multiple illumination wavelengths Multiple bandpass filters with center wavelengths of 532 nm, 441 nm, and 635 nm were used for green, blue, and red illumination, respectively. First, the imaging resolution is characterized using a 2-mm aperture to take full advantage of the high accuracy (<3 μm) of the 3D-printed lens. FIG. 12B shows a recorded image of the USAF 1951 resolution test target (Group 6-7) at 532 nm (green light) with an aperture diameter of 2 mm. Inset is a magnified image of Group 7. By imaging the USAF 1951 resolution test target under green light, the ability to resolve element 6 of Group 7 of the test target is demonstrated (FIG. 12B). The averaged intensity profile along the highlighted panel in the magnified inset in FIG. 12B is plotted in FIG. 12C, which shows pronounced modulation of the captured image of element 6 of Group 7. FIG. 12C depicts an averaged intensity profile at the position marked by the dashed box in the inset of FIG. 12B.

Subsequently, the experimentally measured image modulation as a function of spatial frequency is calculated to define the modulation transfer function (MTF), shown in FIG. 12D. Hereby, 10% modulation of the MTF is used as threshold to determine the imaging resolution. The aspheric lens is also characterized by imaging the resolution test target under blue and red illuminations, in which the position of the test target was optimized for each wavelength.

Figure 12D:
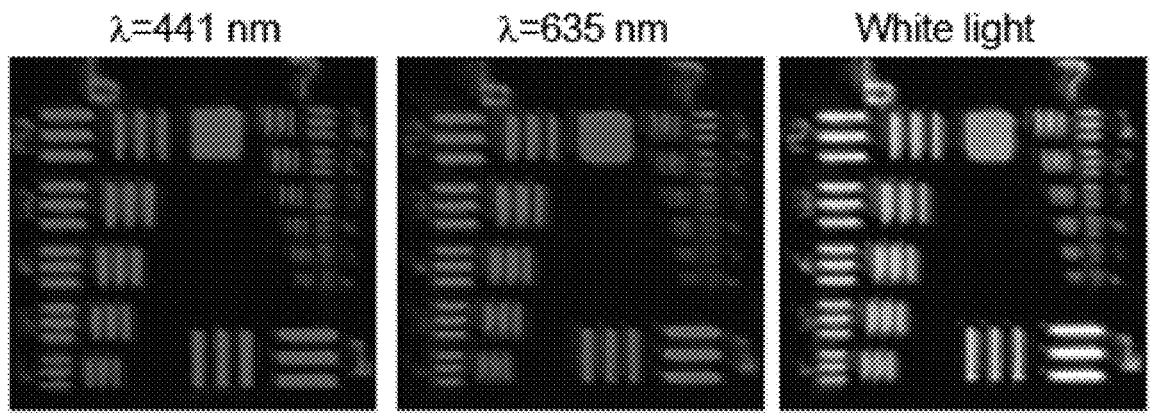
FIG. 12D shows an example recorded resolution test chart.

FIG. 12D shows an example recorded USAF 1951 resolution test chart with bandpass filters centered at 441 nm (blue light), 651 nm (red light), and 400 nm-800 nm (white light) with a 2-mm aperture. Through the recorded images shown in FIG. 12D, element 6 of Group 7 of the USAF resolution test target can be resolved at both wavelengths. Furthermore, the aspheric lens was used to image the test target under the illumination of white light (400 nm-800 nm) to characterize the broadband performance (FIG. 12D).

Figure 12E:
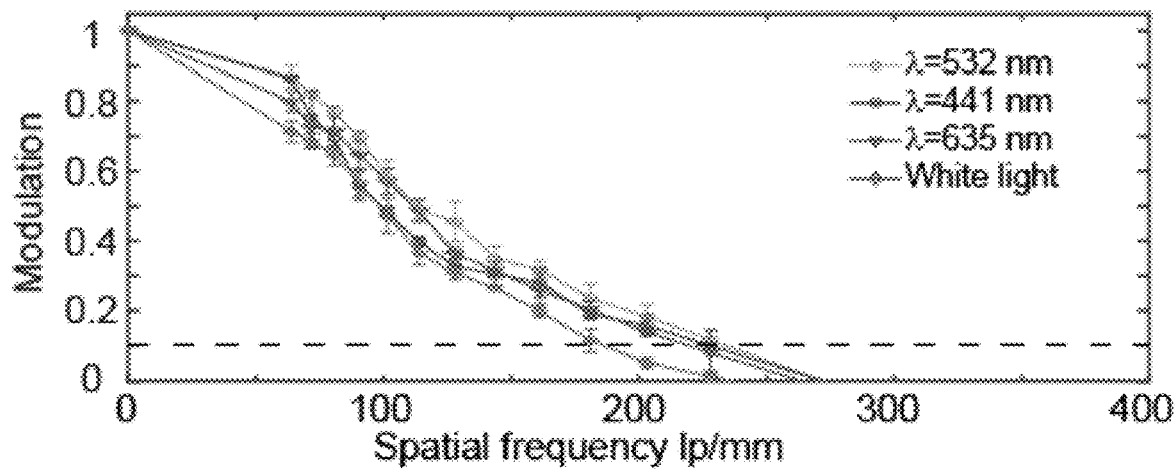
FIG. 12E shows an experimentally measured modulation transfer function for a 3D-printed lens at different wavelengths.

FIG. 12E shows an experimentally measured MTF for the 3D-printed lens at different wavelengths with a 2-mm aperture. The corresponding MTF curves shown in FIG. 12E indicate the maximum imaging resolution at the spatial frequency of 235.6 line pairs/millimeter (lp/mm), 228.5 lp/mm, 220.3 lp/mm, and 187.5 lp/mm under the illumination of green, blue, red, and white light, respectively. The relatively low imaging resolution under white light illumination is likely caused by chromatic aberration, as the singlet lens in the example is optimized for 532 nm, for example. FIGS. 12F-12I show imaging test results for the printed lens with an aperture diameter of 3 mm, for example.

Figures 12F, 12G:
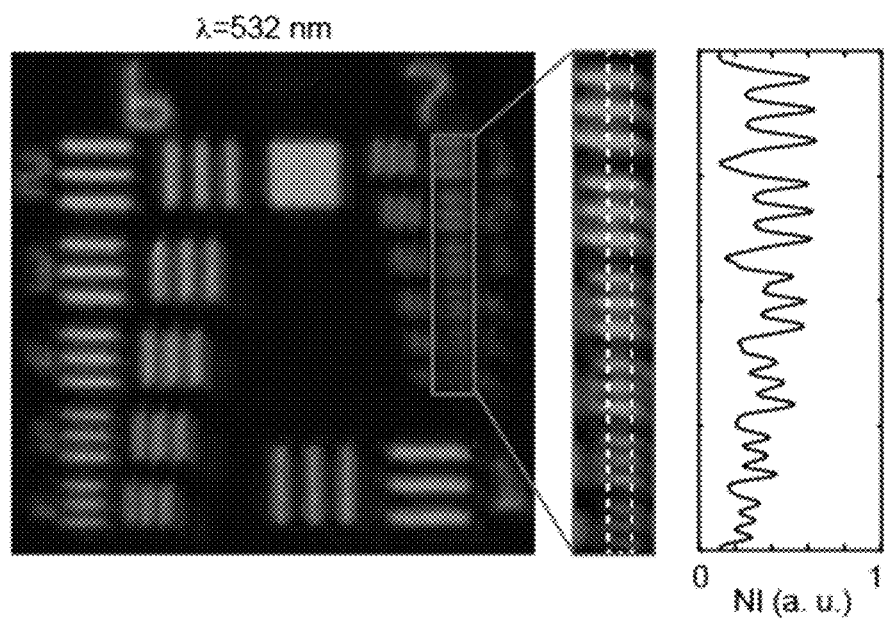
FIGS. 12F-12I show imaging test results for the printed lens.
Figure 12H:
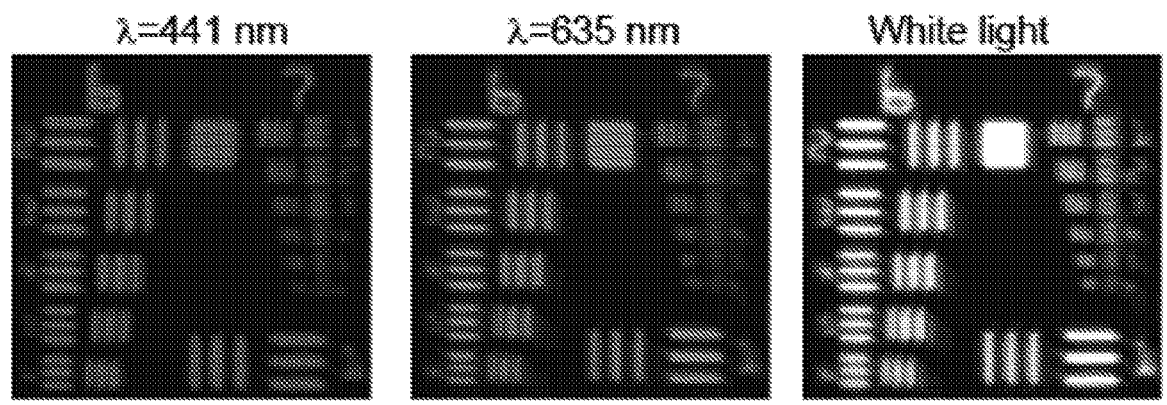
Figure 12I:
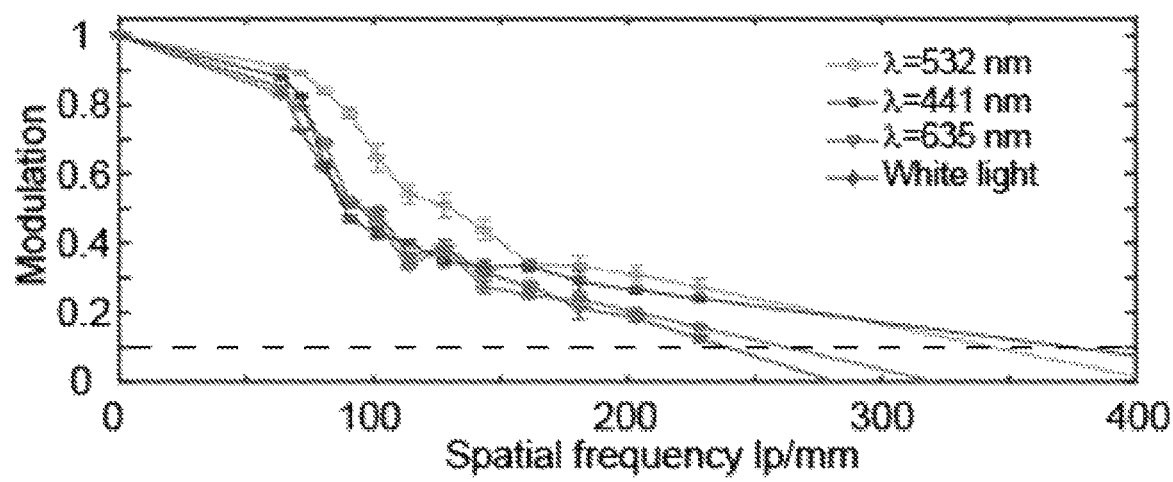
Figure 13A:
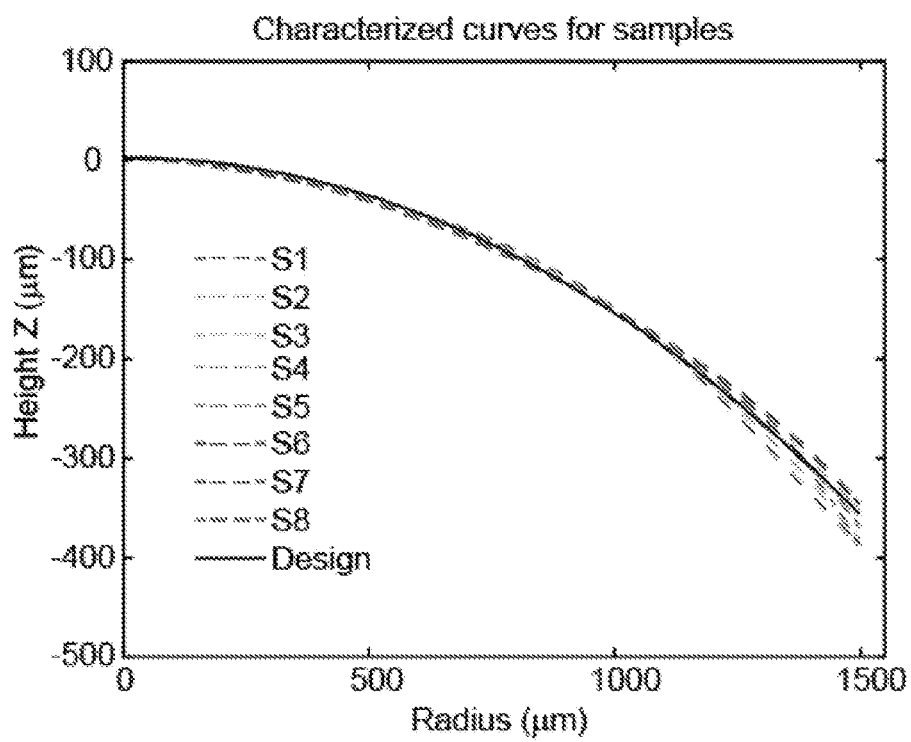
FIGS. 13A-13D illustrate numerical evaluations of experimentally measured lens profiles.
Figure 13B:
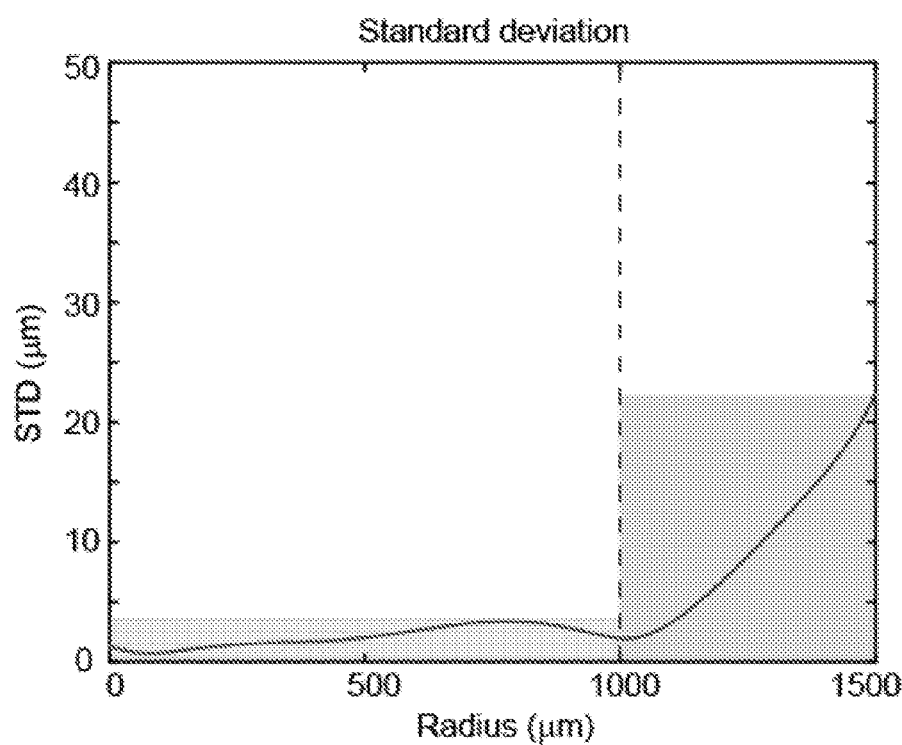
Figure 13C:
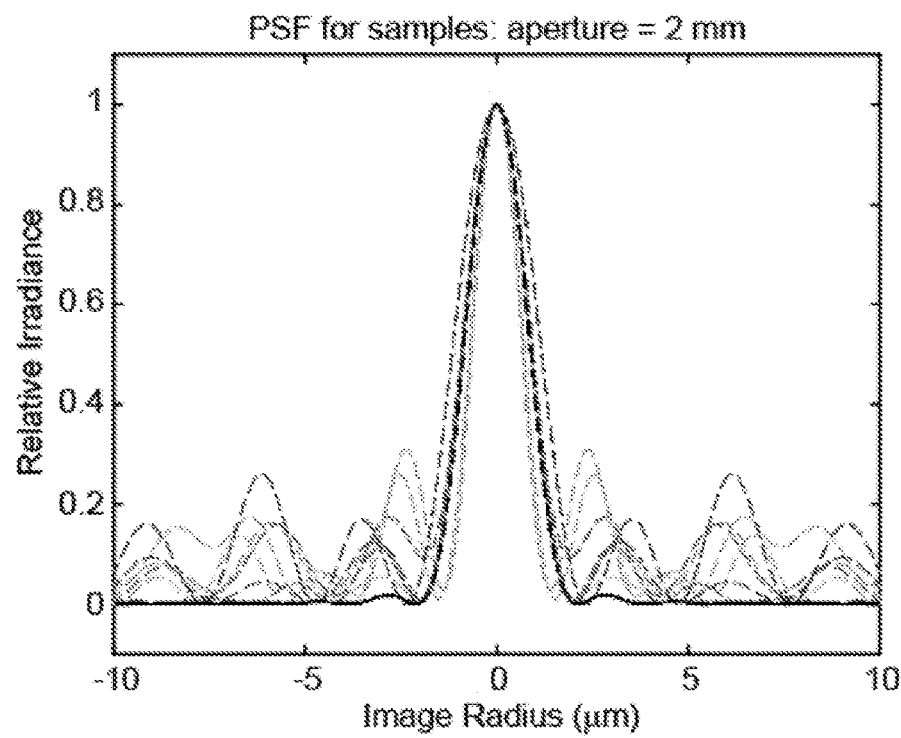
Figure 13D:
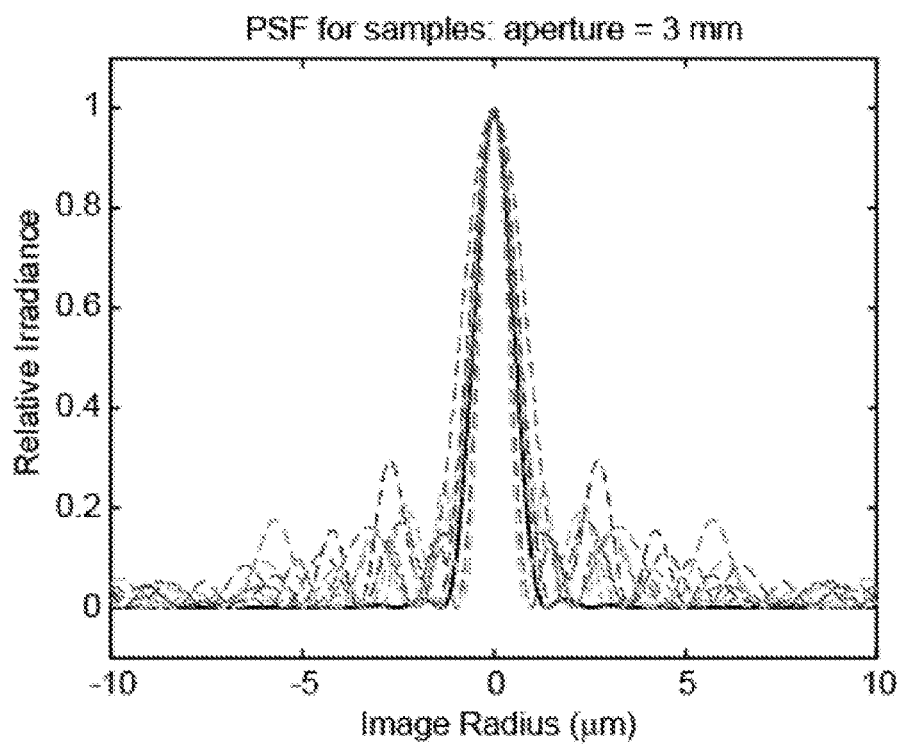

While using a larger aperture can favorably increase the numerical aperture and, thus, the diffraction-limited resolution, the elevated manufacturing error in the peripheral region of the 3D-printed aspheric lens may negatively impact the imaging resolution. The trade-off has been evaluated numerically based on the experimentally measured lens profiles (FIGS. 13A-13D) and the results suggest the imaging resolution can be further improved with the aperture wide open (e.g., 3 mm in diameter). FIG. 12F shows the acquired image of the USAF 1951 resolution test target under green illumination. FIG. 12G shows the corresponding cross-sectional image along the highlighted panel in the magnified image of Group 7 in FIG. 12F, in which element 6 of group 7 of the test target can be clearly resolved. Moreover, the broadband optical performance of the aspheric lenses was characterized by imaging the resolution test chart at multiple illumination wavelengths (FIG. 12H). The corresponding MTF curves shown in FIG. 12I indicate the maximum imaging resolution at the spatial frequency of 343.2 lp/mm, 373.2 lp/mm, 238.7.3 lp/mm, and 262.2 lp/mm under the illumination of green, blue, red, and white light, respectively. The imaging resolution significantly improved compared with the 2-mm aperture. Therefore, due to the large slope at the peripheral region, the larger manufacturing error is still acceptable and maximum imaging resolution can be obtained by keeping the aperture fully occupied.

In certain examples, a 3D-printed aspheric singlet lens can be attached to a cell phone and/or other camera using an un-cured resin without the additional UV curing step (FIG. 14A). The images shown in FIGS. 14B-14D confirm the optical quality of the printed lens. In detail, FIG. 14B depicts the image of Groups 4-7 of the USAF 1951 resolution test target (T-20-P-CG, Applied Image, Inc.) taken through the aspheric lens, in which the numbers and lines of the elements of Group 4 and 5 can be clearly distinguished. Moreover, the distortion is characterized qualitatively with the grid pattern (IAM-8-CG, Applied Image, Inc.) in FIG. 14C; there is no visible distortion within the red-dashed square corresponding with the 2-mm field of view (FOV), which agrees well with the simulation result (FIGS. 9A-9D). Furthermore, the printed lens is capable of imaging multi-color samples, as shown in FIGS. 14D-14G. In detail, the colorful features of a sunset moth's wing (FIG. 14E) and a spot on a weevil's elytra (FIG. 14G) can be clearly resolved, which is consistent with the resolution test under multiple wavelengths shown in FIGS. 12A-12I. Therefore, all of the tests corroborated that the 3D-printed aspheric lens can be well integrated with commercial cameras, as it not only supports high-resolution images but also features low distortion over the broad visible spectrum.

Thus, certain examples provide a time- and cost-efficient single-photon micro-stereolithography method to accomplish high-throughput 3D printing of customized aspheric imaging lenses. Certain examples integrate a grayscale photopolymerization process and a meniscus equilibrium post-curing process to completely remove the pixelated surface roughness from the PµSL technique while maintaining high fabrication speed. Certain examples enable 3D-printing of optical elements with deep subwavelength surface smoothness (e.g., <7 nm), sub-voxel-scale precision (e.g., <5 µm), and high reproducibility, offering a highly reliable solution for the rapid prototyping of customized optical components from the optimized design. The printed lenses not only feature low distortion, but also show remarkable optical quality over the broad spectrum of the visible light. Although certain examples focus on the up-facing optical surface, the down-facing surface can be shaped and printed by carefully programming an effect of gravity force. Alternatively or in addition, more sophisticated optical elements can also be accomplished using the molding process. In addition, to make the 3D-printed lens suitable for working in much tougher environments, the anti-scratch characteristics of the printed lenses can be further improved by optimizing the UV-curable resin and the coatings materials. For example, UV-curable resin mixed with silica nanoparticles brings opportunities for direct 3D printing of glass components, and the scratch resistance can also be improved by adding extra proactive coatings, such as $Al_2O_3$ or diamond-like carbon (DLC). Certain examples enable 3D printing techniques for optical applications impacting freeform optics and biomedical imaging.

EXAMPLES

The articles of manufacture and associated systems, apparatus, and methods can be illustrated through the following examples.

Photocurable resin: For the sample material, the photocurable resin consists of 94 wt. % 1,6-hexanedioldiacrylate (HDDA, Sigma-Aldrich, refractive index=1.456) as the low-viscosity monomer, and 1 wt. % Irgacure 819 (BASF) as the photoinitiator. A 5% wt. % 2-(2H-Benzotriazol-2-yl)-6-dodecyl-4-methylphenol (Sigma Aldrich, named by BASF as Tinuvin 171) was used as a UV absorber to control the curing depth, and the refractive index of the photocurable resin is plotted in FIG. 10.

Figure 15B:
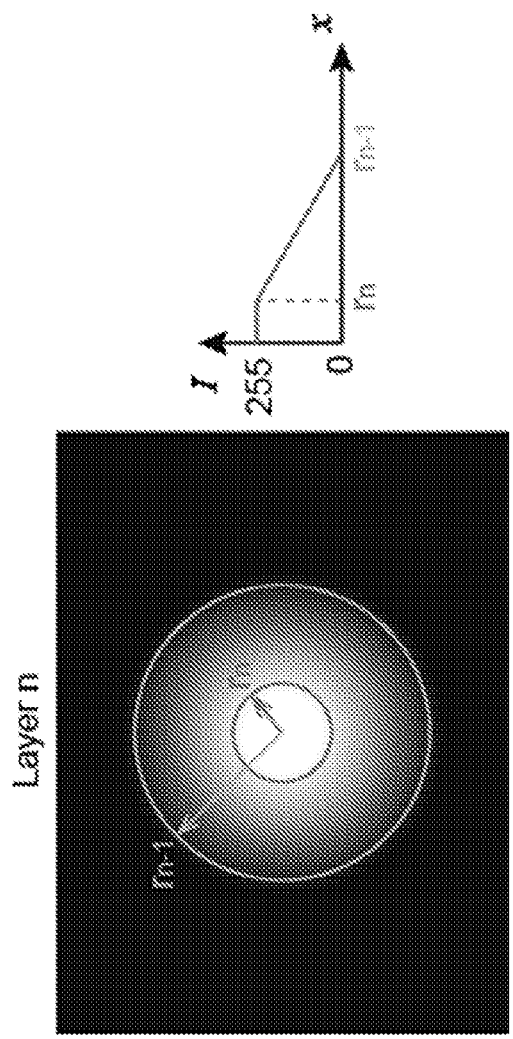
FIGS. 15A-15B illustrate an example generation of grayscale bitmaps.
Figure 15A:
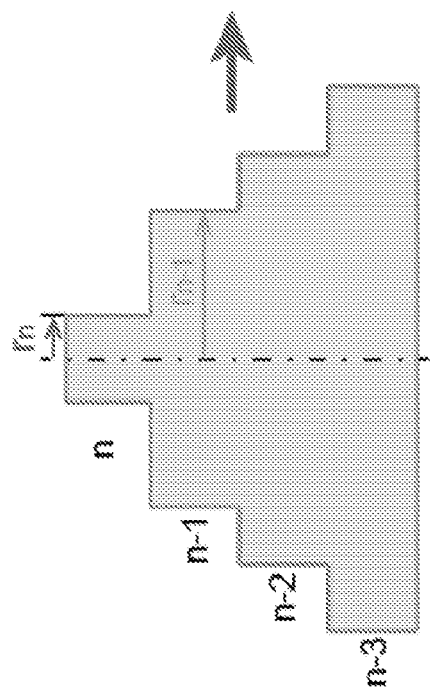

Projection micro-stereolithography (PµSL) system: The PµSL system can be employed to manufacture the optical elements, as shown in FIG. 6A. The PµSL system uses a liquid crystal on a silicone (LCoS) chip as the dynamic mask with a resolution of 1400×1050 $pixel^2$. By toggling the voltage applied to each individual pixel, the orientation of liquid crystal molecules can be controlled digitally with an 8-bit modulation depth, which corresponds to the grayscale level from 0 to 225. In certain examples, at the given illumination level, the intensity of each individual pixel is proportional to the corresponding grayscale level, of which 0 and 255 respectively represent minimal and maximum intensity. The computer-aided design (CAD) model is first sliced into a sequence of 2D grayscale bitmap patterns with specific thicknesses along the Z direction, which were then loaded to the LCoS chip (FIGS. 15A-15B illustrate an example generation of grayscale bitmaps). The UV illumination (405 nm) on the LCoS display generated patterned light, of which 256 distinct intensity levels can be obtained via using a standard 8-bit grayscale image. The grayscale modulated light was further projected onto the top surface of the photocurable resin with a high resolution (7.1×7.1 $µm^2$ per pixel), and the liquid resin under the illuminated light (white pattern in the mask) would be polymerized into a solid layer. In addition, the higher grayscale value (corresponding to greater light intensity) beyond the threshold of polymerization will lead to a thicker curing depth. Therefore, it is possible to create transition at the region of stair steps between adjacent fabrication layers.

In the example of FIG. 15A, a 3D CAD model is first sliced into a sequence of 2D grayscale bitmap patterns according to the designed layer thicknesses. As shown in FIG. 15A, the grayscale profile is determined as the linear interpolation of the adjacent layers (FIG. 15B). The grayscale bitmaps are then loaded into the liquid crystal on silicone (LCoS) chip as the dynamic masks.

Grayscale PµSL fabrication process: A substrate is mounted on a motorized translation stage (ATS100-100, Aerotech) with a precision of 0.5 µm. Both substrate and the top surface of the UV-curable resin are aligned with the focal plan of the projection lens, which is defined as the home position for clarity. The PµSL system is equipped with an air-tight chamber. The exposure system is purged with the nitrogen gas to remove the oxygen in order to help ensure consistent curing characteristics of the liquid resin. The substrate is then immersed into the resin by 600 µm at the speed of 1000 µm/s to help ensure that the substrate is sufficiently coated with the fresh resin. The substrate is then raised upwards for 595 µm at a much slower speed of 150 µm/s. Next, the substrate dwells for 20 seconds to ensure the flatness of top resin surface. This results in a thin coating of fresh resin with the thickness of 5 µm. In the case of fabricating layers with 20 µm thickness, the substrate is raised upwards for 580 µm (from the initial 600 µm submersion step), for example, while other parameters remain the same. The grayscale exposure mask is then projected onto the surface of the resin and turns the surface into a solid layer. The exposure time was optimized using a working curve method, for example. In this case, 3 seconds and 15 seconds are the optimized exposure times for fabricating the layers with 5 µm and 20 µm thickness, respectively. The LCoS dynamic mask is then switched to black to prevent further exposure and the above-mentioned processes are repeated for each fabrication layer. Finally, the lens featuring reduced step-case roughness is fabricated via such a layer-by-layer fashion.

Meniscus equilibrium post-curing method: The meniscus equilibrium post-curing method is employed to further smoothen the lens surface. After the lens featuring reduced step-case roughness is fabricated via grayscale PµSL fabrication method, the lens is raised above the UV-curable resin with the substrate moved back to the initial home position at a speed of 150 µm/s. The lens carries a fresh coating of uncured resin, which forms meniscus at the recessed corners of each fabrication layer to further smoothen the lens surface. The stage dwells for 30 to 60 seconds to allow the meniscus coating to be fully stabilized. The resin bath is subsequently removed to protect the UV-resin from additional UV exposure from the post-curing process. In the subsequent post-curing process, flood exposure of the meniscus coating is performed by loading the fully white mask pattern into the LCoS. The lens is lowered at 5 µm increments with a constant exposure time of 3 seconds. Upon accomplishing the post-curing process, the solidified meniscus provides smooth transition between printed layers with the optical properties identical to the base structures.

Transfer of the printed lenses: Once the lens is fabricated, the lens is removed from the silicon substrate and transferred onto the quartz substrate. The same UV-curable resin is used to attach the lens to the quartz substrate to 1) index matching media to eliminate air/polymer interface, and 2) adhesion layer to promote bonding between the lens and quartz substrate with an additional UV curing step.

Aspheric lens design: The complex surface profile of the aspheric lens is optimized to minimize spherical aberration and image distortion. The aspheric surface profile is defined in a cylindrical coordinate system:

$$z(r) = \frac{r^2}{R\left(1 + \sqrt{1-(1+\kappa)\frac{r^2}{R^2}}\right)} + \alpha_4 r^4 + \alpha_6 r^6 + \ldots, \quad \text{(Eq. 3)}$$

where R is the radius of curvature, k is the conic constant, and $\alpha_4$, $\alpha_6$, . . . are the aspheric coefficients, respectively. The optic axis is pointing along the Z direction, and the lens diameter is 3 mm. The surface profile is optimized for improving the imaging resolution while minimizing the field distortion at the wavelength of 532 nm (see, e.g., FIGS. 9A-9D). The experimentally measured refractive indices of the photocurable resin, quartz, and index matching liquid are used for optimization (FIG. 10). The optimized radius of the curvature (R) is 3.025 mm, and the conic constant ($\kappa$) is 0, which defines an axially symmetric quadric surface. The aspheric coefficient $\alpha_i$ describing the deviation of the surface from the axially symmetric quadric surface are $\alpha_4 = -1.922 \times 10^{-3}$ mm$^{-3}$ and $\alpha_6 = -2.688 \times 10^{-4}$ mm$^{-5}$. In addition, the Huygens point spread function (PSF) is calculated to characterize the performance of the designed lens (FIGS. 9A-9D). The lateral resolution of the optimized aspheric lens can be retrieved through the PSF, in which the theoretical optimal resolution is res$_{3mm}$=1.382 μm when the aperture diameter is 3 mm. When stepping down the aperture to 2 mm in diameter, the imaging resolution reduces to res$_{2mm}$=2.104 μm. In addition, the optimized lens features a maximum distortion of 0.13% within the field of view (FOV) of 2 mm in diameter (FIGS. 9A-9D).

Optical Characterization of the 3D printed aspheric lens: An optical performance of the 3D-printed aspheric lens is characterized by imaging the USAF 1951 resolution test target (T-20-N-CG, Applied Image, Inc.). The bottom surface of the 3D-printed lens is attached to a 3.175 mm-thick quartz substrate to serve as the objective lens in an inverted microscope (Eclipse TI, Nikon), with a halogen lamp as white illumination (400-800 nm). Multiple bandpass filters with center wavelengths of 532 nm (FL532-10, 10 nm FWHM, Thorlabs), 441 nm (FL441.6-10, 10 nm FWHM, Thorlabs), and 635 nm (FL635-10, 10 nm FWHM, Thorlabs) are inserted into the microscope for green, blue, and red illumination. As shown in the example configuration of FIG. 12A, a resolution test target is placed at the front focal plane of the 3D-printed aspheric lens and the image is collected and analyzed via an inverted microscope body with a matching monochrome CCD camera (270 XS, pixelfly qe, PCO Tech.). The camera possesses a total active area of 1,392×1,024 pixels, with a pixel size of 6.45×6.45 μm$^2$, for example.

VIII. Software and Computer Systems

In various examples, the methods and systems of the invention may further comprise software programs on computer systems and use thereof. Accordingly, computerized control for the synchronization of system functions such as laser system operation, fluid control function, and/or data acquisition steps are within the bounds of the invention. The computer systems may be programmed to control the timing and coordination of delivery of sample to a detection system, and to control mechanisms for diverting selected samples into a different flow path. In some examples of the presently disclosed technology, the computer may also be programmed to store the data received from a detection system and/or process the data for subsequent analysis and display.

Figure 16:
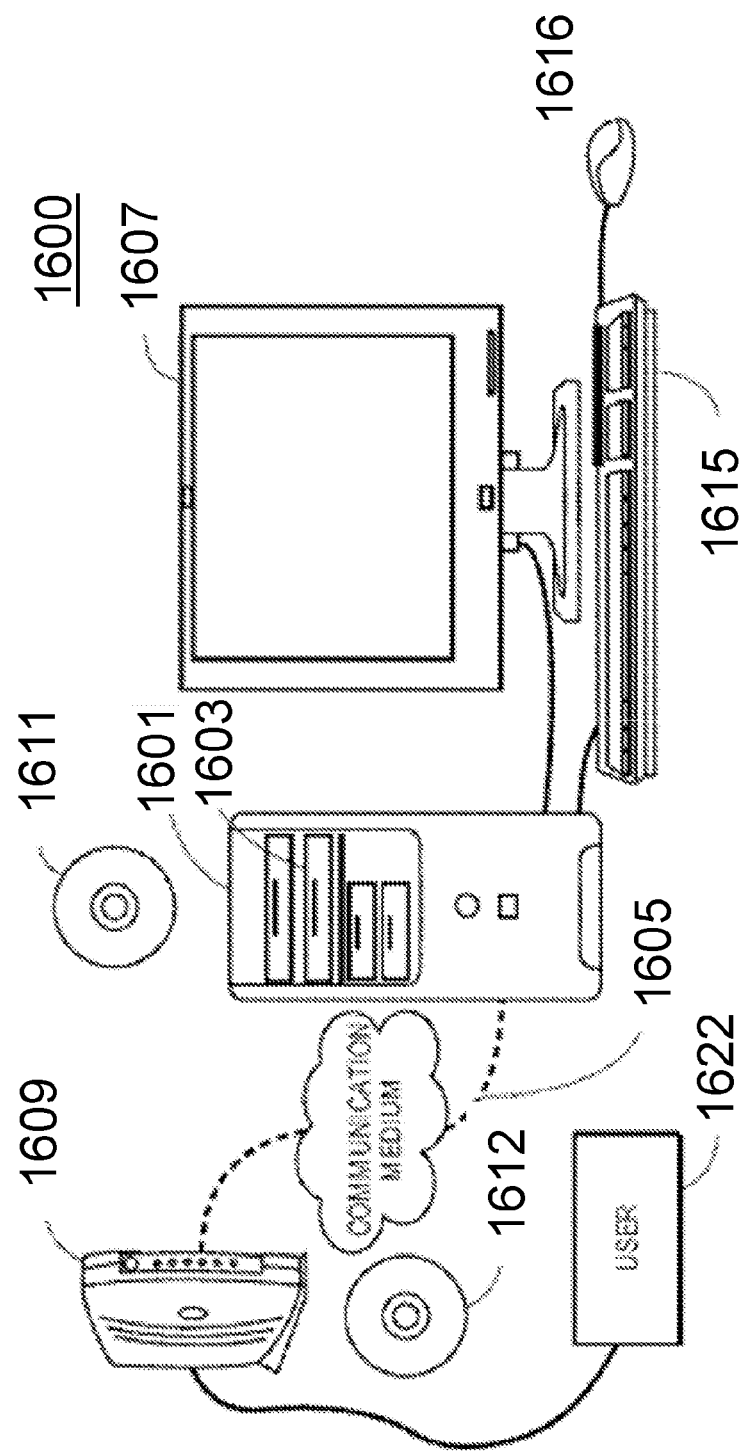
FIG. 16 is a diagram illustrating a first example a computer system that can be used in connection with one or more systems, methods, and devices of this disclosure, including handheld or mobile devices.

The computer system 1600 illustrated in FIG. 16 may be understood as a logical apparatus, 1607, 1605, that can read instructions from media 1612 and/or a network port, which can optionally be connected to server having fixed media 1609. The system, such as shown in FIG. 16 can include a CPU, 1601 disk drives, 1603, optional input devices such as handheld devices, 1616, for receiving one or more images, or other instrument types such as a laboratory or hospital-based instrument 1611. Data communication can be achieved through the indicated communication medium to a server at a local or a remote location. The communication medium can include any means of transmitting and/or receiving data. For example, the communication medium can be a network connection, a wireless connection or an internet connection. Such a connection can provide for communication over the World Wide Web. It is envisioned that data relating to the present disclosure can be transmitted over such networks or connections for reception and/or review by a party or user, 1622 as illustrated in FIG. 16.

Figure 17:
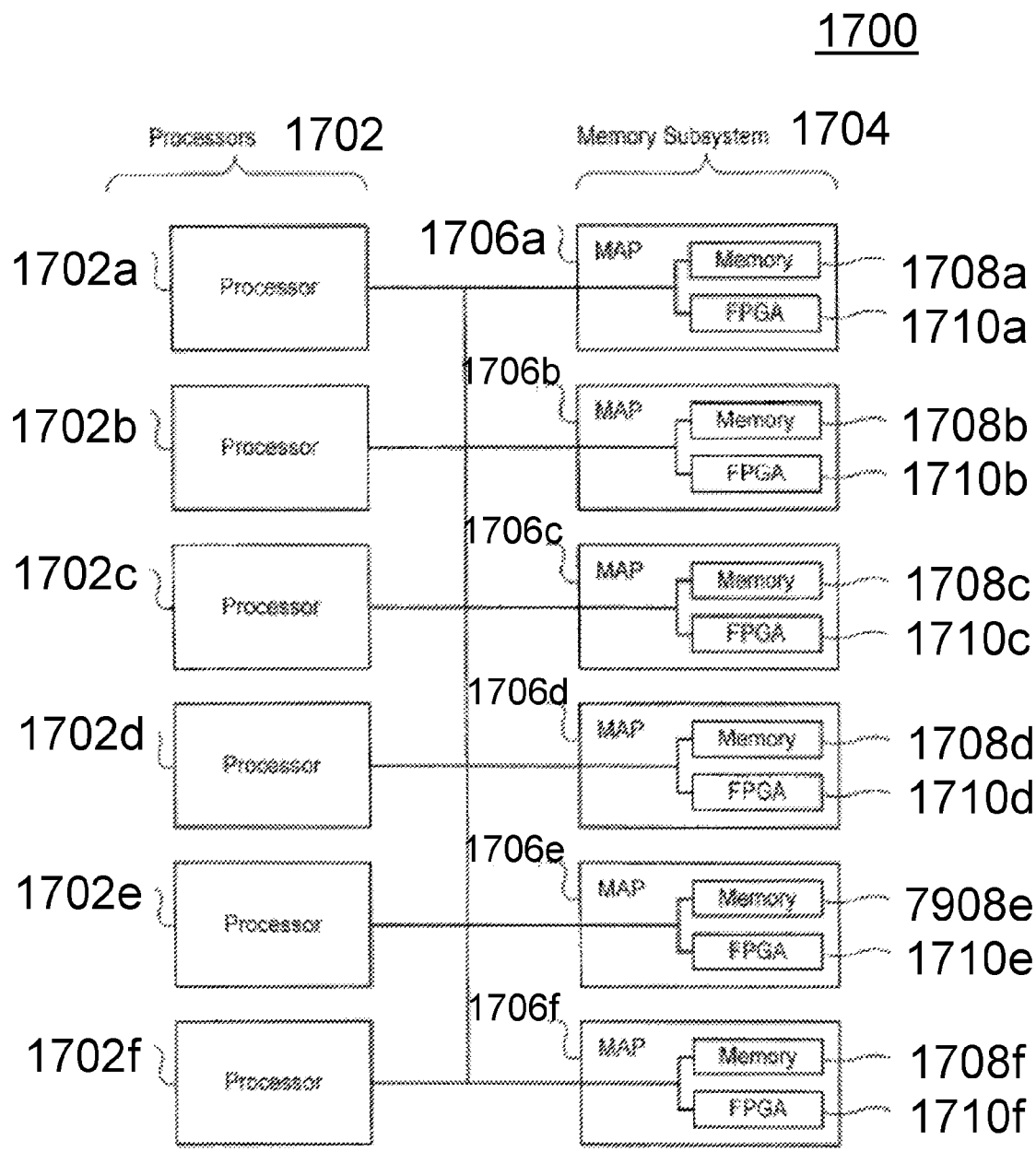
FIG. 17 is a diagram showing a network with a plurality of computer systems, and a plurality of cell phones and personal data assistants configured with systems, methods, and devices of this disclosure.

FIG. 17 is a block diagram illustrating an example architecture of a computer system 1700 that can be used in connection with example examples of the disclosure. As depicted in FIG. 17, the example computer system can include a processor 1702 for processing instructions. Non-limiting examples of processors include: Intel Xeon™ processor, AMD Opteron™ processor, Samsung 32-bit RISC ARM 1176JZ(F)-S vl.O™ processor, ARM Cortex-A8 Samsung S5PC100™ processor, ARM Cortex-A8 Apple A4™ processor, Marvell PXA 930™ processor, or a functionally-equivalent processor. Multiple threads of execution can be used for parallel processing. In some examples, multiple processors or processors, 1704, 1702a, 1702b, 1702c, 1702d, 1702d, 1702e, 1702f, with multiple cores, 1706a, 1706b, 1706c, 1706d, 1706d, 1706e, 1706f can also be used, whether in a single computer system, in a cluster, or distributed across systems, 1708a, 1708b, 1708c, 1708d, 1708d, 1708e, 1708f, over a network including a plurality of computers, cell phones, and/or personal data assistant devices, 1710a, 1710b, 1710c, 1710d, 1710d, 1710e, 1710f.

Figure 18:
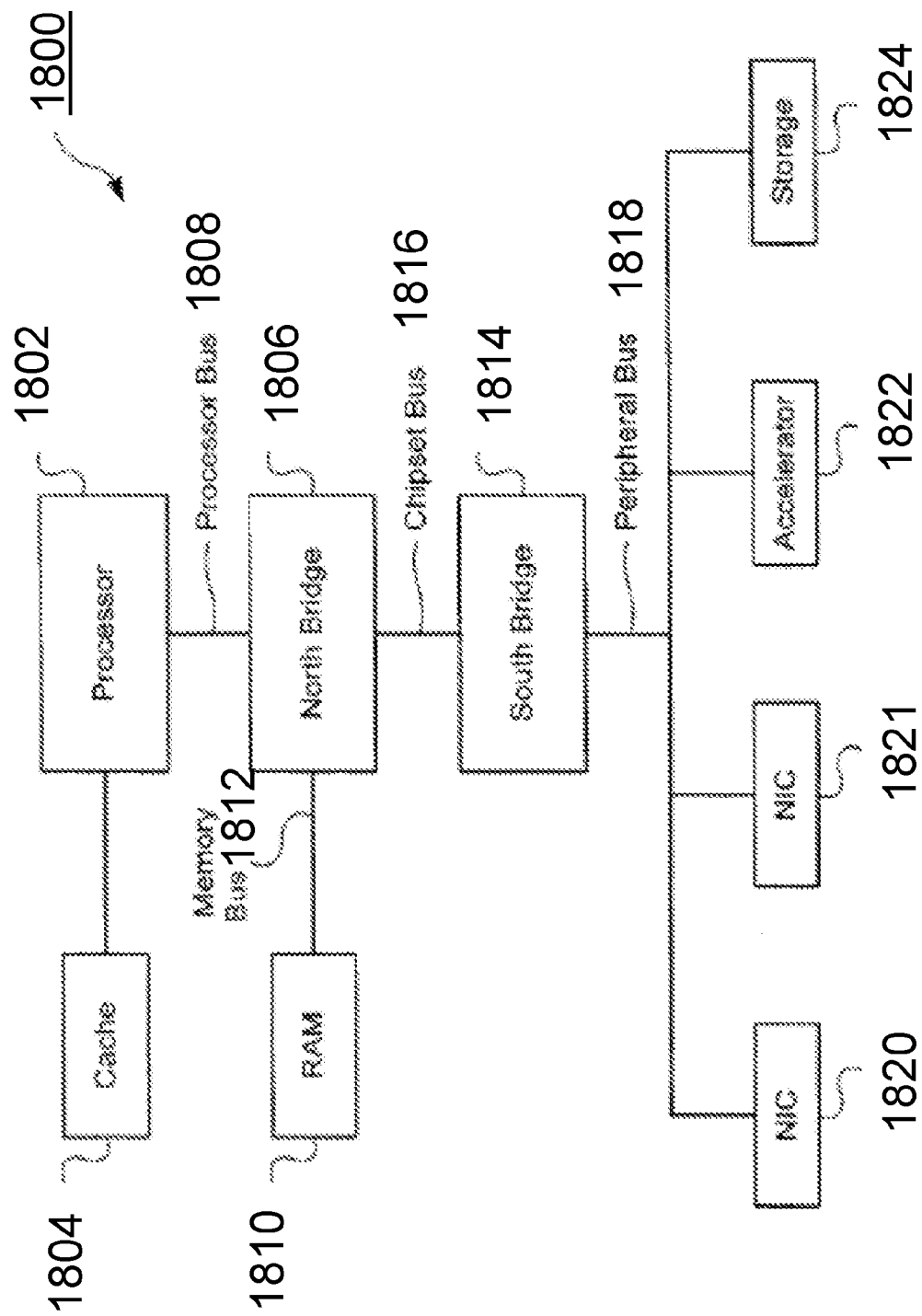
FIG. 18 is a block diagram illustrating a first example architecture of a computer system that can be used in connection with systems, methods, and devices of this disclosure.

As illustrated in the example system 1800 of FIG. 18, a high-speed cache 1804 can be connected to, or incorporated in, the processor 1802 to provide a high-speed memory for instructions or data that have been recently, or are frequently, used by processor 1802. The processor 1802 is connected to a north bridge 1806 by a processor bus 1808. The north bridge 1806 is connected to random access memory (RAM) 1810 by a memory bus 1812 and manages access to the RAM 1810 by the processor 1802. The north bridge 1806 is also connected to a south bridge 1814 by a chipset bus 1816. The south bridge 1814 is, in turn, connected to a peripheral bus 1818. The peripheral bus 1818 can be, for example, PCI, PCI-X, PCI Express, or other peripheral bus. The north bridge 1806 and south bridge 1814 are often referred to as a processor chipset and manage data transfer between the processor, RAM, and peripheral components on the peripheral bus 1818. In some alternative architectures, the functionality of the north bridge 1806 can be incorporated into the processor 1802 instead of using a separate north bridge chip.

In some examples, system 1800, can include an accelerator card 1822 attached to the peripheral bus 1818. The accelerator 1822 can include field programmable gate arrays (FPGAs) or other hardware for accelerating certain processing. For example, an accelerator 1822 can be used for adaptive data restructuring or to evaluate algebraic expressions used in extended set processing.

Software and data are stored in external storage 1824 and can be loaded into RAM 1810 and/or cache 1804 for use by the processor 1820. The system, 1800 includes an operating system for managing system resources; non-limiting examples of operating systems include: Linux, Windows™, MACOS™, BlackBerry OS™, iOS™, and other functionally-equivalent operating systems, as well as application software running on top of the operating system for managing data storage and optimization in accordance with example examples of the present disclosure.

In this example, system 1800 also includes network interface cards (NICs) 1820 and 1821 connected to the peripheral bus for providing network interfaces to external storage 1824, such as Network Attached Storage (NAS) and other computer systems that can be used for distributed parallel processing.

Figure 19:
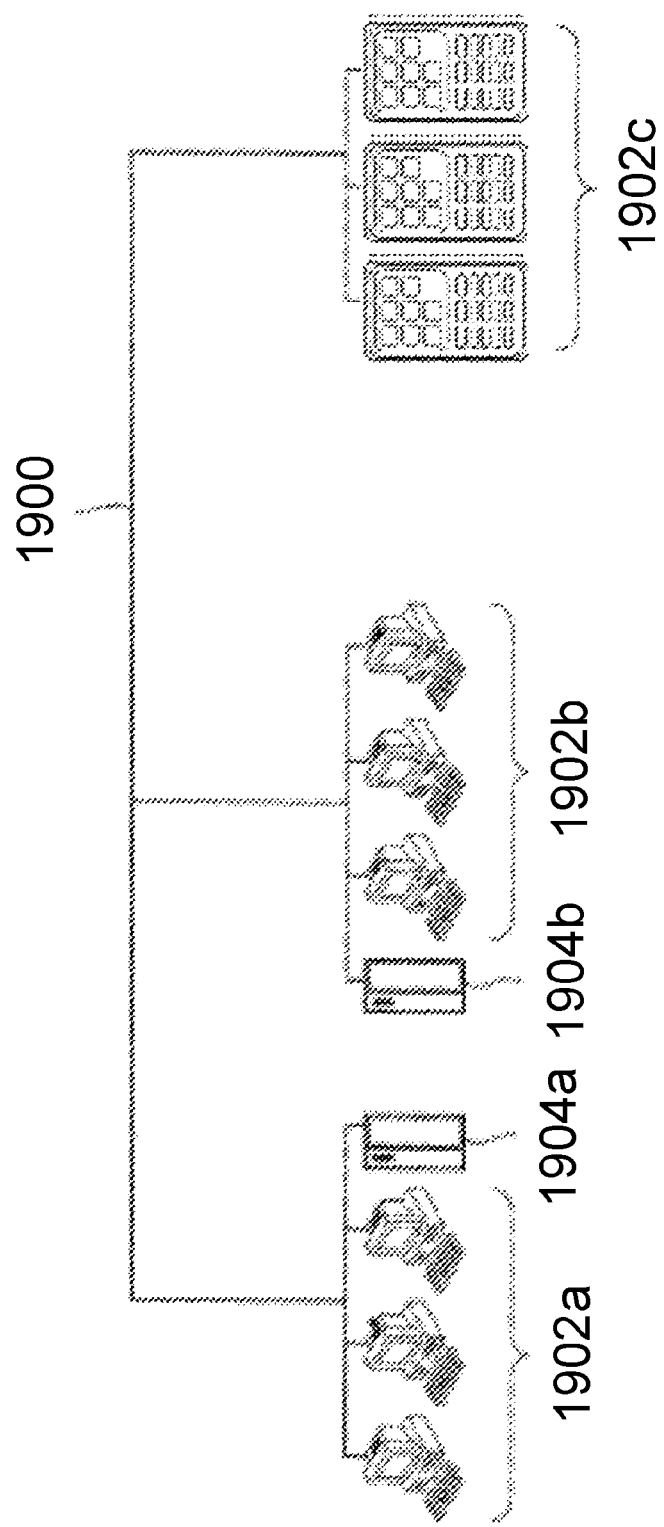
FIG. 19 is a diagram showing a network with a plurality of computer systems, and a plurality of cell phones and personal data assistants configured with systems, methods, and devices of this disclosure.

FIG. 19 is a diagram showing a network, 1900 with a plurality of computer systems 1902a, and 1902b, a plurality of cell phones and personal data assistants 1902c, and Network Attached Storage (NAS) 1904a, and 1904b. In some examples, systems 1902a, 1902b, and 1902c can manage data storage and optimize data access for data stored in Network Attached Storage (NAS) 1904a and 1904b. A mathematical model can be used for the data and be evaluated using distributed parallel processing across computer systems 1902a, and 1902b, and cell phone and personal data assistant systems 1902c. Computer systems 1902a, and 1902b, and cell phone and personal data assistant systems 1902c can also provide parallel processing for adaptive data restructuring of the data stored in Network Attached Storage (NAS) 1904a and 1904b. FIG. 19 illustrates an example only, and a wide variety of other computer architectures and systems can be used in conjunction with the various examples of the present invention. For example, a blade server can be used to provide parallel processing. Processor blades can be connected through a back plane to provide parallel processing. Storage can also be connected to the back plane or as Network Attached Storage (NAS) through a separate network interface.

In some example examples, processors can maintain separate memory spaces and transmit data through network interfaces, back plane or other connectors for parallel processing by other processors. In other examples, some or all of the processors can use a shared virtual address memory space.

The above computer architectures and systems are examples only, and a wide variety of other computer, cell phone, and personal data assistant architectures and systems can be used in connection with example examples, including systems using any combination of general processors, co-processors, FPGAs and other programmable logic devices, system on chips (SOCs), application specific integrated circuits (ASICs), and other processing and logic elements. In some examples, all or part of the computer system can be implemented in software or hardware. Any variety of data storage media can be used in connection with example examples, including random access memory, hard drives, flash memory, tape drives, disk arrays, Network Attached Storage (NAS) and other local or distributed data storage devices and systems.

In some examples of present disclosure, the computer system can be implemented using software modules executing on any of the above or other computer architectures and systems. In other examples, the functions of the system can be implemented partially or completely in firmware, programmable logic devices such as field programmable gate arrays, system on chips (SOCs), application specific integrated circuits (ASICs), or other processing and logic elements. For example, the Set Processor and Optimizer can be implemented with hardware acceleration through the use of a hardware accelerator card, such as accelerator card.

Additional Examples

Figure 20A:
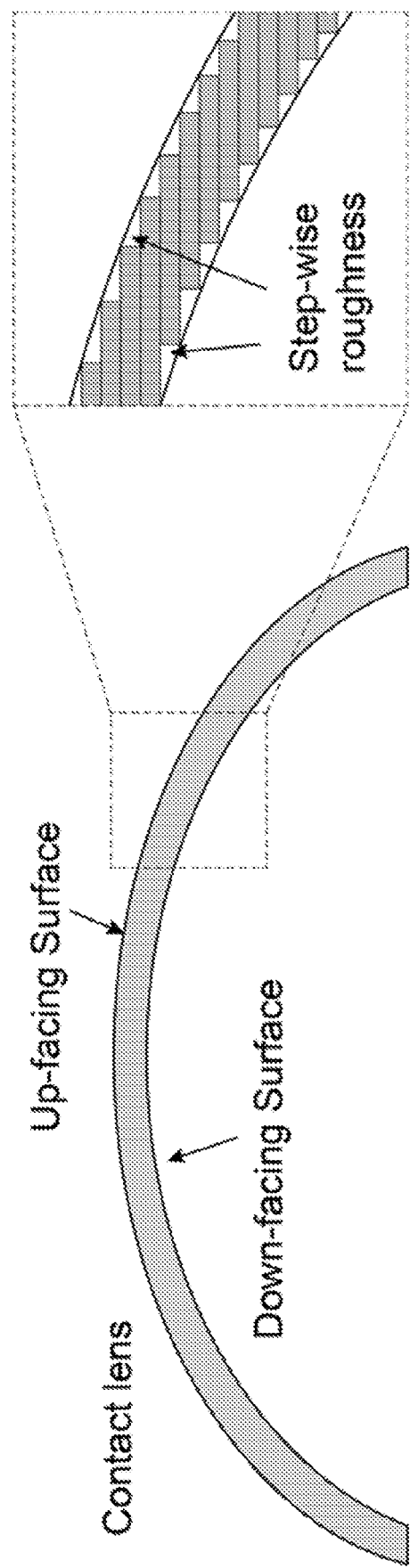
FIG. 20A is a schematic illustration of optical lens comprises both up-facing and down-facing surfaces. A contact lens is used as a representative example. The inset illustrates the step-wise roughness appears on both up-facing and down-facing surfaces, which are originated from the layered manufacturing process.

An exemplary object that may be manufactured according the methods and systems disclosed herein is a contact lens. A contact lens is a thin meniscus lens directly placed on the surface of cornea for the purposes of vision correction, eye protection, or for fulfilling cosmetic and other therapeutic needs. Traditionally, soft contact lenses were mass-produced by molding process, which leaves rather limited is flexibility in customization. The ability to 3D print optical lens offers unique solution toward potential customization in contact lens manufacturing. However, 3D print contact lenses imposes a set of new challenges. As shown in FIG. 20A, the meniscus-shaped contact lens constitutes both up-facing and down-facing surfaces that need to be manufacturer together. A contact lens needs to simultaneously satisfy both optical and biological functions. Specifically, its upper-facing surface (or, front/outer surface, from the prospective of the contact lens) needs to be optically smooth and dimensionally accurate to fulfill its optical functions. It's down-facing surface (or, back/inner surface, from the prospective of the contact lens) also needs to be smooth to ensure proper contact with the corneal for biocompatibility. Additionally, in this Example, we validate the feasibility of combining grayscale photopolymerization and meniscus equilibrium post-curing processes.

Figure 20B:
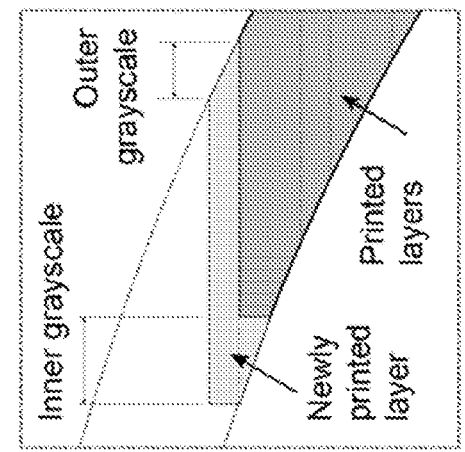
FIG. 20B is a schematic representing a dual-grayscale design (inner grayscale region and outer grayscale region) that provides smooth transition of down-facing and up-facing surfaces, respectively.
Figure 20C:
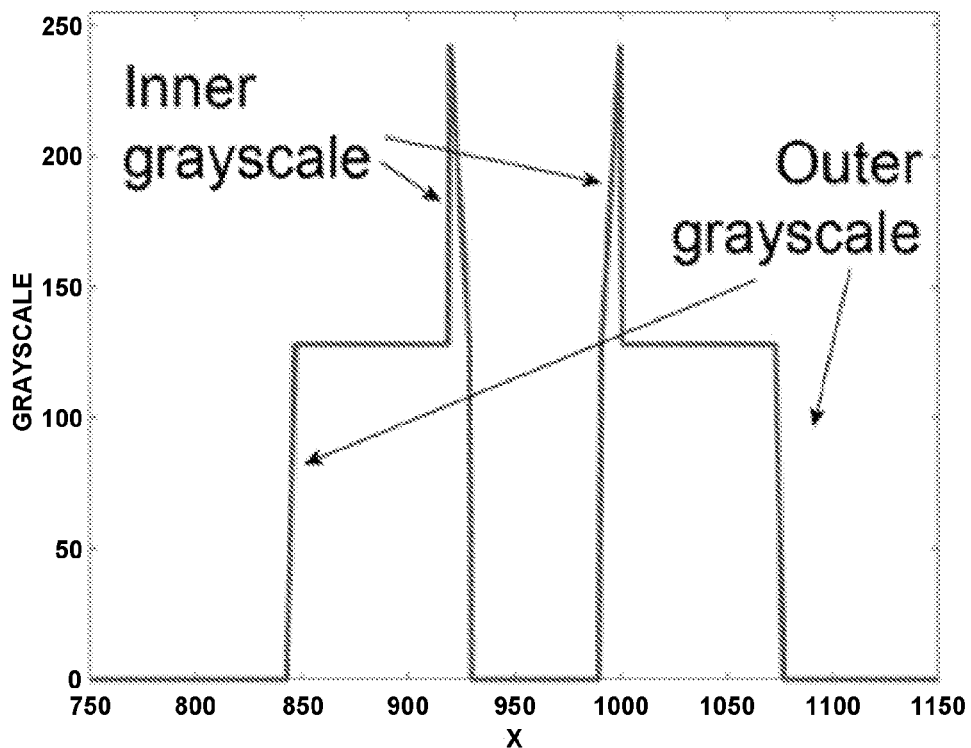
FIG. 20C is a representative example of a generated grayscale (radial) distribution of the grayscale image.
Figure 20D:
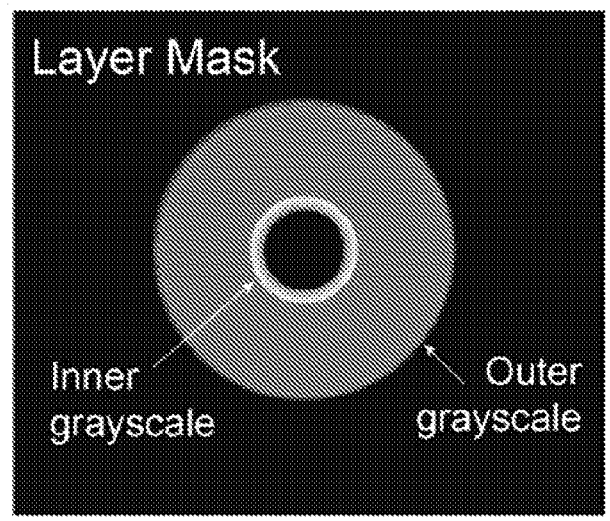
FIG. 20D is a representative example of a multi-region image of a dynamic photomask, in the form of a bitmap image, comprising both inner and outer grayscale regions.

In addressing the above-mentioned limitations, we developed an improved manufacturing strategy aiming to provide smooth transition on both up-facing and down-facing surfaces, which is a significant step in advancing the capability for direct 3D printing contact lens, or other optical lenses in general. The layer-by-layer projection micro stereolithography (3D printing) process could result in obvious step-wise surface roughness among consecutive slicing layers for both up-facing and down-facing surfaces (FIG. 20A, inset). To address this, an improved approach involves a multi-region grayscale pattern generation beyond a single sliced layer. In this example the dynamic photomask comprises a multi-region image having multiple grayscale regions. FIG. 20B shows a mask pattern, or image, with dual grayscale transition regions—the inner grayscale region and the outer grayscale region. The outer grayscale region provides a smooth transition for the up-facing surface, which can be similar to an up-facing surface of a lens such as a lens of FIG. 8. On the other hand, the inner grayscale region is designed to penetrate deeper than the current printing layer, to be attached to the previously printed layer underneath, which provides smooth transition of the down-facing surface. The representative example of the radial distribution of the grayscale and the generated layer mask in the form of bitmap image are illustrated in FIGS. 20C and 20D, respectively. Meniscus coating was then performed to further smooth the printed surface of the contact lens.

Figure 21A:
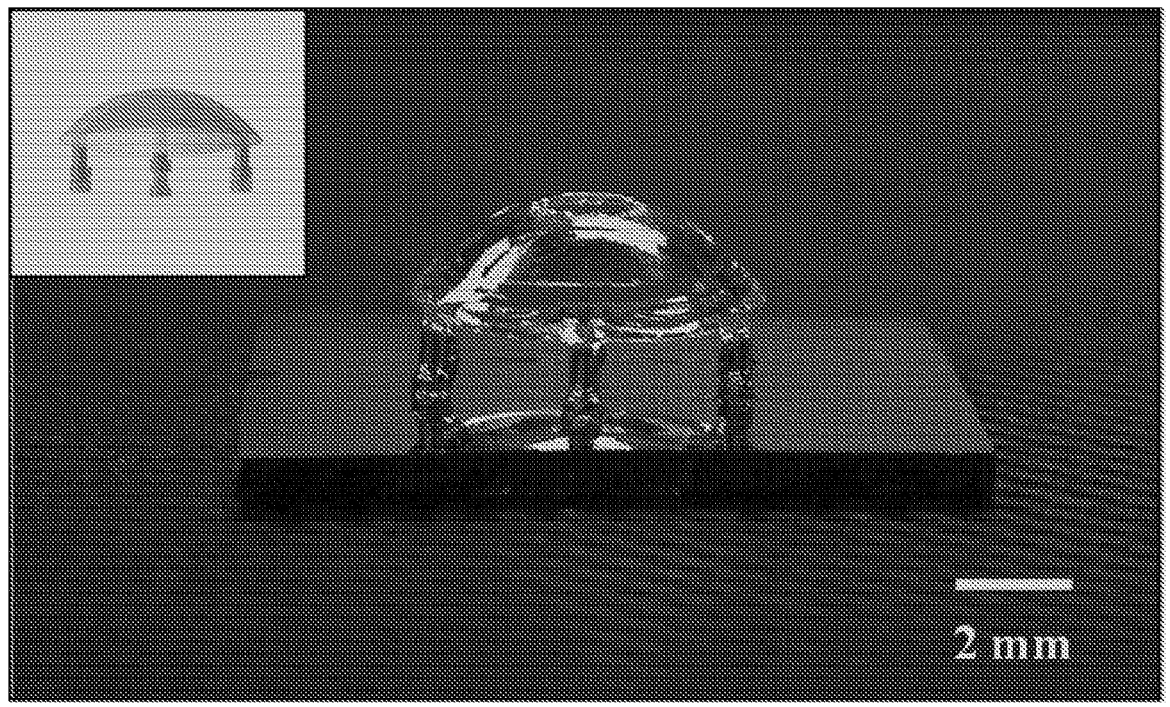
FIG. 21A shows an example of 3D printed contact lens, with inset showing a computational (CAD) model.
Figure 21B:
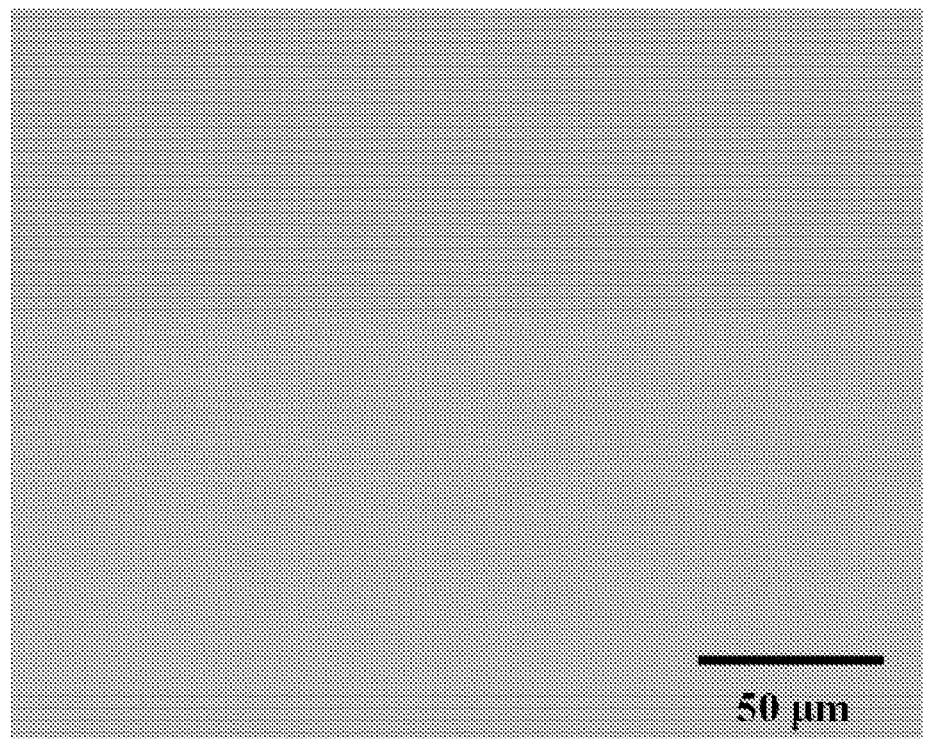
FIG. 21B shows a scanning electron micrograph (SEM) image of the outer surface of a printed contact lens.
Figure 22A:
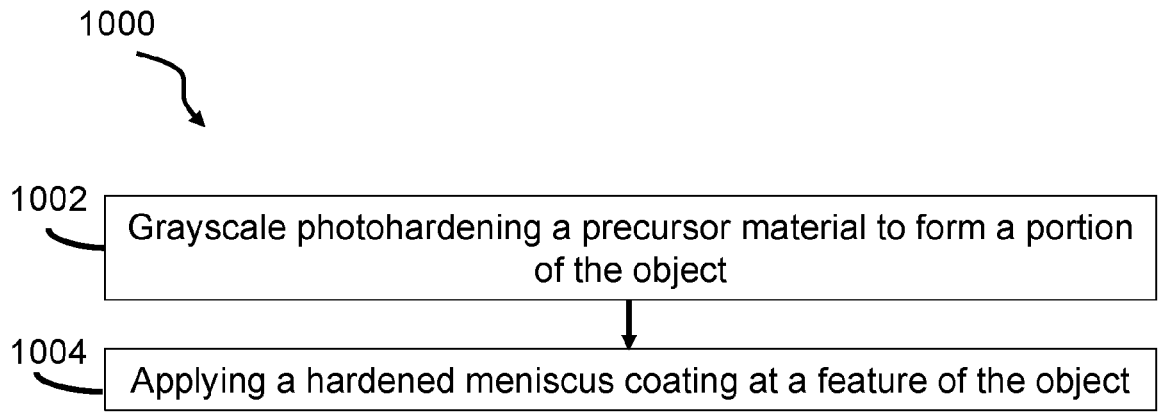
FIG. 22A is a flowchart demonstrating steps of a method for additive manufacture of a three-dimensional object based on a computational model, according to certain embodiments. Each of FIGS. 22B-22R is independently a flowchart demonstrating optional steps of the method of FIG. 22A, according to certain embodiments.
Figure 22B:
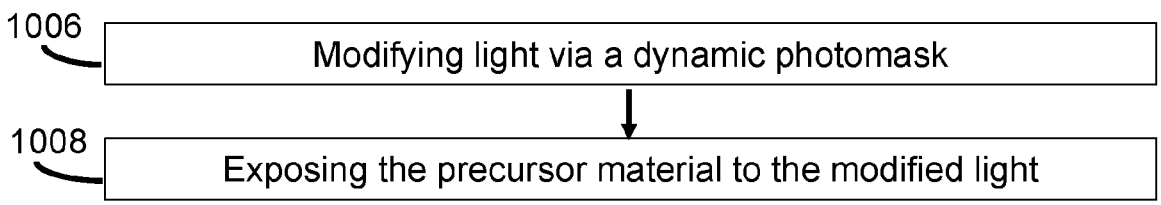
Figure 22C:
Figure 22D:
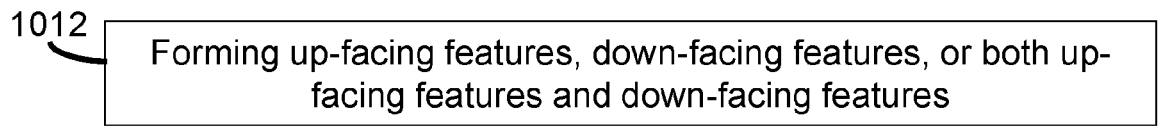
Figure 22E:
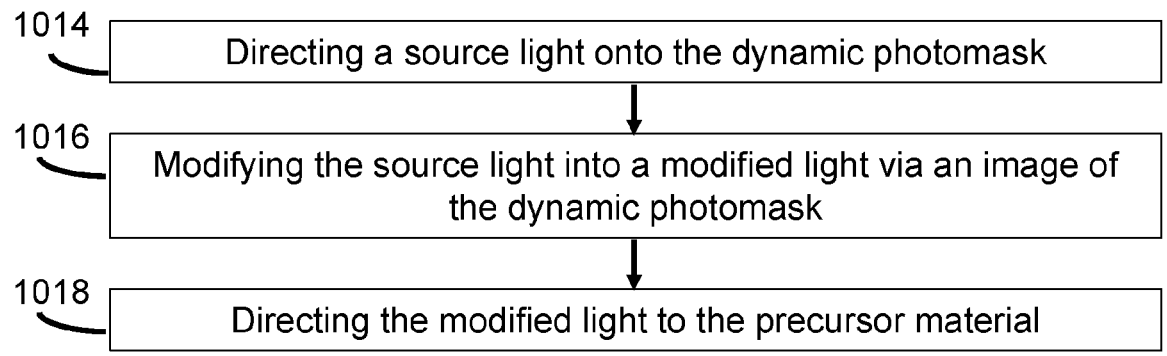
Figure 22F:
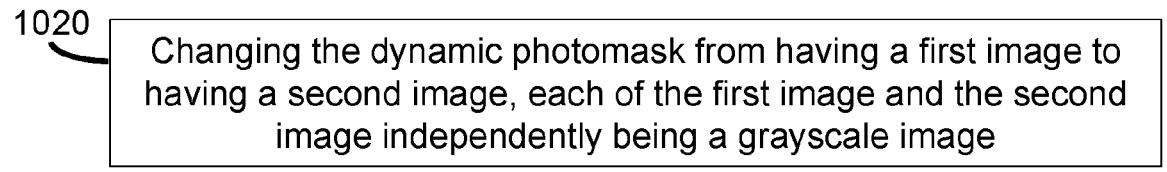
Figure 22G:
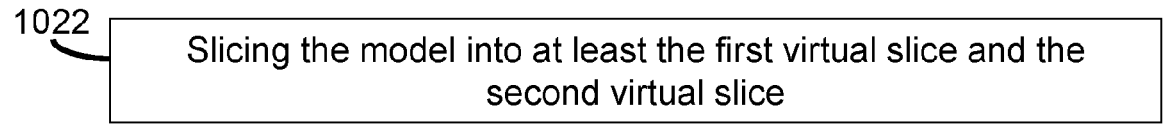
Figure 22H:
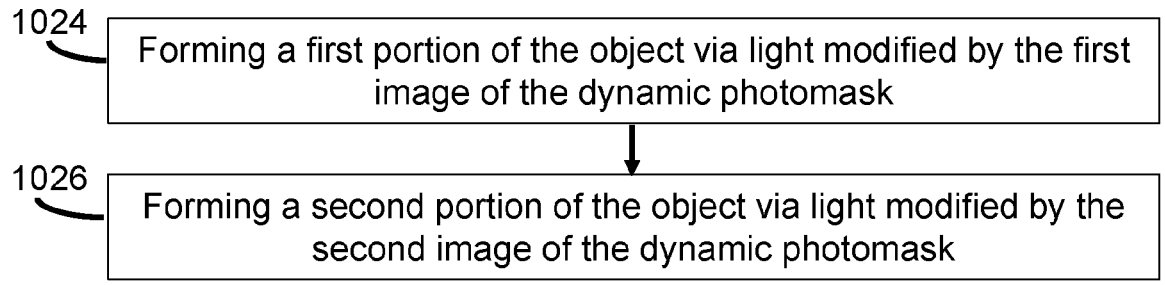
Figure 22I:
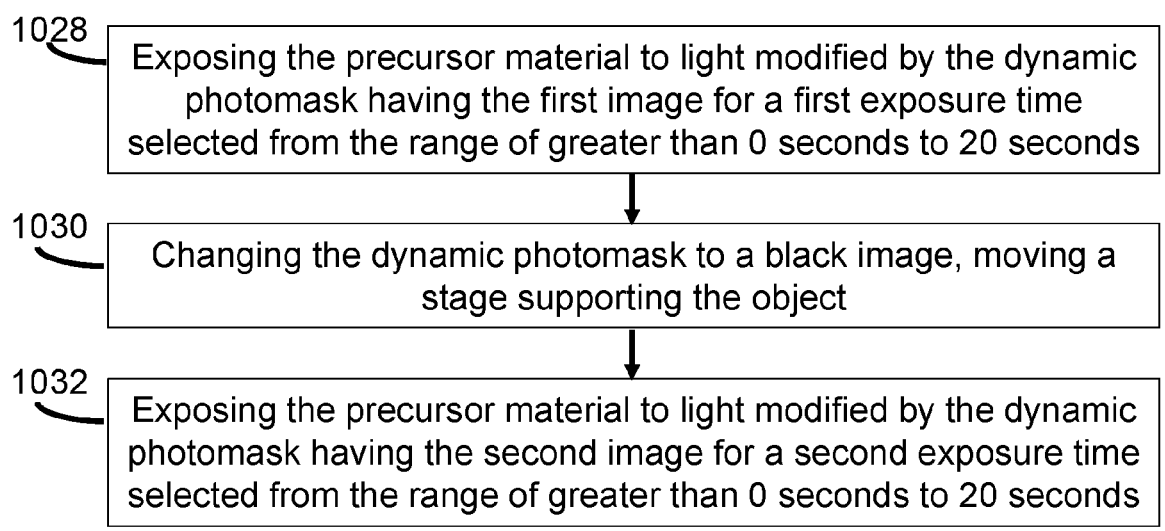
Figure 23A:
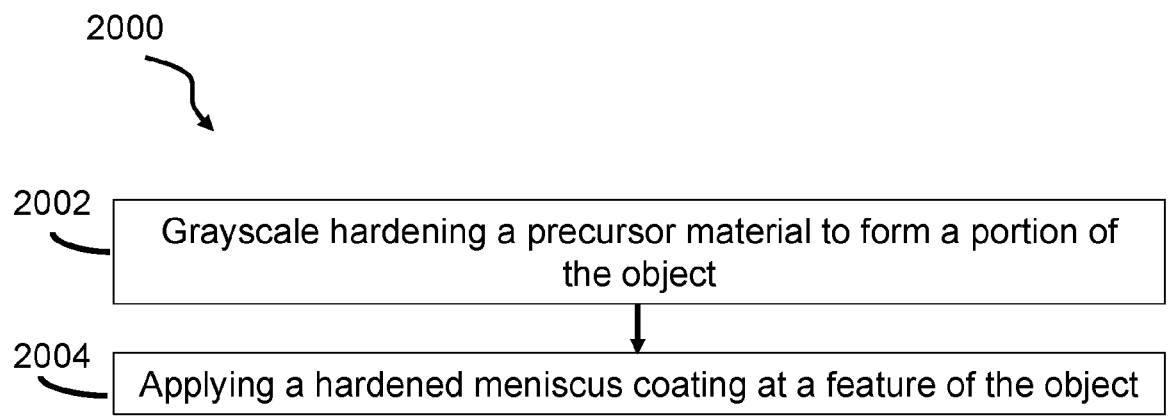
FIG. 23A is a flowchart demonstrating steps of another method for additive manufacture of a three-dimensional object based on a computational model, according to certain embodiments. Each of FIGS. 23B and 23C is independently a flowchart demonstrating optional steps of the method of FIG. 23A, according to certain embodiments.
Figure 23B:
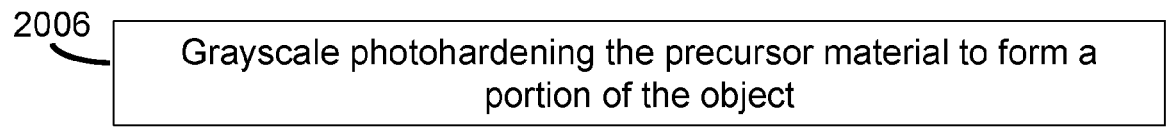
Figure 23C:
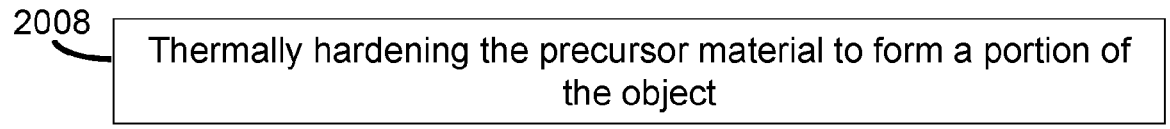

FIG. 20A is a schematic illustration of optical lens comprises both up-facing and down-facing surfaces. A contact lens is used as a representative example. The inset illustrates the step-wise roughness appears on both up-facing and down-facing surfaces, which are originated from the layered manufacturing process. FIG. 20B is a schematic representing a dual-grayscale design (inner grayscale region and outer grayscale region) that provides smooth transition of down-facing and up-facing surfaces, respectively. FIG. 20C is a representative example of a generated grayscale (radial) distribution of the grayscale image. FIG. 20D is a representative example of a multi-region image of a dynamic photomask, in the form of a bitmap image, comprising both inner and outer grayscale regions. For example, fabrication of such a contact lens is performed in via a micro-continuous liquid interface production process (micro-CLIP 3D printing system), such as one with a pixel resolution of 7.58×7.58 $\mu m^2$. FIG. 21A shows an example of 3D printed contact lens, with inset showing a computational (CAD) model. FIG. 21B shows a scanning electron micrograph (SEM) image of the outer surface of a printed contact lens.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

Every device, system, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

Several aspects of a device of this disclosure are described above with reference to example applications for illustration. It should be understood that numerous specific details, relationships, and methods are set forth to provide a full understanding of a device. One having ordinary skill in the relevant art, however, will readily recognize that a device can be practiced without one or more of the specific details or with other methods. This disclosure is not limited by the illustrated ordering of acts or events, as some acts may occur in different orders and/or concurrently with other acts or events. Furthermore, not all illustrated acts or events are required to implement a methodology in accordance with this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for additive manufacture of a three-dimensional object based on a computational model, the method comprising steps of:
grayscale photohardening a precursor material to form, as a photohardened precursor material, a baseline portion of the three-dimensional object; and
applying a hardened meniscus coating by forming a liquid meniscus on the baseline portion of the object formed as the photohardened precursor material and then hardening the liquid meniscus;
wherein the three-dimensional object is formed via at least the combination of the steps of grayscale photohardening and applying the meniscus coating;
wherein the three-dimensional object is a lens; and the lens is characterized by a field distortion of less than 0.15% across a field of view greater than or equal to 2 mm for light wavelengths of 441 nm, 532 nm, or 635 nm; and
wherein the method has a reproducibility characterized by a standard deviation of a surface profile of the lens of less than 3 µm over a 2 mm range of the diameter of the lens.

2. The method of claim 1, wherein the step of grayscale photohardening comprises modifying light via a dynamic photomask and exposing the precursor material to the modified light.

3. The method of claim 2, wherein the step of grayscale photohardening comprises directing a source light onto the dynamic photomask, modifying the source light into a modified light via an image of the dynamic photomask, and directing the modified light to the precursor material.

4. The method of claim 3, wherein the step of grayscale photohardening comprises changing the dynamic photomask from having a first image to having a second image, each of the first image and the second image independently being a grayscale image; wherein the first image corresponds to a first virtual slice of the computational model and the second image corresponds to a second virtual slice of the computational model.

5. The method of claim 4, wherein the step of grayscale photohardening comprises forming a first portion of the three-dimensional object via light modified by the first image of the dynamic photomask and forming a second portion of the three-dimensional object via light modified by the second image of the dynamic photomask.

6. The method of claim 4, wherein the baseline portion of the three-dimensional object has a variable thickness, the variable thickness corresponding to an image of the dynamic photomask.

7. The method of claim 1, wherein the baseline portion of the object formed during grayscale photohardening is a layer of the object.

8. The method of claim 1, wherein the step of grayscale photohardening is performed a plurality of times, each step of grayscale photohardening forming a different portion of the object.

9. The method of claim 1, wherein: the step of grayscale photohardening is characterized by a fabrication speed selected from the range of 1 to 100 mm$^3$/h; the precursor material is characterized by a viscosity selected from the range of 1 to 100,000 cp at 20° C.; the photohardened precursor material has a refractive index selected from the range of 1.0 to 2.0; and/or the three-dimensional object has a feature characterized by at least one physical size dimension selected from the range of 100 µm to 100 cm.

10. The method of claim 1, wherein the step of applying the hardened meniscus coating comprises forming the liquid meniscus on the baseline portion of the three-dimensional object as a liquid meniscus of the precursor material.

11. The method of claim 10, wherein forming the liquid meniscus on the baseline portion of the three-dimensional object comprises at least partially removing the baseline portion of the three-dimensional object from a reservoir of the precursor material or applying the precursor material to the baseline portion of the object.

12. The method of claim 10, wherein the step of applying the hardened meniscus coating comprises photohardening, thermally hardening, or both photohardening and thermally hardening the liquid meniscus of the precursor material to form the hardened meniscus coating.

13. The method of claim 12, wherein the photohardening of the meniscus of precursor material comprises moving the three-dimensional object with respect to a source of light while the meniscus of precursor material is photohardened.

14. The method of claim 10, wherein the liquid meniscus is formed of the precursor material.

15. The method of claim 10, wherein the step of applying a hardened meniscus coating comprises photohardening the liquid meniscus of the precursor material to form the hardened meniscus coating.

16. The method of claim 1, wherein the hardened meniscus coating and the baseline portion of the three-dimensional object are formed of substantially the same material.

17. The method of claim 1, wherein the precursor material comprises particles and wherein the three-dimensional object comprises the particles.

18. The method of claim 1, wherein the lens is an aspherical lens.

19. The method of claim 1, wherein: the lens is characterized by a maximal imaging resolution of at least 180 lp/mm, the lens is characterized by a theoretical optimal lateral resolution substantially less than or equal to 2 µm, at least a portion of a surface of the three-dimensional object has a smoothness characterized by a root mean square selected from the range of 5 to 10 nm, and/or an absolute value of $\Delta Z$ is less than a pixel dimension of the model, $\Delta Z$ being a difference between a value of a surface profile of the three-dimensional object and a value of a surface profile of the computational model at corresponding locations of the three-dimensional object and the computational model, respectively.

20. A system for additive manufacture of a three-dimensional object based on a computational model, the system comprising:
a source of a precursor material or an apparatus for delivery of the precursor material;
a source of light;
a dynamic photomask;
a controller configured to control the dynamic photomask; and
an optical assembly configured to direct light to the dynamic photomask and to direct light modified by the dynamic photomask to the precursor material;
wherein the controller is configured to:
provide a first image of the dynamic photomask to modify the light to a first modified light, such that a first portion of the three-dimensional object is formed via photohardening of the precursor material exposed to the first modified light, and
provide a second image of the dynamic photomask to modify the light to a second modified light, such that a second portion of the three-dimensional object is formed via photohardening of the precursor material exposed to the second modified light;

wherein at least one of the first image and the second image is a grayscale image such that the first portion of the three-dimensional object or the second portion of the three-dimensional object is formed by grayscale photohardening of the precursor material, wherein the system is further configured to apply a hardened meniscus coating by forming a liquid meniscus on at least part of the first portion of the three-dimensional object formed as the photohardened precursor material or at least part of the second portion of the three-dimensional object formed as the photohardened precursor material and then hardening the liquid meniscus; wherein the three-dimensional object is a lens; and the lens is characterized by a field distortion of less than 0.15% across a field of view greater than or equal to 2 mm for light wavelengths of 441 nm, 532 nm, or 635 nm;

wherein the system has a reproducibility characterized by a standard deviation of a surface profile of the lens of less than 3 µm over a 2 mm range of the diameter of the lens.

21. A non-transitory computer-readable storage medium including instructions which, when executed, cause at least one processor to perform a method for additive manufacture of a three-dimensional object based on a computational model:

form a grayscale image using a dynamic photomask, the grayscale image corresponding to at least a portion of the computational model of the three-dimensional object;

photoharden a precursor material via light modified by the grayscale image of the dynamic photomask to form, as a photohardened precursor material, a baseline portion of the three-dimensional object;

forming a liquid meniscus on the baseline portion of the three-dimensional object formed as photohardened precursor material; and hardening the liquid meniscus to form a hardened meniscus coating on the baseline portion of the object; wherein the three-dimensional object is a lens; and the lens is characterized by a field distortion of less than 0.15% across a field of view greater than or equal to 2 mm for light wavelengths of 441 nm, 532 nm, or 635 nm;

wherein the method has a reproducibility characterized by a standard deviation of a surface profile of the lens of less than 3 µm over a 2 mm range of the diameter of the lens.

22. A method for additive manufacture of a three-dimensional object based on a computational model, the method comprising steps of:

grayscale hardening a precursor material to form, as a hardened precursor material, a baseline portion of the three-dimensional object, wherein grayscale hardening comprises thermally hardening the precursor material to form the baseline portion of the three-dimensional object; and applying a hardened meniscus coating by forming a liquid meniscus on the baseline portion of the three-dimensional object formed as the hardened precursor material and then hardening the liquid meniscus;

wherein the three-dimensional object is formed via at least the combination of the steps of grayscale hardening and applying the meniscus coating; wherein the three-dimensional object is a lens; and the lens is characterized by a field distortion of less than 0.15% across a field of view greater than or equal to 2 mm for light wavelengths of 441 nm, 532 nm, or 635 nm;

wherein the method has a reproducibility characterized by a standard deviation of a surface profile of the lens of less than 3 µm over a 2 mm range of the diameter of the lens.

* * * * *